(12) United States Patent
Schaedler et al.

(10) Patent No.: US 7,992,659 B2
(45) Date of Patent: Aug. 9, 2011

(54) STEERING SYSTEMS, STEERING AND SPEED COORDINATION SYSTEMS, AND ASSOCIATED VEHICLES

(75) Inventors: Axel Schaedler, Olmsted Township, OH (US); Hans Hauser, Strongsville, OH (US); Rick Ruebusch, Medina, OH (US); Ian David Cornwell, Preston (GB); Christopher John Greenwood, Preston (GB)

(73) Assignee: Infinitrak, LLC, Valley City, OH (US)

( * ) Notice: Subject to any disclaimer, the term of this patent is extended or adjusted under 35 U.S.C. 154(b) by 828 days.

(21) Appl. No.: 11/490,881

(22) Filed: Jul. 21, 2006

(65) Prior Publication Data
US 2007/0144796 A1 Jun. 28, 2007

Related U.S. Application Data

(60) Provisional application No. 60/701,716, filed on Jul. 22, 2005, provisional application No. 60/710,231, filed on Aug. 22, 2005, provisional application No. 60/731,593, filed on Oct. 28, 2005.

(51) Int. Cl.
*B62D 3/14* (2006.01)
(52) U.S. Cl. .......... 180/6.24; 180/6.2; 180/6.48
(58) Field of Classification Search ........ 180/6.2, 180/6.24, 6.48
See application file for complete search history.

(56) References Cited

U.S. PATENT DOCUMENTS

| | | | |
|---|---|---|---|
| 3,362,493 A | 1/1968 | Davis et al. | 180/6.32 |
| 3,398,819 A | 8/1968 | Ruhl et al. | 192/221 |
| 3,429,392 A | 2/1969 | Ryskamp | 180/6.3 |
| 3,572,033 A | 3/1971 | Tolley | 60/427 |
| 3,900,075 A | 8/1975 | Chichester et al. | 180/6.3 |
| 3,913,695 A | 10/1975 | Holdenried et al. | 180/6.48 |
| 4,339,966 A | 7/1982 | Kraus | 74/650 |
| 4,399,882 A | 8/1983 | O'Neill et al. | 180/6.48 |
| 4,572,310 A | 2/1986 | Peter | 180/6.24 |
| 4,875,536 A | 10/1989 | Saur et al. | 180/6.32 |
| 4,882,947 A | 11/1989 | Barnard | 475/23 |

(Continued)

FOREIGN PATENT DOCUMENTS
EP 0 754 613 1/1997
(Continued)

OTHER PUBLICATIONS

"SST15, SST16, and SST18 Spin-Steer Technology™ lawn tractors," Litho in U.S.A., Apr. 2003.

(Continued)

*Primary Examiner* — Paul N Dickson
*Assistant Examiner* — Michael R Stabley
(74) *Attorney, Agent, or Firm* — Fulbright & Jaworski L.L.P.

(57) ABSTRACT

In a broad respect, vehicles that are capable of making a low-to zero-radius turn using the independent rotation of drive wheels and by turning the non-driving steerable structure or structures (such as wheels) with a steering input device (in some embodiments, the driving wheels also may be capable of being turned). This may be accomplished using a steering system, a speed control system and an integration device (together, a control system) that are configured to work together to provide correct steering in forward and reverse, and, in some embodiments, to reduce the speed of the outboard drive wheel of the vehicle when it enters an extreme turn under constant speed input. Different systems configured for use in such vehicles are included.

11 Claims, 32 Drawing Sheets

U.S. PATENT DOCUMENTS

| | | | |
|---|---|---|---|
| 4,969,533 A | 11/1990 | Holm et al. | 180/273 |
| 5,042,238 A | 8/1991 | White, III et al. | 56/11.8 |
| 5,078,222 A | 1/1992 | Hauser | 180/6.48 |
| RE34,057 E | 9/1992 | Middlesworth | 180/6.2 |
| 5,238,267 A | 8/1993 | Hutchison et al. | 280/781 |
| 5,263,901 A | 11/1993 | Kawakami et al. | 180/6.48 |
| 5,288,091 A | 2/1994 | Deschamps | 180/309 |
| 5,529,135 A | 6/1996 | Wenzel et al. | 180/6.24 |
| 5,766,105 A | 6/1998 | Fellows et al. | 474/18 |
| 5,941,334 A | 8/1999 | Inagaki et al. | 180/242 |
| 6,092,617 A * | 7/2000 | White et al. | 180/338 |
| 6,129,164 A | 10/2000 | Teal et al. | 180/6.2 |
| 6,152,248 A | 11/2000 | Hidaka et al. | 180/6.38 |
| 6,196,342 B1 * | 3/2001 | Teal et al. | 180/6.2 |
| 6,230,829 B1 | 5/2001 | Martin et al. | 180/6.3 |
| 6,256,357 B1 | 7/2001 | Oshima | 375/261 |
| 6,257,357 B1 * | 7/2001 | Teal et al. | 180/6.2 |
| 6,301,864 B1 * | 10/2001 | Damie et al. | 56/11.3 |
| 6,408,960 B1 | 6/2002 | Hidaka et al. | 180/6.38 |
| 6,434,919 B2 * | 8/2002 | Schick | 56/15.9 |
| 6,447,419 B1 | 9/2002 | Irikura et al. | 475/24 |
| 6,456,925 B1 | 9/2002 | Romig | 701/93 |
| 6,540,633 B1 | 4/2003 | Hasegawa et al. | 475/24 |
| 6,554,085 B2 | 4/2003 | Hasegawa et al. | 180/6.26 |
| 6,601,663 B2 | 8/2003 | Hauser | 180/6.3 |
| 6,672,411 B1 | 1/2004 | Mouser | 180/6.32 |
| 6,688,090 B2 * | 2/2004 | Velke et al. | 56/14.7 |
| 6,725,954 B1 * | 4/2004 | Keane et al. | 180/6.48 |
| 6,729,115 B2 * | 5/2004 | Bartel | 56/11.3 |
| 6,808,032 B2 | 10/2004 | Wuertz et al. | 180/6.48 |
| 6,874,305 B2 | 4/2005 | Ishimori | 56/10.8 |
| 6,904,985 B2 * | 6/2005 | Ferree et al. | 180/6.32 |
| 6,905,985 B1 | 6/2005 | Schindzielorz et al. | 442/65 |
| 6,912,831 B2 * | 7/2005 | Velke et al. | 56/10.9 |
| 6,921,109 B2 | 7/2005 | Hutchison et al. | 280/771 |
| 6,951,259 B2 | 10/2005 | Irikura | 180/6.3 |
| 6,962,219 B2 | 11/2005 | Hauser | 180/6.34 |
| 7,017,327 B2 | 3/2006 | Hunt et al. | 56/14.7 |
| 7,108,096 B1 | 9/2006 | Oxley et al. | 180/197 |
| 7,237,629 B1 * | 7/2007 | Bland et al. | 180/6.3 |
| 7,347,434 B2 | 3/2008 | Lewis et al. | 280/99 |
| 2002/0092685 A1 | 7/2002 | Hauser | 180/6.3 |
| 2002/0108800 A1 | 8/2002 | Irikura et al. | 180/307 |
| 2002/0113564 A1 | 8/2002 | Reile et al. | 318/139 |
| 2003/0019682 A1 | 1/2003 | Schaedler et al. | 180/308 |
| 2003/0102171 A1 | 6/2003 | Hauser | 180/6.2 |
| 2003/0106725 A1 | 6/2003 | Irikura | 180/6.26 |
| 2003/0213625 A1 | 11/2003 | Okada et al. | 180/6.2 |
| 2004/0245029 A1 | 12/2004 | Irikura | 180/6.3 |
| 2005/0003919 A1 | 1/2005 | Hasegawa et al. | 475/83 |
| 2005/0023049 A1 * | 2/2005 | Ferree et al. | 180/6.3 |

FOREIGN PATENT DOCUMENTS

| | | |
|---|---|---|
| EP | 1 000 793 | 5/2000 |
| EP | 1 186 459 | 3/2002 |
| GB | 2015666 | 9/1979 |
| GB | 2119328 | 4/1982 |
| GB | 2303829 | 3/1997 |
| WO | WO 03/100295 | 12/2003 |

OTHER PUBLICATIONS

Hidaka, "Development of forced differential steering control system," *Automation Technology for Off-Road Equipment, Proceeding of the Oct. 7-8, 2001 Conference*, Kyoto, Japan, Oct. 7, 2004.

"PCT International Search Report and Written Opinion," issued in International Application No. PCT/US06/28357, dated Aug. 8, 2007.

Office Communication issued in U.S. Appl. No. 11/269,899, dated Feb. 6, 2007.

Response to Feb. 6, 2007 Office Communication, U.S. Appl. No. 11/269,899, submitted Aug. 6, 2007.

Office Communication issued in U.S. Appl. No. 11/269,899, dated Nov. 19, 2007.

Response to Nov. 19, 2007 Office Communication, U.S. Appl. No. 11/269,899, submitted Dec. 19, 2007.

Office Communication issued in U.S. Appl. No. 11/269,899, dated Apr. 1, 2009.

European Office Communication issued in Application No. 06 792 907.5-1264, dated Feb. 2, 2009.

European Office Communication issued in Application No. 06 792 905.9-1264, dated Mar. 13, 2009.

New Zealand Examination Report, issued in Int. App. No. 566486, mailed Sep. 29, 2009.

Response to Apr. 1, 2009 Office Action, submitted in U.S. Appl. No. 11/269,899, dated Oct. 1, 2009.

Supplementary European Search Report, issued in Int. App. No. EP 06 78 8098, mailed Jul. 14, 2009.

Response to Office Action, in European App. No. 06792907.5, dated Aug. 27, 2009.

Response to Office Action, in European App. No. 06792905.9, dated Oct. 30, 2009.

New Zealand Examination Report, issued in Int. App. No. 566485, mailed Sep. 24, 2009.

Office Action, issued in European App. No. 06788098.9, mailed Oct. 12, 2009.

International Search Report and Written Opinion, issued in Application No. PCT/US2009/038404, mailed Jan. 8, 2010.

Office Communication, issued in U.S. Appl. No. 11/269,899, dated Jun. 15, 2010.

Response to Office Communication issued in U.S. Appl. No. 11/269,899, submitted Nov. 8, 2010.

Response to Office Communication issued in European Patent Application No. 06788098.9, submitted Jul. 30, 2010.

Office Communication, issued in U.S. Appl. No. 12/097,875, dated Dec. 13, 2010.

Office Communication, issued in European Patent Application No. 06792905.9, dated Jul. 28, 2009.

Office Communication, issued in European Patent Application No. EP06788098.9, dated Feb. 24, 2011.

Office Communication, issued in Mexico Patent Application No. MX/a/2008/001022, dated Apr. 6, 2011. (English summary provided).

Notice of Allowance issued in U.S. Appl. No. 11/269,899, dated Apr. 15, 2011.

* cited by examiner

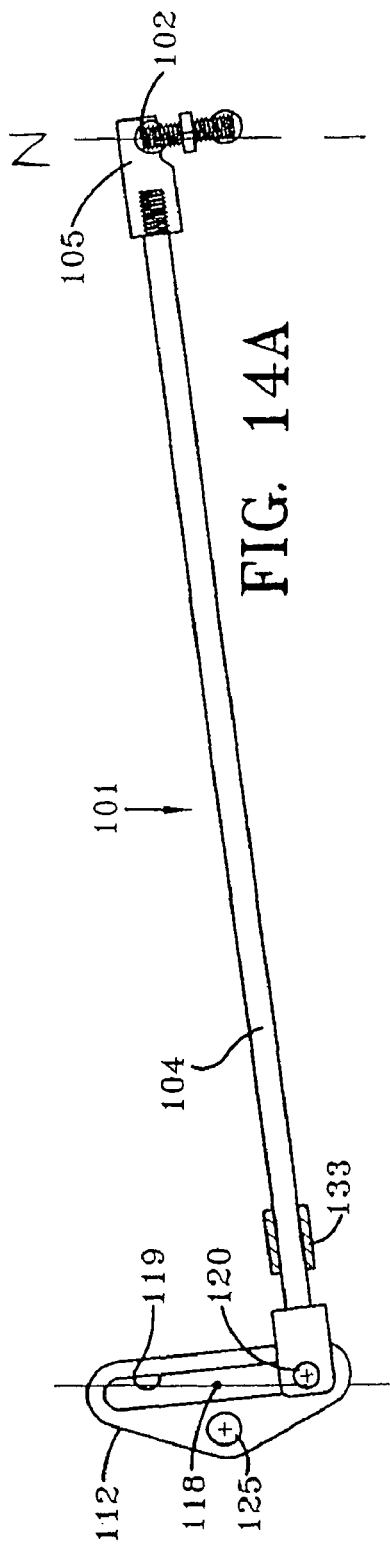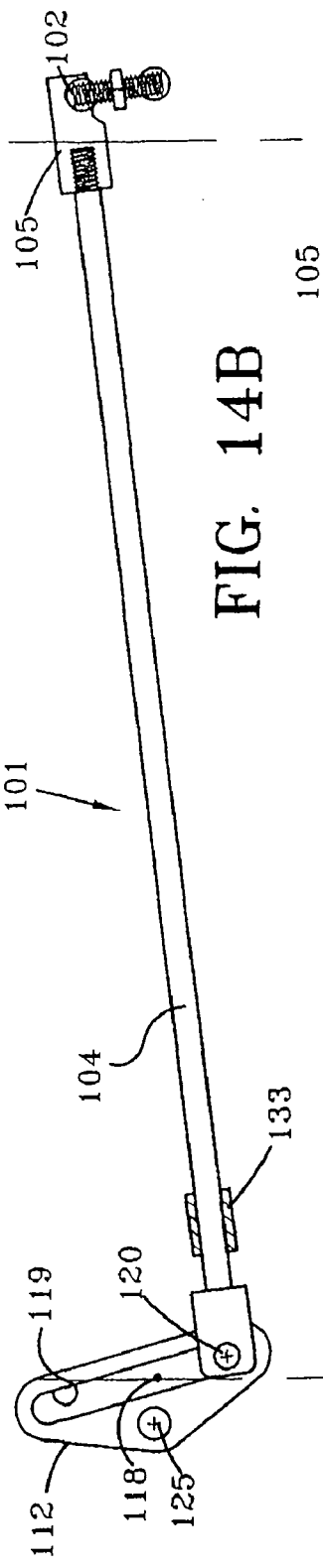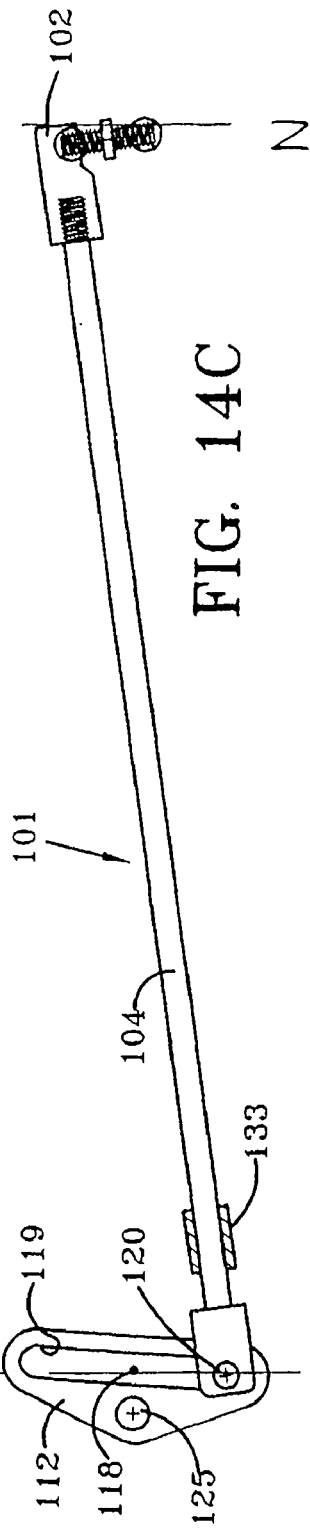

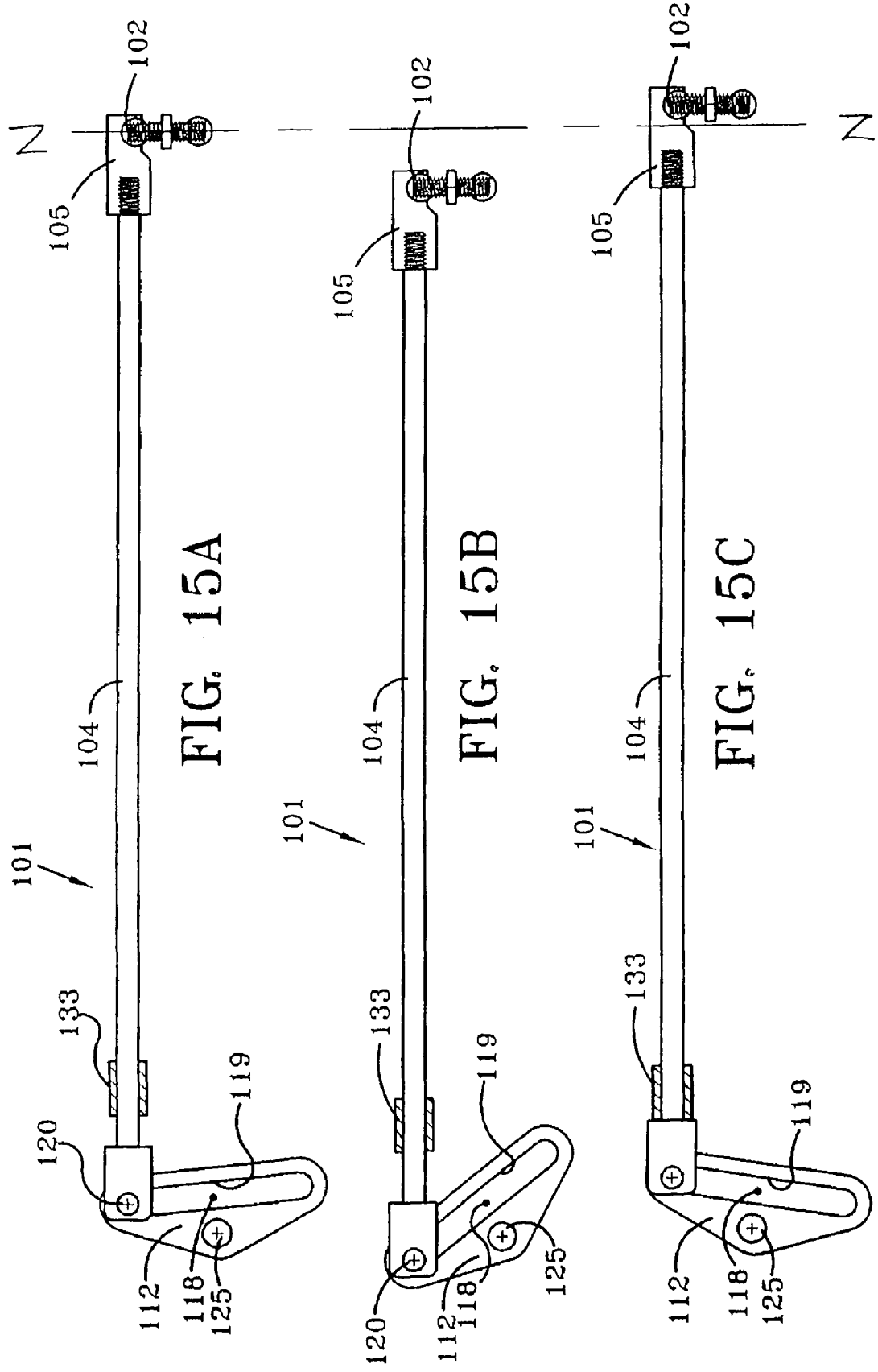

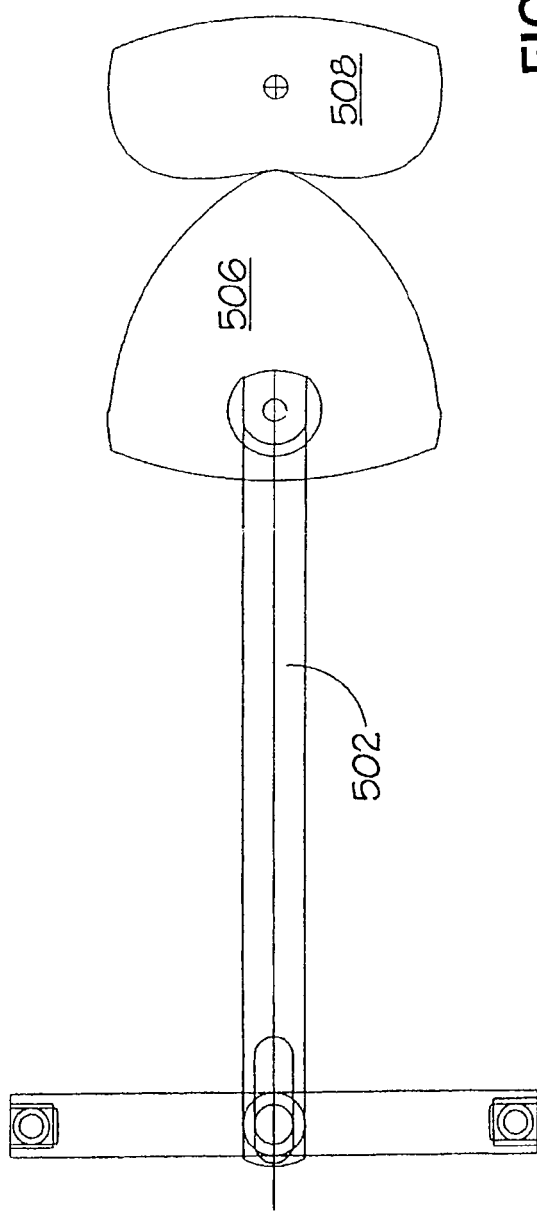
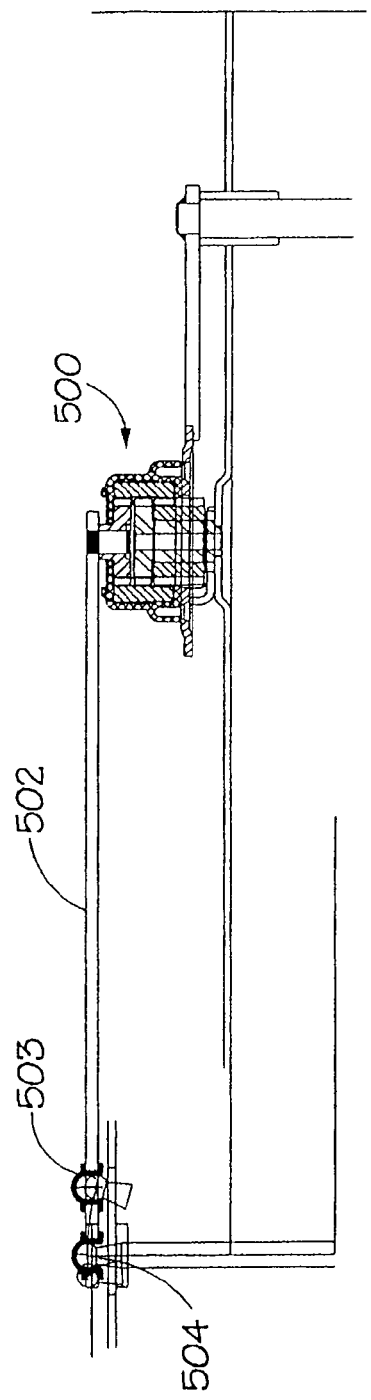

STEERING SYSTEMS, STEERING AND SPEED COORDINATION SYSTEMS, AND ASSOCIATED VEHICLES

CROSS-REFERENCE(S) TO RELATED APPLICATION(S)

This application claims priority to U.S. Provisional Patent Application Ser. No. 60/701,716, filed Jul. 22, 2005, U.S. Provisional Patent Application Ser. No. 60/710,231, filed Aug. 22, 2005, and the U.S. Provisional Patent Application Ser. No. 60/731,593, filed on Oct. 28, 2005 in the names of Axel Schaedler, Hans Hauser, Rick Ruebusch, Ian David Cornwell, and Chris Greenwood and titled Steering Systems, Steering and Speed Coordination Systems, and Associated Vehicles. The contents of all three provisional applications are incorporated by reference.

BACKGROUND

1. Field of the Invention

The invention relates generally to vehicles that have low to zero turning radius capability. Zero turning radius vehicles are often described as ZTR vehicles. However, this name has also been used to described vehicles capable of a turning radius that is not precisely zero. More specifically, the invention relates to steering systems, steering and speed coordination systems, and vehicles that comprise one or both types of systems.

2. Description of Related Art

ZTR vehicles are generally propelled by rear drive wheels, which can be driven at different speeds to accomplish steering. The speed and direction of rotation of the drive wheels of some ZTR vehicles are controlled through separate hand levers. Some users find these levers confusing because they control both vehicle speed and direction.

Some ZTR vehicles use a steering wheel instead of separate control levers. However, some of these vehicles do not provide correct steering when the vehicle is in reverse. For example, when backing up and turning the steering wheel to make a left-hand turn, some of these vehicles produce a right-hand rear turn where the front of the vehicle—instead of the rear—moves to the left. See U.S. Pat. No RE 34,057 as an example of such a ZTR vehicle.

John Deere introduced a series of Spin-Steer Technology™ (SST) tractors. The SST tractors possess a rear-wheel driven differential steering system controlled by a steering wheel, and a vacuum-actuated reverse logic system that provides for conventional steering in reverse. The front wheels are caster wheels that are not steerable. See U.S. Pat. No. 6,256,357 for a description of these tractors.

U.S. Pat. No. 6,601,663 discloses a ZTR vehicle that utilizes a steering wheel to control steering, and a single hydraulic variable displacement pump and dual variable displacement hydraulic motors, each of which is coupled to a ground engaging wheel that is used to steer and drive the vehicle. This ZTR vehicle provides for proper steering in the forward and reverse directions.

U.S. Patent Application Publication No. 2003/0102171 also discloses a ZTR vehicle capable of proper wheel-effected steering in forward and reverse. The independently-actuated rear wheels drive the vehicle. They also steer the vehicle by rotating at different speeds and/or directions.

One problem with using caster wheels as non-steerable front wheels on ZTR vehicles is noticeable when driving on the side of a hill. Gravity will tend to pull the vehicle down the hill. This may cause the portion of the vehicle supported by the caster wheels to turn downhill against the operator's wishes. Additionally, when attempting to turn the ZTR vehicle uphill, the drive wheels may loose traction as the operator tries to produce the torque required to get the castor wheels pointed in the uphill direction.

Steerable front wheels have been used on ZTR vehicles. See U.S. Pat. No. 3,362,493 (Davis, et al.) and U.S. Pat. No. 5,042,238 and U.S. Patent Application Publication No. 2003/0019682. However, each has shortcomings. For example, the Davis patent device is not equipped with a system that can reduce the speed of the outboard drive wheel of a vehicle entering an extreme turn at a constant speed input.

U.S. Pat. Nos. 6,196,342 and 6,129,164 disclose reverse steering logic mechanisms that are coupled to and interact with a dual differential type of drive and steer transmission to cause the transmission to execute vehicle turns in the direction that the steering wheel is turned when operating in forward or reverse. These patents disclose the use of caster wheels, and do not disclose the use of steerable front wheels.

U.S. Pat. No. 6,921,109 discloses a reverse steering logic mechanism and a mechanism for providing "variable steering responsiveness." It discloses using these mechanisms with the dual differential type transmission in U.S. Pat. No. 6,196,342.

U.S. Pat. No. 6,905,985 discloses a complicated system of linkages that purportedly provides for steering control of front steerable wheels and transmission-effected steering that rotates the rear wheels such that the vehicle turns in the direction that the steering wheel is turned when operating in forward or reverse. This patent discloses the use of this system in combination with a dual differential type transmission.

U.S. Pat. No. 6,152,248 discloses the use of a non-circular gear pair in the steering of a vehicle, but that gear pair does not control the turning of a non-driving wheel.

SUMMARY

In a broad respect, the invention relates to vehicles that are capable of making a low- to zero-radius turn (e.g., a small radius turn) using the independent rotation of drive wheels and by turning the non-driving wheel or wheels with a steering input device (in some embodiments, the driving wheels may also be capable of being turned). This may be accomplished using a steering system, a speed control system and an integration device (together, a control system) that are configured to work together to provide correct steering in forward and reverse, and, in some embodiments, to reduce the speed of the vehicle (specifically the outboard drive wheel) when it enters a sufficiently extreme turn (e.g., one in which the ground engaging wheel can be turned no further) under constant speed input.

In some embodiments, these vehicles comprise a frame; a steerable structure (such as a ground-engaging wheel, which also may be characterized as a non-driving wheel) coupled to the frame; two drive wheels coupled to the frame; a transmission system capable of driving the two drive wheels at different speeds and in different directions; a steering assembly configured to control the steerable structure; a speed control assembly coupled to the transmission system; and an integration device that integrates a steering input with a speed input to steer and drive the vehicle. The steering assembly, the speed control assembly and the integration device are configured to work together to reduce the speed of the outboard drive wheel during an extreme turn while the speed input received by the speed control assembly is constant.

In some embodiments, these vehicles comprise a frame; a steerable structure (such as a ground-engaging wheel)

coupled to the frame; two drive wheels coupled to the frame; a transmission system capable of driving the two drive wheels at different speeds and in different directions; a steering assembly configured to control the steerable structure; a speed control assembly coupled to the transmission system, the speed control assembly including a speed input device configured to be manipulated by an operator; and an integration device that integrates a steering input with a speed input to produce a blended output for steering and driving the vehicle that is transmitted to the transmission system as a result of an operator manipulating the speed input device. The steering assembly, the speed control assembly and the integration device are configured to work together to steer the vehicle correctly in both forward and reverse during a turn. Stated another way, the steering assembly, the speed control assembly and the integration device are configured to work together such when the vehicle is turned, the direction of the turn is the same for a given steering input whether the vehicle is traveling in forward or reverse. As a result, the direction of the turn does not change when going from forward to reverse.

In another respect, the invention relates to a driving and steering system that comprises at least one steering cam configured to receive a steering input and be coupled to and articulate a non-driving wheel; a speed cam coupled to the steering cam and movable in response to a speed input; and an assembly coupling the steering cam to the speed cam. The system can include two steering cams positioned on opposite sides of a steering input device (such as a steering wheel), and a speed cam can be coupled to each of the speed cams to form two pairs of steering and speed cams. The steering cams can be configured to have the same shape, and the speed cams can be configured to have the same shape. The assembly can be configured to move the steering cams in opposite directions in response to a given steering input and to move the speed cams in the same direction in response to a given speed input.

In another respect, the invention relates to a driving and steering system that comprises two steering cams that move in opposite directions in response to a steering input; a speed cam coupled to each steering cam and movable in response to a speed input; and an assembly coupling each steering cam to one of the speed cams.

In another respect, the invention relates to a steering system that comprises a first gear pair that controls the turning of a non-driving wheel (meaning that the transmission system is not involved with such control), the first gear pair including a non-circular drive gear that engages a non-circular driven gear. Each gear pair of the system can be designed to cause the non-driving wheels to follow a vehicle turn radius that matches (or at least substantially matches) the vehicle turn radius produced by the driving wheels (under the control of the transmission system).

In another respect, the invention relates to a steering system that comprises a gear pair having a non-uniform gear ratio, the gear pair being configured to control the turning of a non-driving wheel (meaning that the transmission system is not involved with such control).

In another respect, the invention relates to a vehicle that comprises a frame; at least two non-driving wheels coupled to the frame; at least two drive wheels coupled to the frame; a transmission system capable of (a) driving the two drive wheels at different speeds and in different directions and (b) causing the drive wheels to produce a first vehicle turning radius; and a steering assembly configured to cause the non-driving wheels to produce a second vehicle turning radius, the steering assembly including two pairs of non-circular gears configured such that the second vehicle turn radius can be equal to the first vehicle turn radius during operation of the vehicle.

In another respect, the invention relates to a steering system in a vehicle having at least two non-driving wheels, at least two drive wheels, and a transmission system capable of (a) driving the drive wheels at different speeds and in different directions and (b) causing the drive wheels to produce a first vehicle turn radius, the steering system comprising: first and second pairs of non-circular gears configured to work together to cause the non-driving wheels to produce a second vehicle turning radius that is equal to the first vehicle turning radius for a given steering input.

In another respect, the invention relates to a steering system in a vehicle having at least two non-driving wheels, at least two drive wheels, and a transmission system capable of (a) driving the drive wheels at different speeds and in different directions and (b) causing the drive wheels to produce a first vehicle turn radius, the steering system comprising: first and second pairs of gears that each have a non-uniform gear ratio and that are configured to work together to cause the non-driving wheels to produce a second vehicle turning radius that is equal to the first vehicle turning radius for a given steering input.

In another respect, the invention relates to a steering system that comprises a first gear pair including a first drive gear coupled to a first driven gear that is coupled to a king pin, the first gear pair being configured to rotate the king pin through a greater angle in response to an inward turn caused by a first steering input than in response to an outward turn caused by a second steering input that is equal in magnitude but opposite in direction to the first steering input.

Different aspects of these devices (e.g., vehicles) and systems, as well as other devices and systems, are described below.

BRIEF DESCRIPTION OF THE DRAWINGS

The following drawings illustrate by way of example and not limitation. Identical reference numerals do not necessarily indicate an identical structure. Rather, the same reference numeral may be used to indicate a similar feature or a feature with similar functionality. Every feature of each embodiment is not always labeled in every figure in which that embodiment appears, in order to keep the figures clear. At least FIGS. 5-13 are drawn to scale, meaning the sizes of the depicted elements are accurate relative to each other for at least one set of embodiments of the present devices and systems.

FIG. 5 illustrates a perspective view of the front axle of the vehicle of FIG. 1;

FIG. 7 illustrates a perspective view of another embodiment of the front axle of the vehicle of FIG. 1;

FIG. 10 is a perspective view showing aspects of the of the speed control assembly of FIG. 2B;

FIG. 11 is a perspective view showing the interaction between the steering assembly and the speed control assembly of the vehicle of FIG. 1;

FIG. 12 is a close-up view of one of the present steering control members in the form of a steering cam;

FIG. 13 is a close-up view of one of the present speed control members in the form of a speed cam;

FIGS. 14A-14C show the position of the speed control member from FIG. 13 in neutral, forward and reverse, where the vehicle is steered straight ahead;

FIGS. 15A-15C show the position of the speed control member from FIG. 13 in neutral, forward and reverse, where the vehicle is in a maximum turn and the depicted speed control member is on the inboard side of the turn;

FIG. 21 is an exploded view of another embodiment of a steering assembly, a speed control assembly, and an integration device that may be used with the vehicle of FIG. 1;

FIG. 27 is a plan view of a further embodiment of portions of the system of FIG. 21;

FIG. 28 is a side view of the embodiment of FIG. 27;

DETAILED DESCRIPTION OF ILLUSTRATIVE EMBODIMENTS

The terms "comprise" (and any form of comprise, such as "comprises" and "comprising"), "have" (and any form of have, such as "has" and "having"), "contain" (and any form of contain, such as "contains" and "containing"), and "include" (and any form of include, such as "includes" and "including") are open-ended linking verbs. Thus, a vehicle that "comprises" a frame; a steerable structure coupled to the frame; two drive wheels coupled to the frame; a transmission system capable of driving the two drive wheels at different speeds and in different directions; a steering assembly configured to the steerable structure; a speed control assembly coupled to the transmission system; and an integration device that integrates a steering input received by the steering assembly with a speed input received by the speed control assembly to steer and drive the vehicle; where the steering assembly, the speed control assembly and the integration device are configured to work together to reduce the speed of the outboard drive wheel during an extreme turn while the speed input received by the speed control assembly is constant, is a vehicle that possesses the listed elements, but is not prohibited from possessing elements that are not listed (such as an additional steerable structure).

Likewise, an element of an apparatus that "comprises," "has," "contains" or "includes" one or more features possesses those one or more features, but is not limited to possessing only those one or more features. Furthermore, a structure that is configured in a certain way must be configured in at least that way, but also may be configured in a way or ways that are not specified.

The terms "a" and "an" are defined as one or more than one unless this disclosure explicitly requires otherwise. The terms "substantially" and "about" are defined as at least close to (and includes) a given value or state (preferably within 10% of, more preferably within 1% of, and most preferably within 0.1% of).

General Configuration

Figure 1:
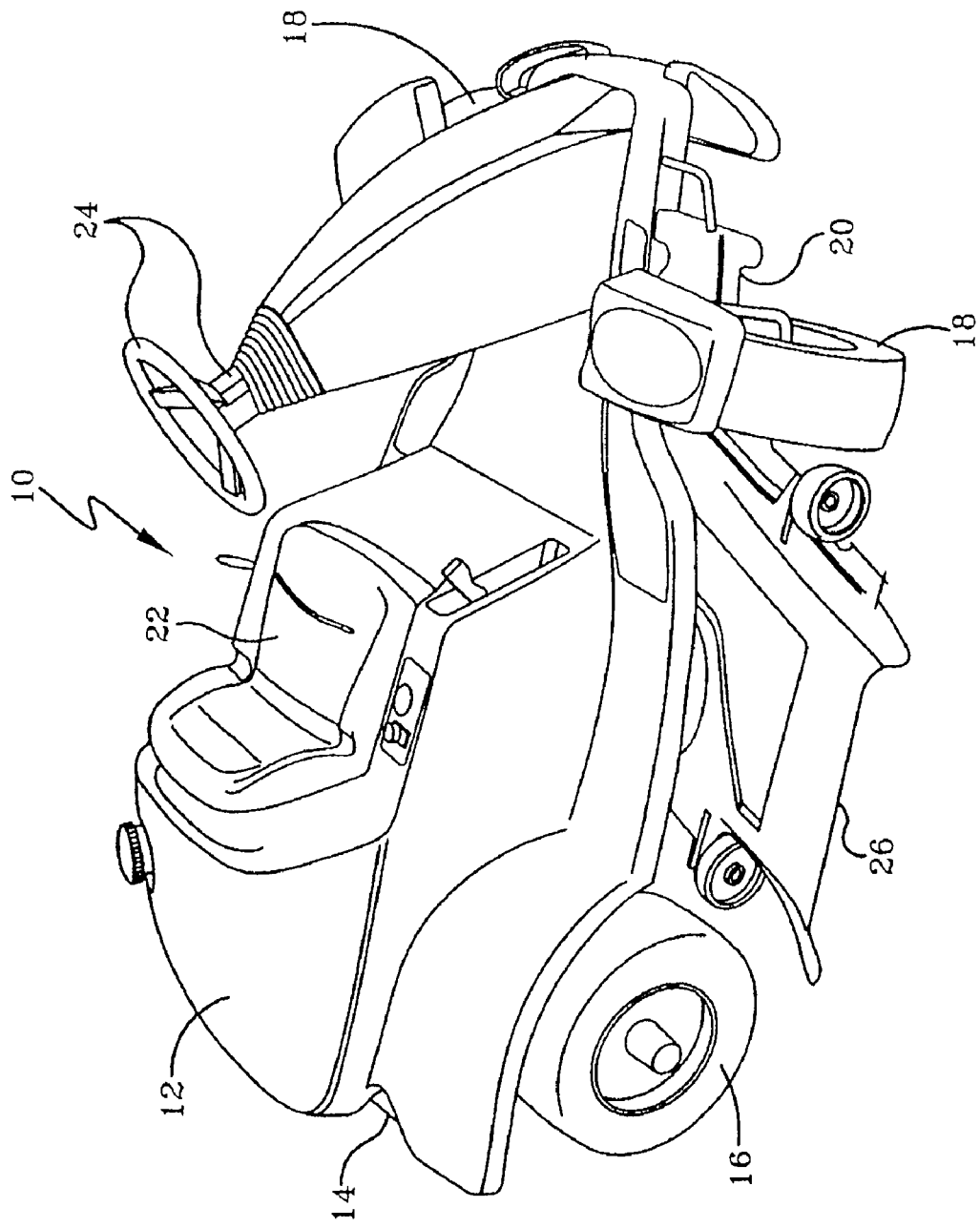
FIG. 1 is a perspective view of a lawn and garden type vehicle.

Referring now to the figures, FIG. 1 illustrates a vehicle 10, such as a lawn and garden tractor. The vehicle 10 includes a prime mover 12, such as an engine, that is mounted to a structural frame or chassis 14. The vehicle 10 includes drive wheels 16, such as left and right rear drive wheels that are coupled to the frame 14. The drive wheels 16 are operatively coupled to the engine 12 through a transmission system to provide locomotion to the vehicle 10. The vehicle 10 also has steerable structure 18, such as right and left front ground-engaging wheels, which may be non-driving wheels. Other embodiments of the vehicles have only one steerable structure (e.g., three-wheeled all-terrain vehicles). Furthermore, in some embodiments, steerable structures such as skis may be used instead of wheels.

The chassis 14 supports an operator station comprising a seat 22. Vehicle 10 also includes a mower deck 26 mounted to the vehicle 10 in any manner chosen with sound engineering judgment. The invention is applicable to other types of vehicles, including but not limited to utility vehicles, off road vehicles, tractors, golf carts, and even automobiles.

Figure 2A:
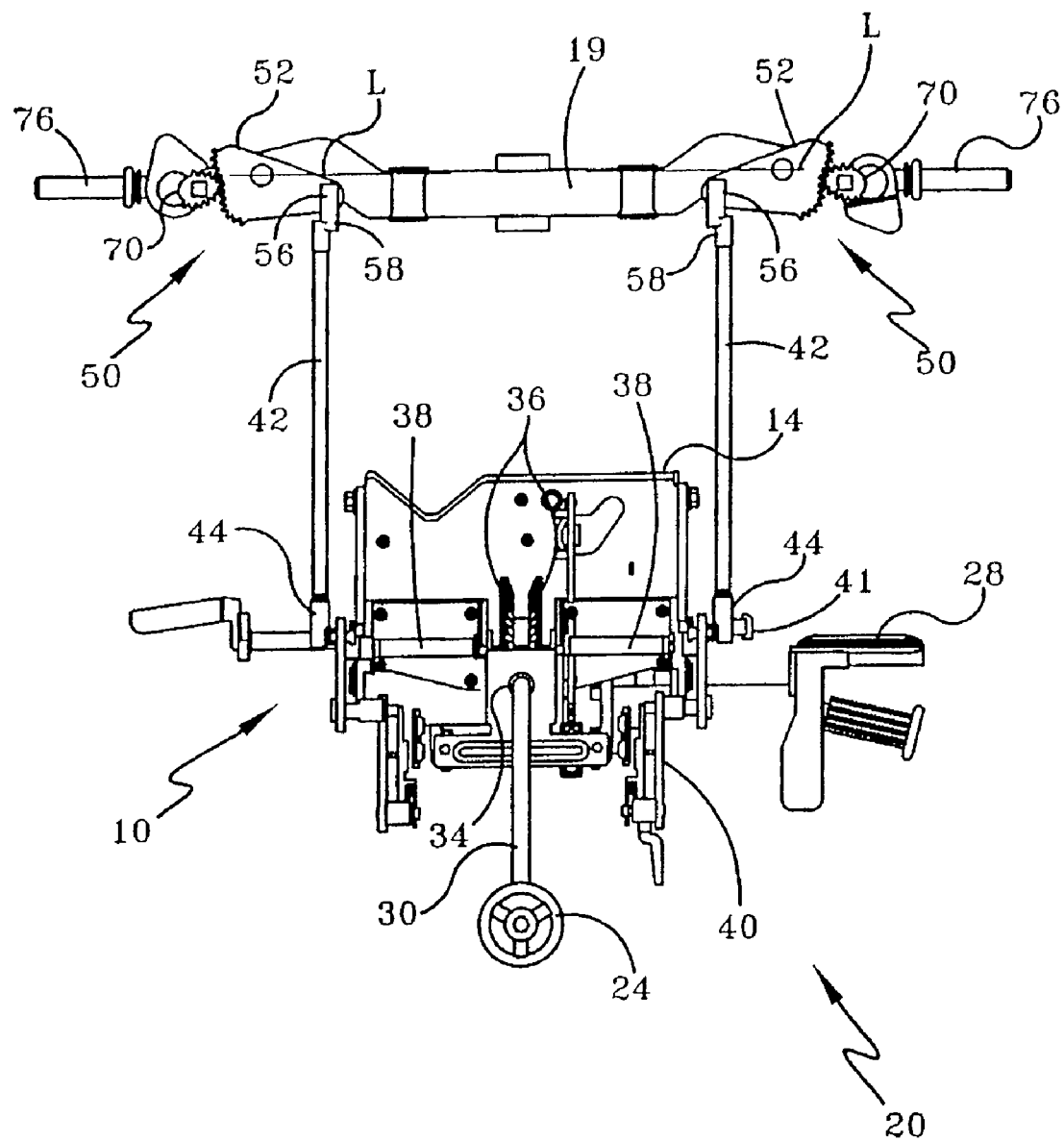
FIG. 2A is a top view of the steering assembly and front axle of the vehicle of FIG. 1.
Figure 2B:
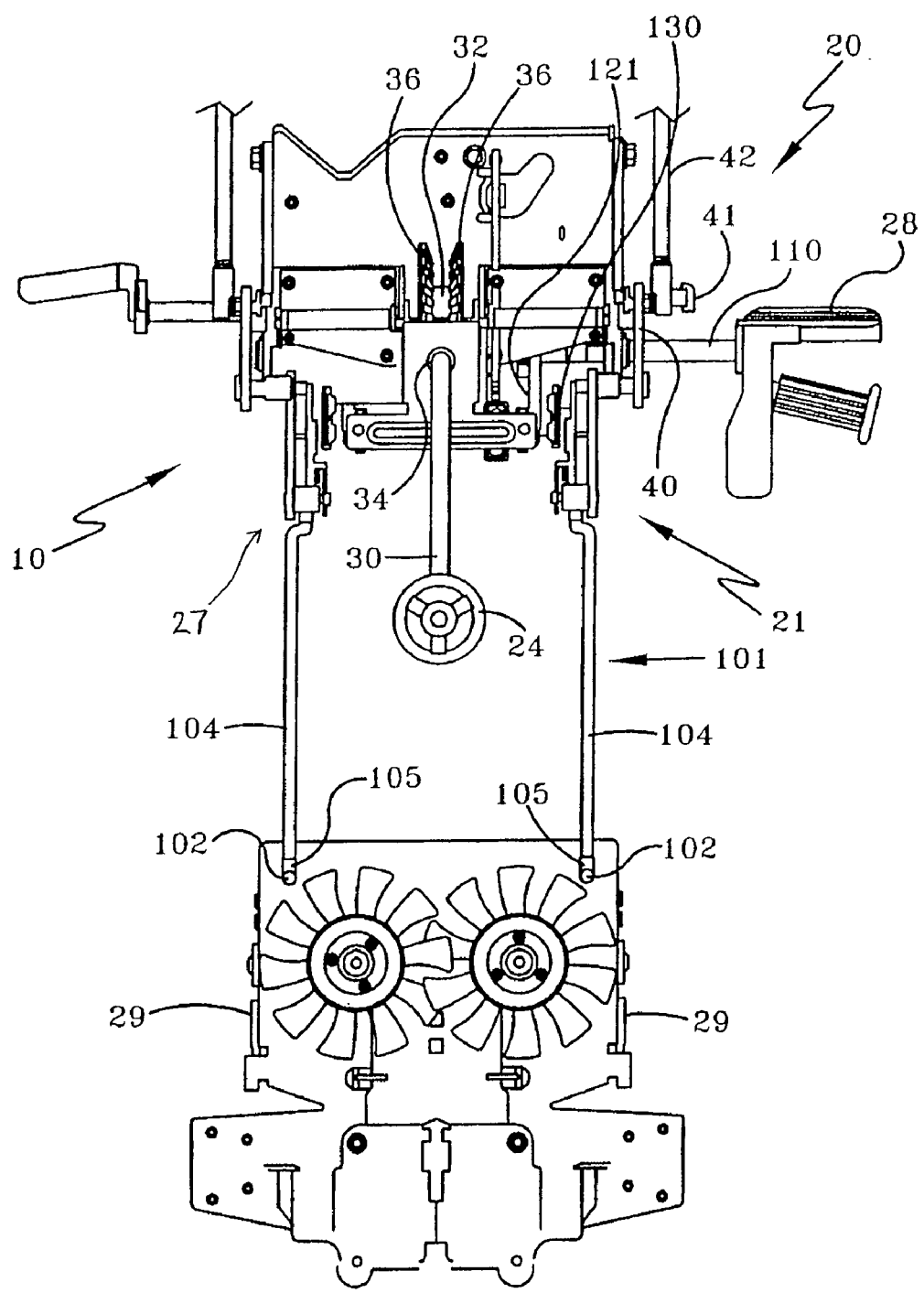
FIG. 2B is a top view of the speed control assembly and the transmission system of the vehicle of FIG. 1.

As shown in FIGS. 2A and 2B, the front wheels 18 are coupled to the frame of the vehicle through a pivotable connection to a front axle 19 mounted on the chassis 14. The front wheels 18 are also coupled to a steering assembly 20, which is configured to control the direction they turn as discussed more fully below. In the embodiment of the present vehicles shown in the figures, the front wheels are the steerable wheels 18 and the rear wheels are the drive wheels 16. However, one skilled in the art will understand that the rear wheels may be the steerable wheels and the front wheels may be the drive wheels without departing from the scope of the invention. Likewise, the front wheels may be both the steerable wheels and the drive wheels.

A steering input device 24 (which is part of the embodiment of the steering assembly 20 shown in the figures) and a speed input device 28 (which is part of the embodiment of the speed control assembly discussed below) are located near the seat 22 (FIG. 1) so that they are accessible to the operator of the vehicle. An operator may apply a steering input to the steering input device 24, which transfers the steering input to the steering assembly 20. Steering input device 24 may take the form of a conventional steering wheel. However, the steering input device 24 may be another suitable steering device, including, but not limited to, a steering rod or joystick (not shown).

The speed input device 28 provides a speed input to the balance of the speed control assembly 21, and (at least in part) regulates the forward and reverse speed of the vehicle 10. Speed input device 28 may take the form of a single pedal, such as a treadle pedal arrangement mounted on a single shaft. In such an embodiment, the speed input device 28 is rocked forward to select forward drive, or rocked backward to select reverse drive. The speed input device 28 may be biased toward a central position that corresponds to a neutral or stationary condition.

Vehicle 10 also includes an integration device 27 that is configured to integrate a steering input received by the steering assembly 20 via the steering input device 24 with a speed input received by the speed control assembly (discussed below) via the speed input device 28 to drive and steer the vehicle 10. The configurations of the present steering assemblies, speed control assemblies and integration devices allow the vehicle to make small- to zero-radius turns.

The left and right drive wheels 16 are driven through a transmission system that, in the depicted embodiment, comprises left and right drive units 29. Vehicle 10 includes a speed control assembly 21 that controls the direction and magnitude of rotation of the rear drive wheels 16. The drive units 29 may be transmissions of the continuously variable type, capable of providing a continuous range of ratios from forward to reverse. Examples of a suitable transmission utilizing a ratio varying-device, or variation, in conjunction with an epicyclic shunt gear to provide a geared neutral facility is described in International Application PCT/GB03/00332, published under WO 03/064892, and International Application PCT/GB03/02332, published under WO 03/100295, both of which are incorporated by reference for those descriptions. Alternately, the drive units 29 may be hydrostatic transmissions (HST) or electric motors, both of which are well known in the art. The drive units 29 may be used to independently drive the drive wheels 16.

The driver dictates the speed and direction of the vehicle 10 by manipulating the steering input device 24 and the speed input device 28, which transmit the steering and speed inputs received from the driver to the balance of the steering and speed control assemblies that are linked by the integration device 27. The manner in which the steering and speed control assemblies work together through the integration device to drive and steer the vehicle is described in more detail below. In the embodiment of vehicle 10 shown in the figures, the amount of torque that the rear drive wheels must produce to turn the vehicle 10 is reduced because front wheels 18 are steerable. In contrast, the drive wheels 16 of some conventional ZTR vehicles with non-steerable castor wheels must produce significant torque to cause the castor wheels to react and point in the desired direction. Furthermore, a certain amount of familiarity and skill is required to prevent skidding the inboard drive wheel and tearing the grass under the wheel.

Figure 3A:
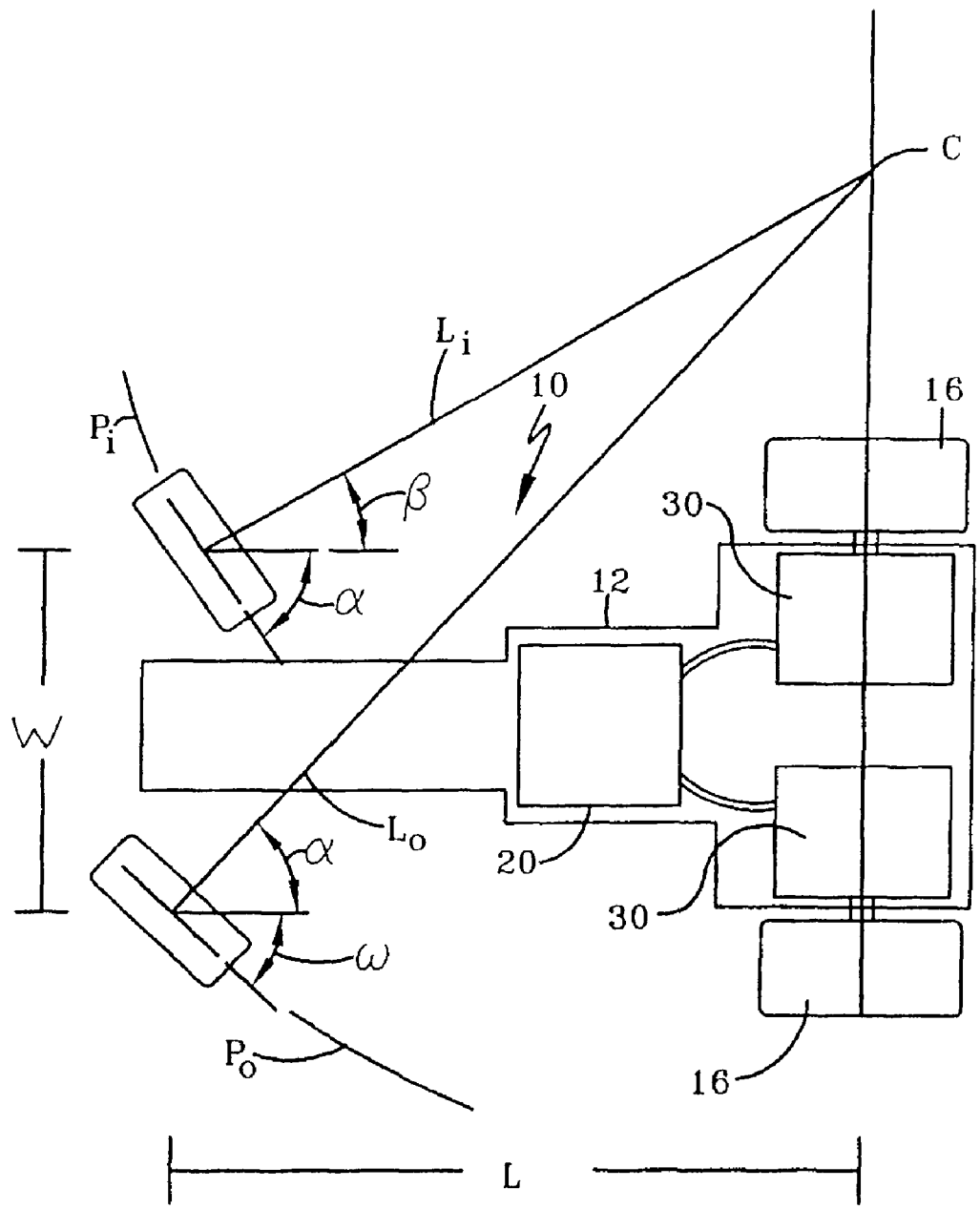
FIGS. 3A and 3B schematically illustrate the positions of the steerable, ground-engaging front wheels of an embodiment of the present vehicles.
Figure 3B:
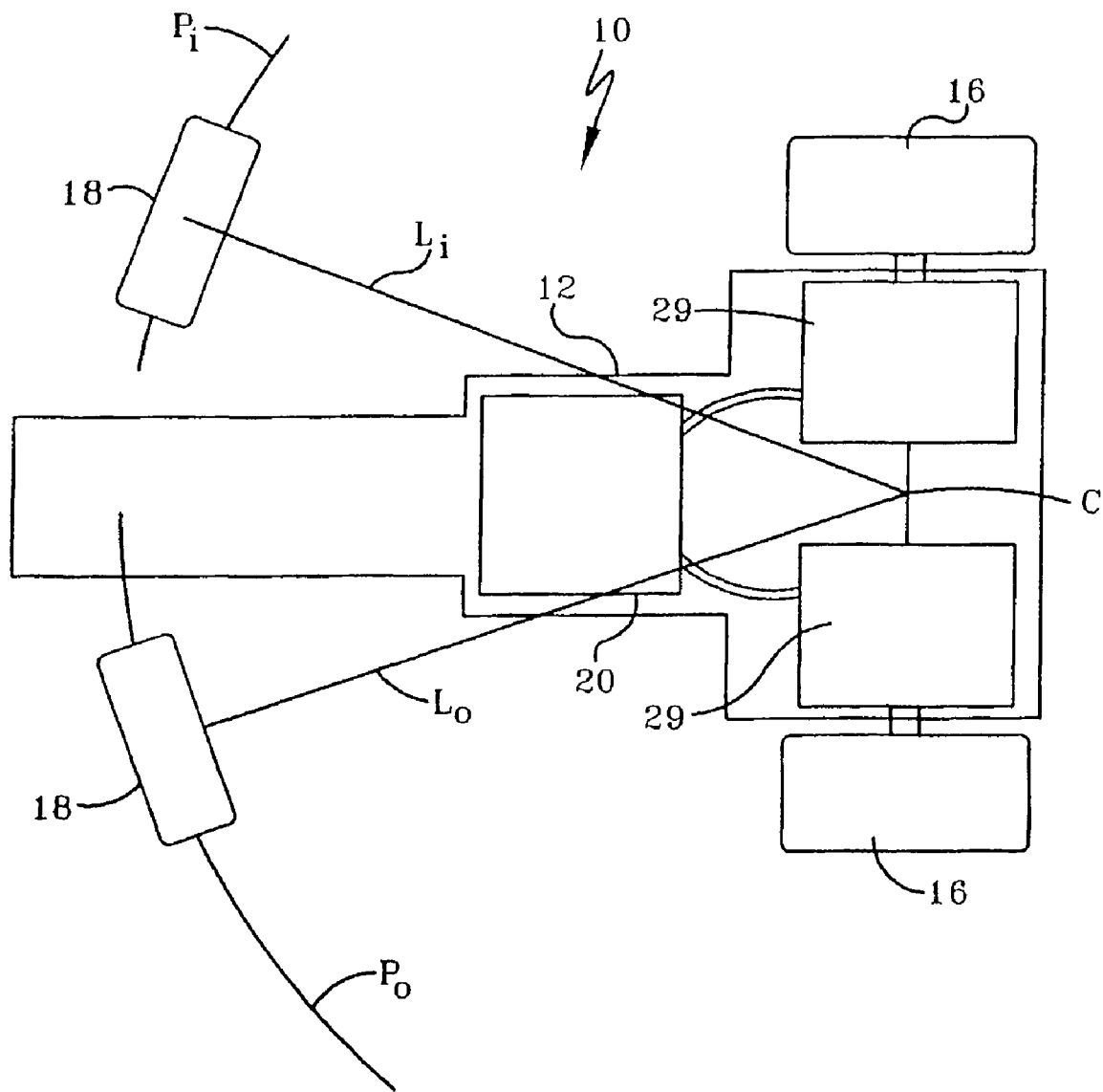

In the embodiment of vehicle 10 shown in the figures, the right and left drive wheels 16 are coupled to chassis 14 such that their direction is fixed and their rotational axes are in constant alignment. In contrast, the front steerable wheels 18 are coupled to the chassis 14 in a way that gives them the ability to change direction. FIGS. 3A and 3B are schematic top views of the vehicle 10 illustrating that it possesses the ability to achieve substantially true Ackermann steering. FIG. 3A shows a non-zero radius turn, and FIG. 3B shows a zero-radius turn. When front wheels 18 make the turn depicted in FIG. 3A, they take two distinct arc-like paths $P_i$ and $P_o$, which ideally will have a common center point C located along the axis that extends through the center of both drive wheels 16. Lines $L_i$ and $L_o$ extend from center point C and intersect the paths $P_i$ and $P_o$, respectively, of the two wheels at the rotational centers of the wheels. The use of a substantially-true Ackermann steering geometry (which can be achieved using some of the embodiments discussed below) can help to avoid scrubbing rubber from the tire tread on the outboard wheel or damaging vegetation under the front wheels.

Steering Assembly 20

Aspects of steering assembly 20 are depicted in, e.g., FIGS. 2A-12. One function of the steering assembly 20 is to couple the steering input device 24 to the front steerable wheels 18 to aid in guiding vehicle 10. Another function of the steering assembly 20 is to provide a steering input to the integration device 27, which can coordinate that steering input with a speed input received through the speed input device 28. Another function of the steering assembly 20 is its ability to turn the vehicle 10, even in a zero turning radius mode (or a small turning radius mode), while receiving an input from a conventional steering input device such as a steering wheel.

In one embodiment, the steering assembly 20 includes a steering shaft 30 extending downwardly from the steering input device 24 and terminating in a toothed steering pinion 32. The steering shaft 30 is rotatably coupled to the chassis 14 with a bushing 34 or any other suitable means using sound engineering judgment. The steering shaft 30 and pinion 32 take the steering input received through the steering input device 24 and take part in transmitting it to front wheel assemblies 50, which then convert the steering input into desired steering angles of the front wheels 18, as explained below. In one embodiment, the coupling between the steering shaft 30 and the front wheel assemblies is accomplished using, in part, left and right bevel gears 36. The pinion 32 is positioned between and simultaneously engages the left and right bevel gears 36 such that rotation of the pinion 32 causes simultaneous rotation of the left and right bevel gears 36. The steering input device 24 and steering pinion 32 may be rotated through about 120 degrees of movement. For example, the steering input device 24 may be selectively rotated 60 degrees in a first direction with respect to a neutral steering position and 60 degrees in a second direction. However, the steering input device 24 and steering pinion 32 may be configured for rotation through any range of angles suited to a given application.

Rotating the steering input device 24 and pinion 32 in a first direction causes one of the bevel gears 36 to rotate forward or toward the front of the vehicle 10 and the other bevel gear 36 to rotate backward or toward the rear of the vehicle 10. The left and right bevel gears 36 are coupled to left and right jack shafts 38, respectively. Preferably, the left and right sides of the steering assembly 20 are substantially identical but mirror images of each other. Accordingly, only the right side of the steering assembly 20 will be described below.

Figure 4:
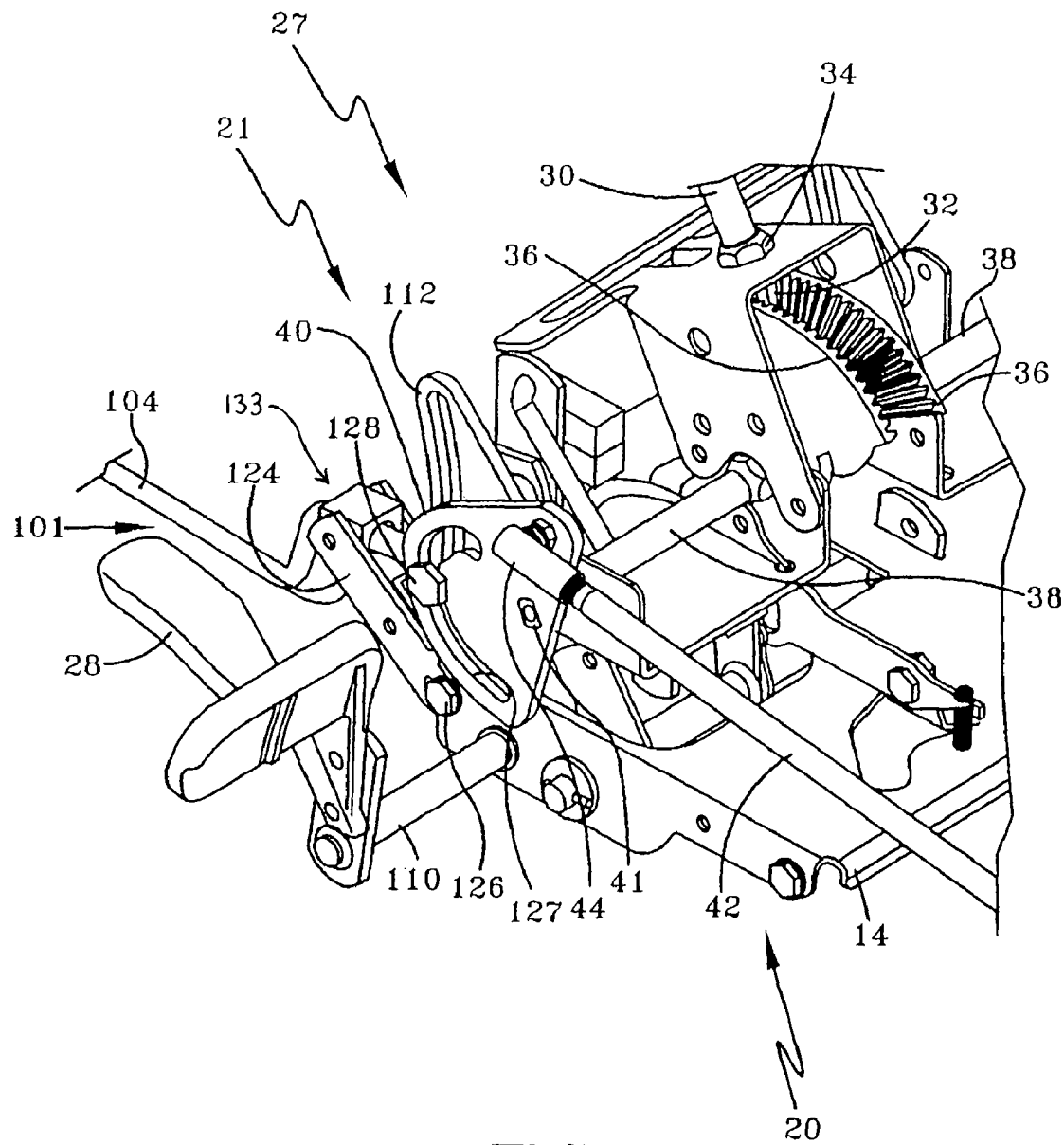
FIG. 4 is a partial perspective view of the steering and speed control assemblies of the vehicle of FIG. 1 coupled together with an integration device.

As shown FIG. 4, the jack shaft 38 is positioned generally orthogonal to the steering shaft 30 and is coupled to a steering mechanism 40 at its outer end. In one embodiment, the steering mechanism is a steering cam 40. The steering cam 40 is coupled to the jack shaft 38 so that it may be rotated by movement of the jack shaft 38 in first and second directions about pivot 41, through which the axis of the jack shaft 38 extends. An outer portion of the steering cam 40 is coupled to a drag link 42. In the FIG. 4 embodiment, when the steering cam 40 is rotated in a clockwise direction (which would occur during an outboard turn for the depicted steering cam), the drag link 42 moves forward or toward the front of the vehicle 10, and when the steering cam 40 is rotated in a counterclockwise direction (which would occur during an inboard turn), the drag link 42 moves toward the rear of the vehicle 10. (The direction the drag link 42 moves depends on the position of the drag link 42 with respect to the pivot 41.) Thus, rotation of the steering input device 24 is transmitted into forward or aft movement of the drag link 42. Preferably, the drag link 42 is coupled to the steering cam 40 with a suitable linkage 44, such as a ball linkage. The drag link 42 is also coupled to a front wheel assembly 50, which converts the steering input received by the steering input device 24 into a steering angle of the front wheel 18. More specifically, the front wheel assembly 50 translates the position of the support structure about which front wheel 18 rotates in response to the steering input received through the drag link 42 from the steering input device 24.

Steering input device 24 may be coupled to front wheel assemblies 50 in other ways in other embodiments using sound engineering judgment.

Figure 5:
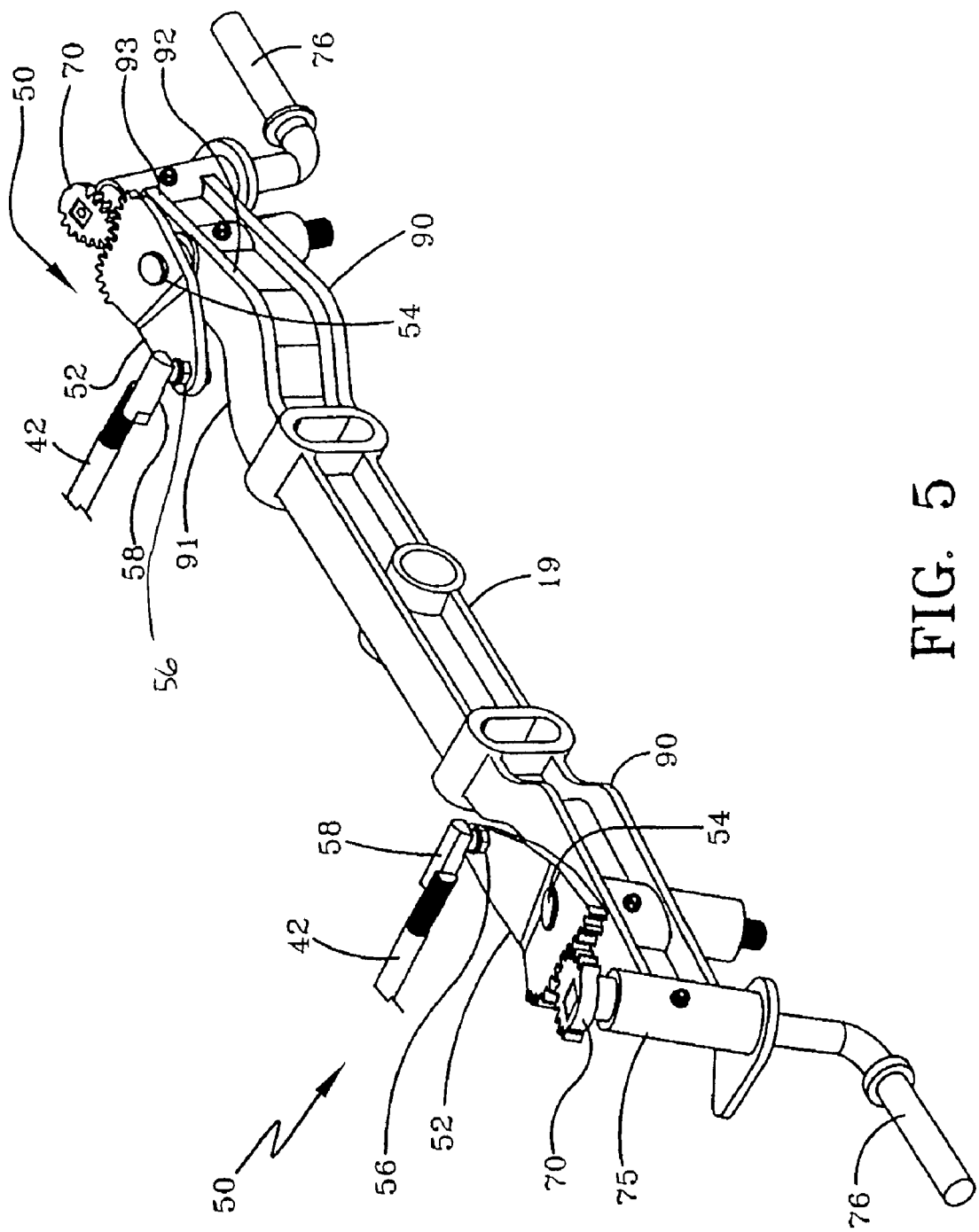

Turning to FIG. 5, the front wheel assembly 50 includes a steering or driving gear 52 pivotably mounted on a post 54 received in the front axle 19. The steering gear 52 has a linking portion 56 to which the drag link 42 may be coupled with a suitable connector, such as a ball connector 58. As best seen in the enlarged view of FIG. 6A, the steering gear 52 has teeth 60, one or more of which mesh with one or more of the teeth 62 of wheel or driven gear 70. The wheel gear 70 is coupled to the front wheel 18 in order to steer the front wheel to the left or right. In one embodiment, the wheel gear 70 is mounted on a king pin 74 so that rotation of the wheel gear 70 causes rotation of the king pin 74. In the illustrated embodiment, the king pin 74 has a square head 75 about which the wheel gear 70 rotates. The king pin 74 is pivotably coupled to the chassis 14 of the vehicle 10 by virtue of being rotatably mounted to the front axle 19 using a suitable bearing, bushing or the like 79. A pivot shaft 76 extends generally orthogonal to the king pin 74, and the front wheel 18 is rotatably mounted on the pivot shaft 76.

Figure 6A:
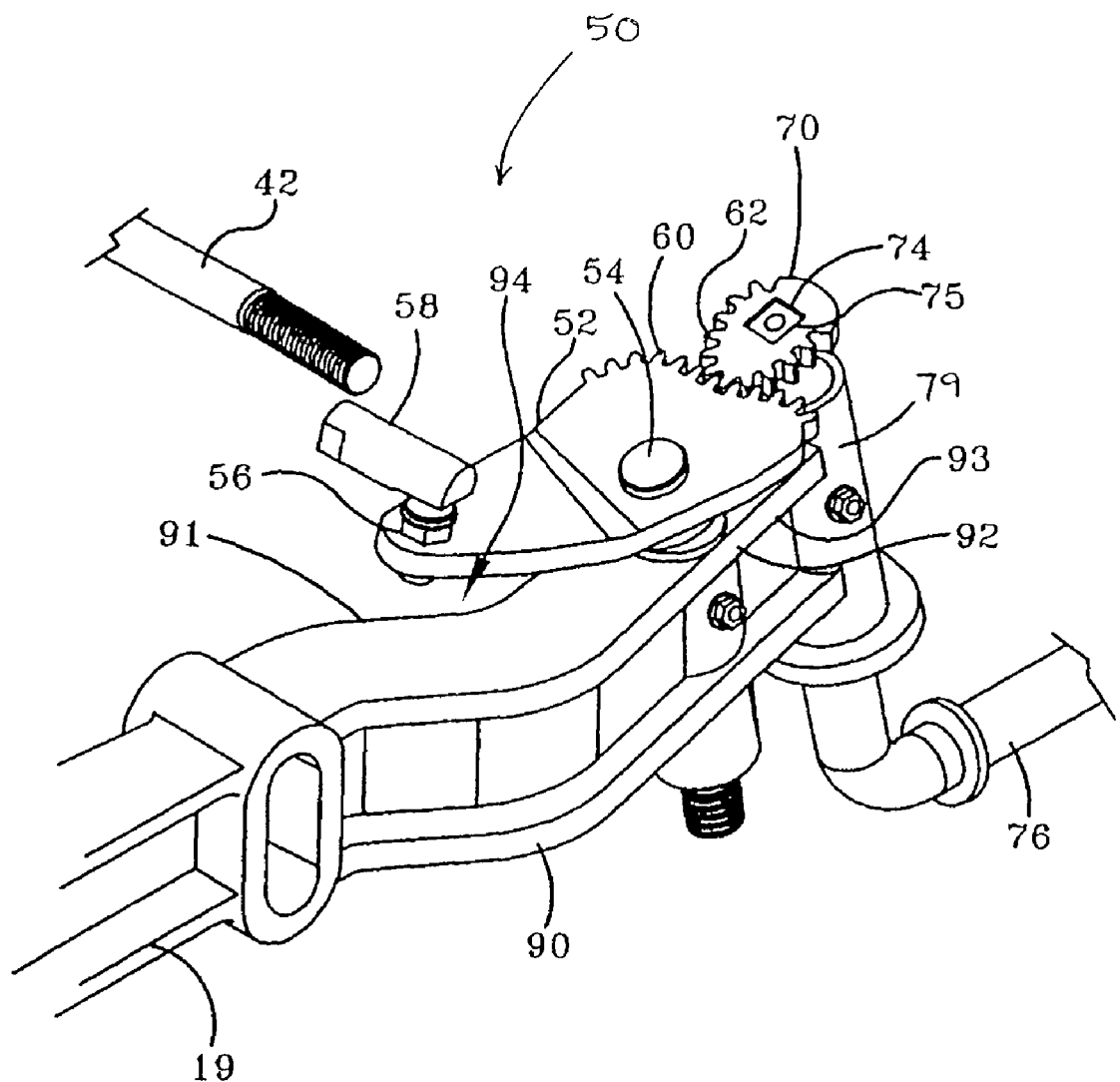
FIG. 6A is an enlarged partial perspective view of one of the front wheel assemblies of the vehicle of FIG. 1.

As FIG. 6A shows, the steering gear 52 can pivot about post 54 due to the force transmitted through the drag link 42 as a result of the steering input received through the steering input device 24. The rotation of steering gear 52 is transmitted to the wheel gear 70 to change the direction of the front wheel 18. The front wheel assemblies 50 enable the two front wheels 18 to be driven in substantially true Ackermann steering geometry.

In one embodiment, the linking portion 56 to which the drag link 42 is coupled is positioned inward of the post 54 about which the steering gear 52 pivots and to the rear of a line L connecting the two posts 54, as best seen in FIG. 2A. Line L is generally parallel to the transverse axis of the vehicle 10 and perpendicular to the longitudinal or major axis of the vehicle 10. During a turn, the drag link 42 on the inboard side moves in a first direction (e.g., to the rear) while the drag link 42 on the outboard side of the turn moves in a second direction (e.g., to the front). Movement of the inboard drag link 42 causes the linking portion 56 to move further to the rear with respect to the post 42 and away from line L as the steering gear 52 pivots around the post 54. On the outboard side, the outboard drag link 42 moves forward, causing the linking portion 56 to move forward toward the front of the vehicle as the steering gear 52 pivots.

At first, the outboard linking portion 56 moves closer to the line L. Continued rotation of the steering input device 24 may cause the linking portion 56 to pass through the line L and then move away from, and forward of, line L. Steering assembly 20, and more specifically each wheel assembly 50, is configured such that the magnitude of the component of the movement of the drag link 42 that causes rotation of the steering gear 52 increases as the linking portion 56 moves away from line L. Thus, the movement of the drag link 42 on the inboard side in the rear direction causes a larger rotational movement of the steering gear 52 on the inboard side than the forward movement of the drag link 42 on the outboard side. Therefore, the inboard front wheel 18 rotates faster and further to contribute to the substantially true Ackermann steering geometry.

As shown in FIGS. 5 and 6A, the front axle 19 is preferably not straight. Instead, it has non-linear portions 90 near either end that have a forward slanting portion 91 joined to a rear slanting portion 92. Each rear slanting portion 92 leads to an outer portion 93 of the axle 19 located near where the front wheel 18 is mounted. Each non-linear portion 90 of the front axle 19 forms a pocket 94 to the rear of the front axle 19 that receives the front steerable wheel 18 on the inward side during an extreme turn. The pocket 94 allows the inward front steerable wheel 18 to be turned greater than 90 degrees, and preferably between 100 and 120 degrees as illustrated in FIG. 3B, without having the rear portion of the front wheel 18 on the inside of the turn contact the front axle 19.

Figure 6B:
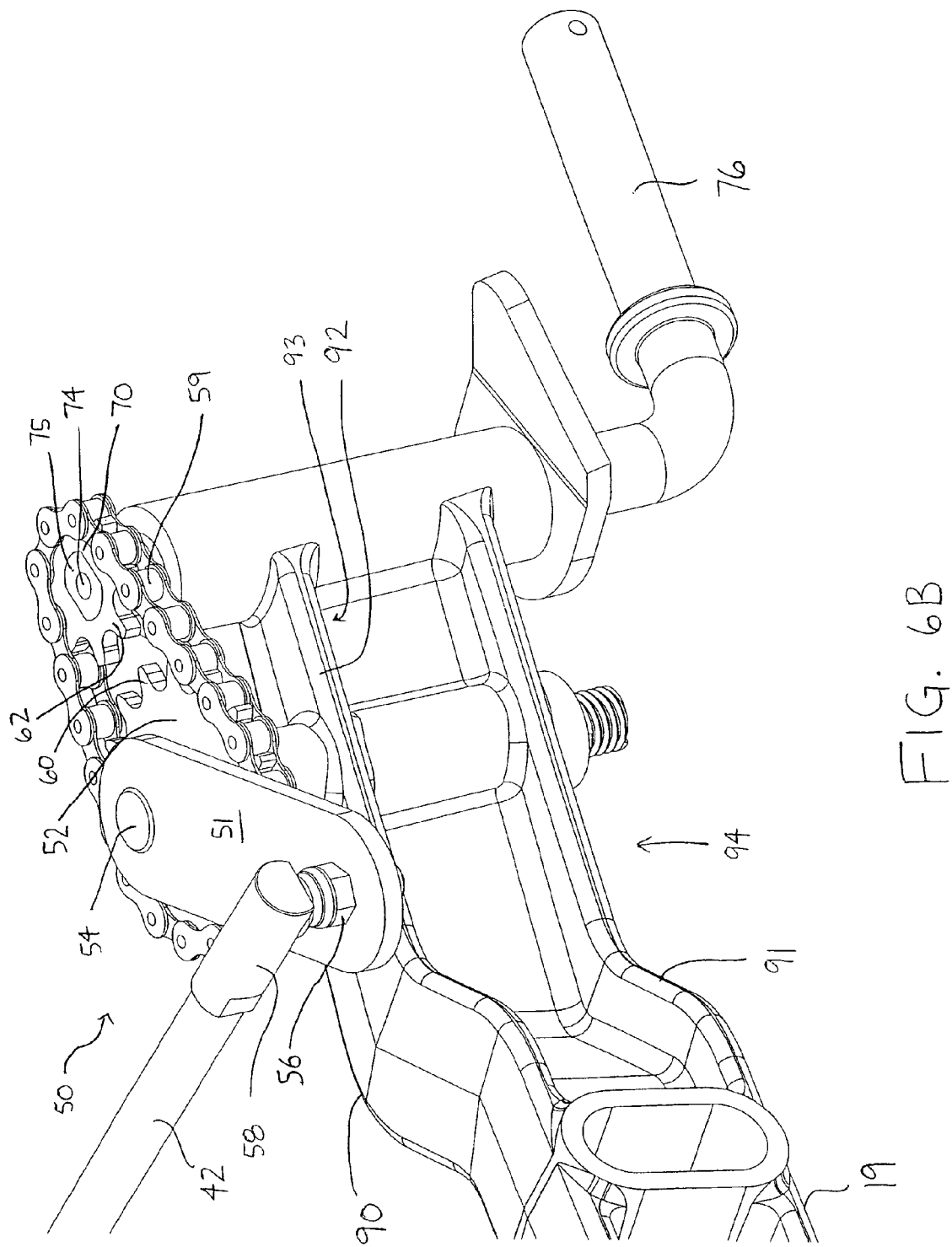
FIGS. 6B-6E are enlarged partial perspective views of different embodiments of front wheel assemblies that may be used with the vehicle of FIG. 1.

Other gear arrangements besides those shown in FIGS. 5 and 6A may be used for front wheel assemblies 50. For example, FIGS. 7 and 9A-9C, discussed below, show other non-circular gears that may be used for front wheel assemblies 50. Some additional alternatives are shown in FIGS. 6B-6E. These figures depict an enlarged partial view of the front right wheel assembly 50. In contrast to FIG. 6A, the pocket 94 of front axle 19 in each of FIGS. 6B-6E is facing the viewer of the figure, and the drag link 42 and ball connector 58 are swiveled away from the viewer (such as to be used with a steering pinion oriented in front of the front axle 19), though if used with the version of steering assembly 20 shown in FIG. 2A would point back toward the viewer. FIG. 6B shows an example of a front wheel assembly 50 comprising a driving gear 52 and a wheel gear 70 that are both circular and coupled with a chain 59. The post 54 on which driving gear 52 is mounted extends up through lever 51. The lever 51 may be coupled to the driving gear 52 using any suitable means, such that rotation of the lever 51 about the axis of the post 54 also causes a rotation of the steering gear 52. The angle of the lever 51 with respect to the "straight ahead" position of the driving gear 52 can be set (taking into account other relevant factors, such as the coupling between the driving and driven gears, and the manner in which the front steering assemblies are coupled to each other) to provide substantially true Ackermann steering (as is true of embodiments shown in FIGS. 6C and 6D).

Figure 6C:
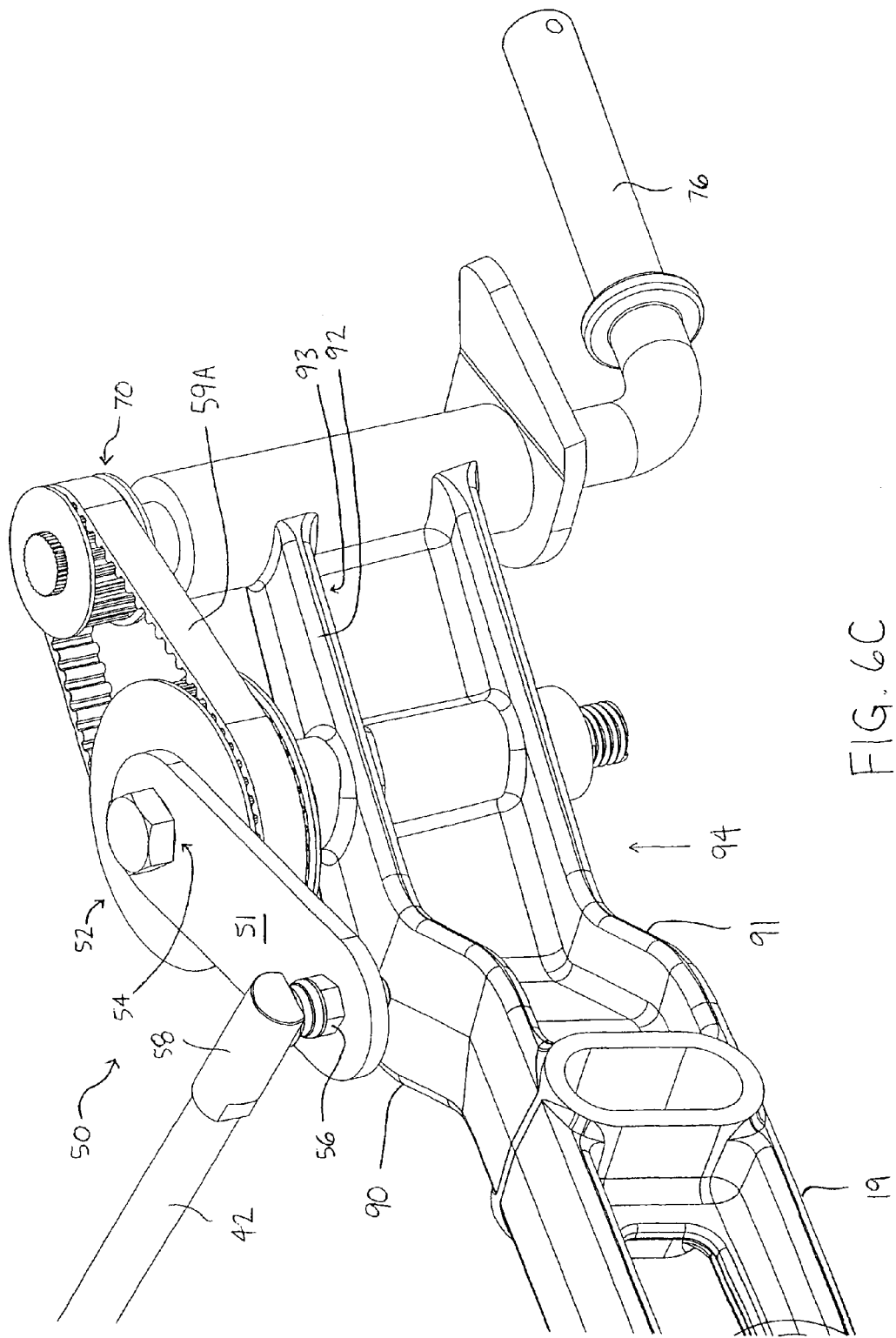

FIG. 6C shows an example of a front wheel assembly 50 comprising a driving gear 52 and a wheel gear 70 that are both circular and coupled with a belt 59A.

Figure 6D:
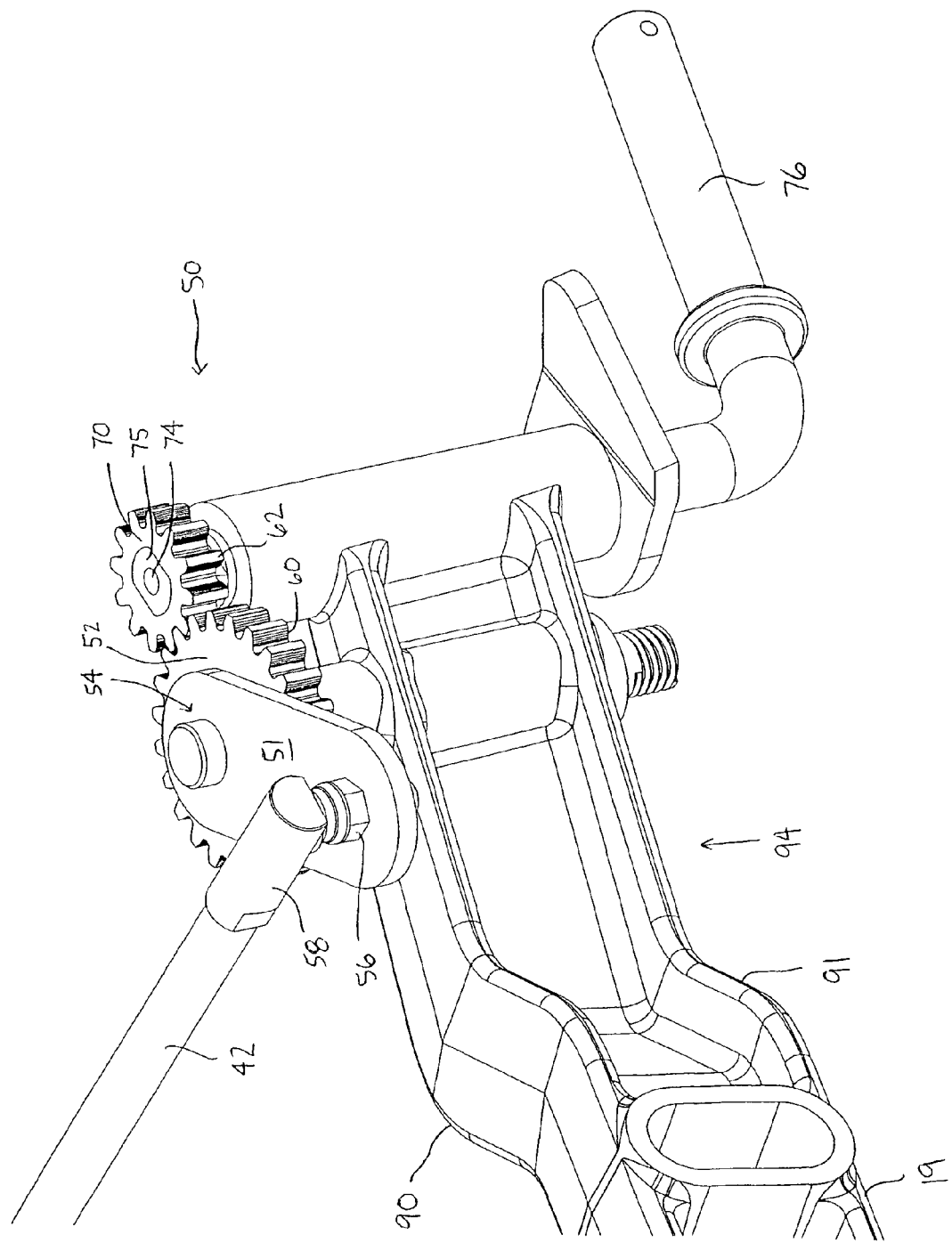

FIG. 6D shows an example of a front wheel assembly 50 comprising a driving gear 52 and a wheel gear 70 that are both circular. The two gears are coupled by virtue of one or more of the teeth 60 of the driving gear meshing with one or more of the teeth 62 of the driven gear.

Figure 6E:
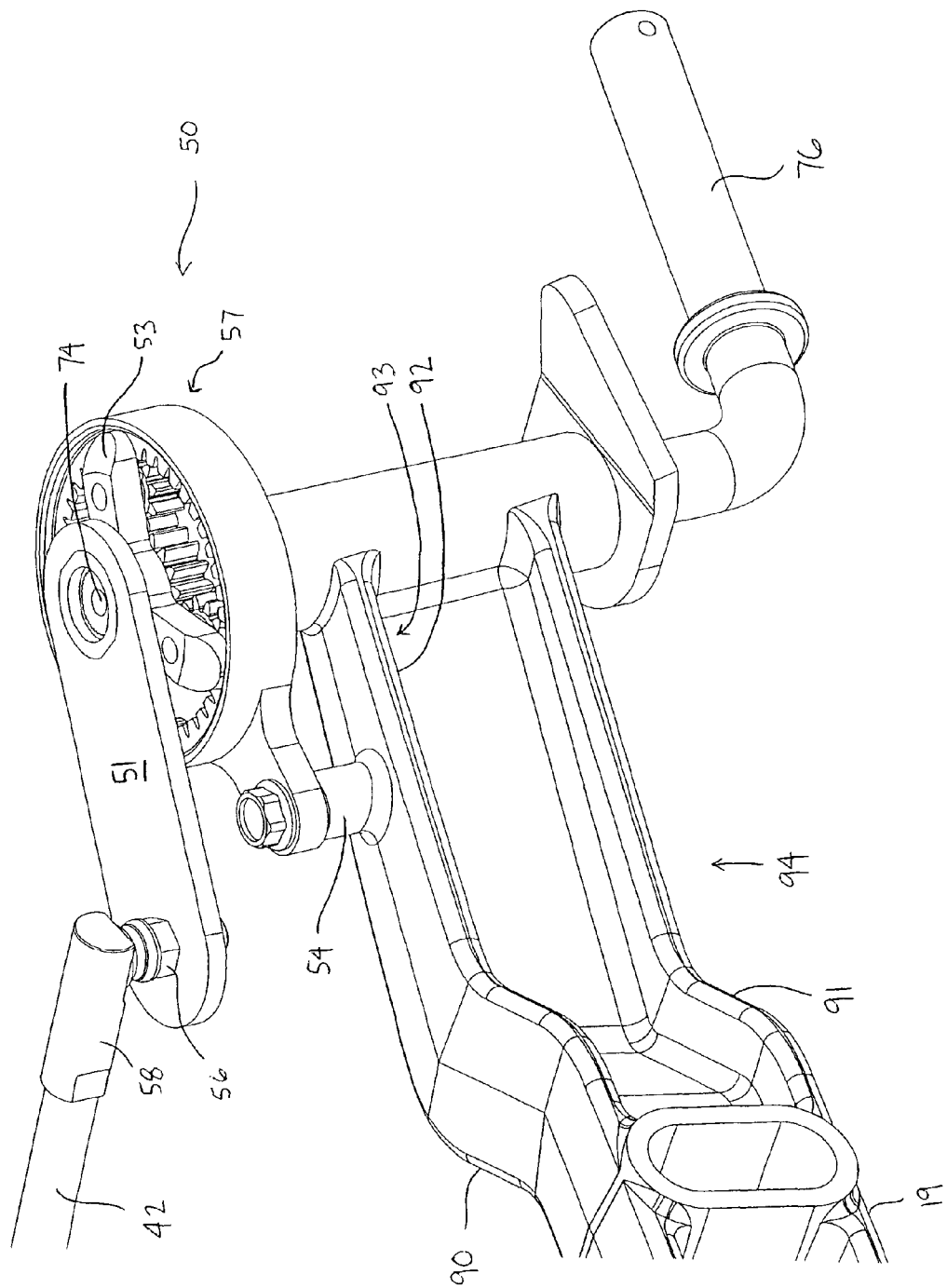

FIG. 6E shows another embodiment of front wheel assembly 50. Lever 51 is coupled to the planet carrier 53 of planetary gear 57. Planet carrier 53 is coupled to the king pin, which controls the articulation of the pivot shaft 76. The ring 71 of the planetary gear 57 is coupled through an arm to the post 54, which is shorter in this embodiment and does not extend through to the bottom of the front axle 19. The angle of the lever 51 with respect to the "straight ahead" position of the planet carrier 53 can be set (taking into account other relevant factors, such as the orientation of the planet carrier relative to the king pin, and the manner in which the front steering assemblies are coupled to each other) to provide substantially true Ackermann steering.

Figure 7:
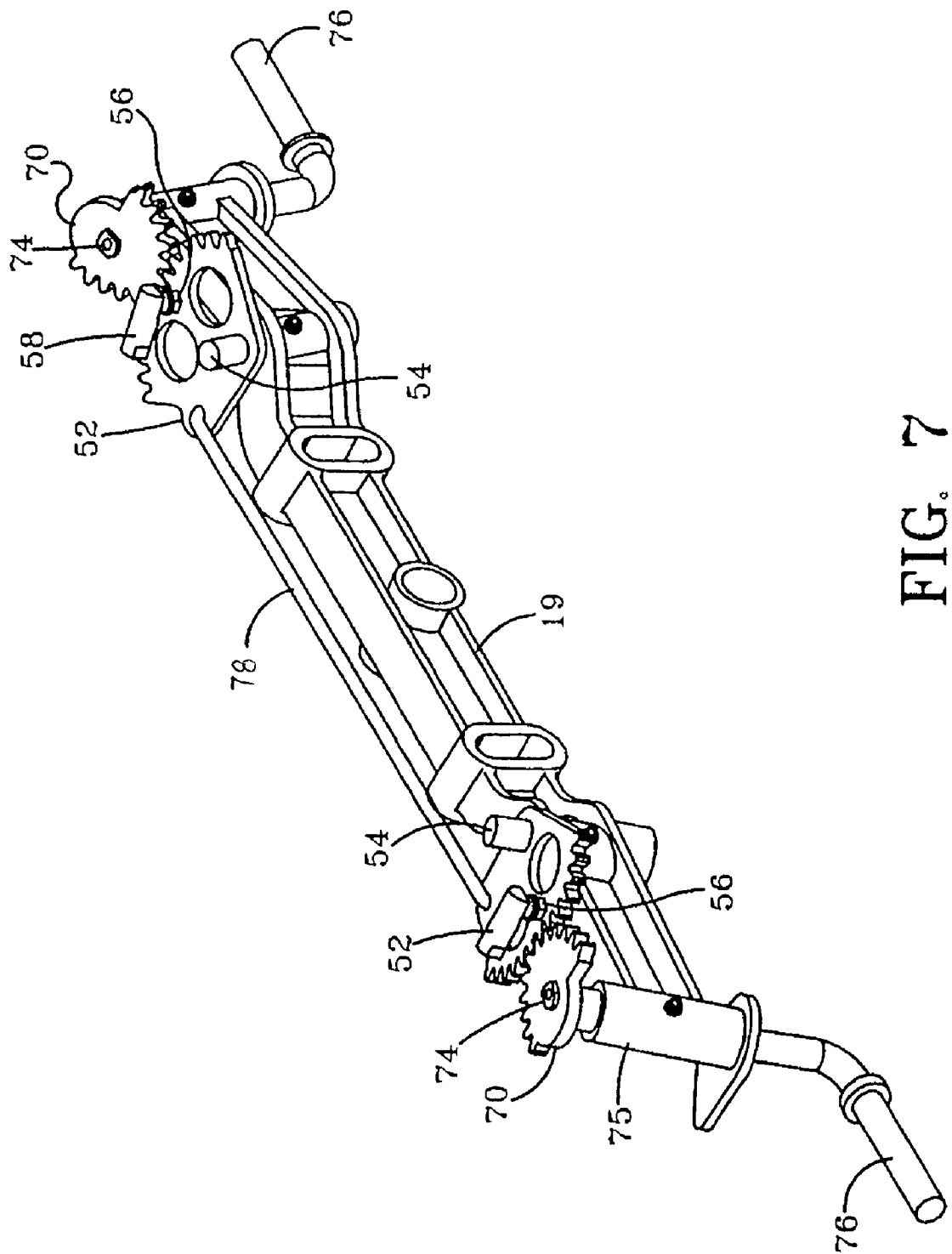
Figure 9A:
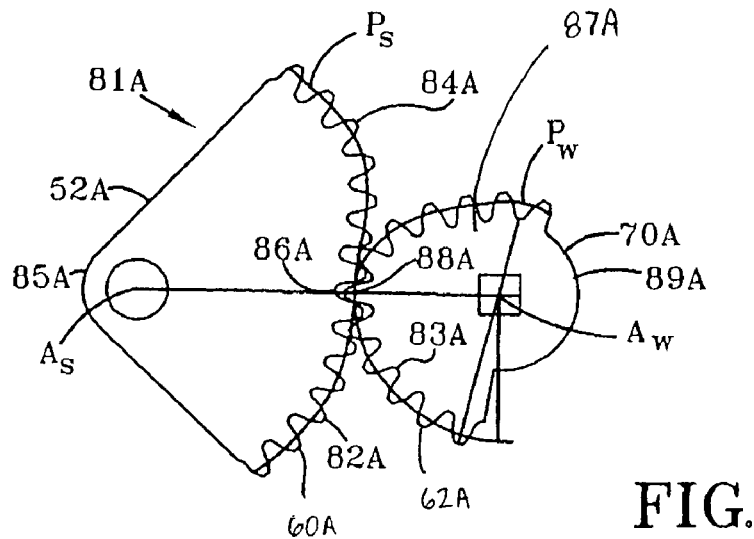
FIG. 9A-9C illustrate views of an alternate embodiment of a gear pair used with the front wheel assembly of FIG. 7.
Figure 9B:
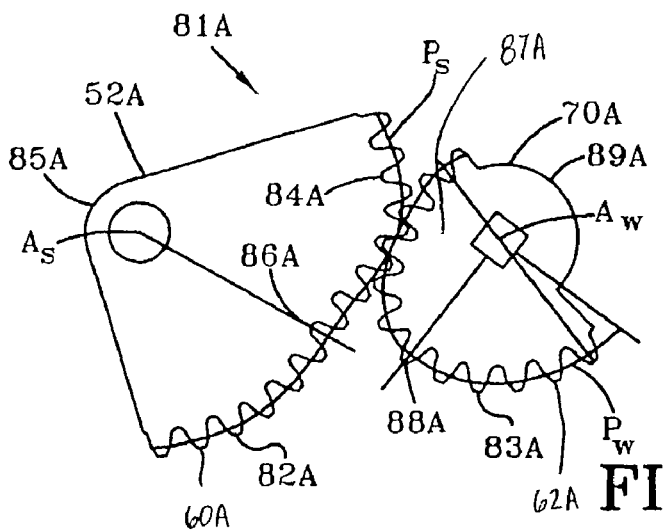
Figure 9C:
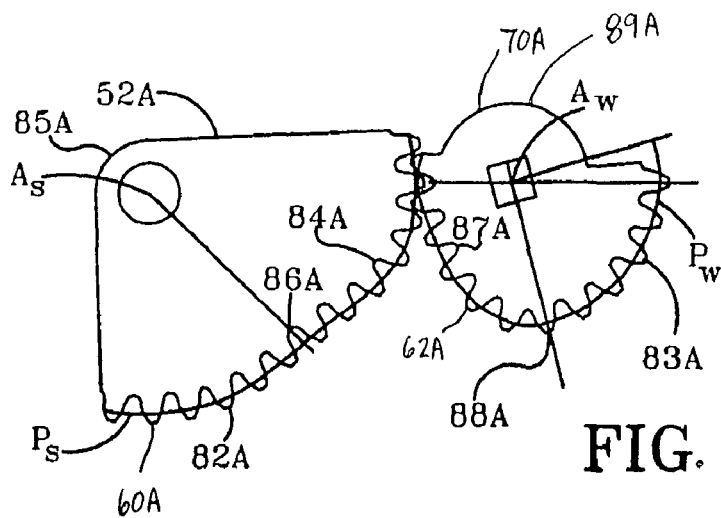

FIG. 7 illustrates another embodiment of the wheel assembly 50. In this embodiment, the linking portion 56 is even with the post 54 about which the steering gear 52 pivots when in the neutral position so that the linking portion 56 and the post 54 are aligned parallel to the transverse axis of the vehicle 10. In this embodiment, the drag links 42 on either side of the vehicle move in opposite directions but cause the same magnitude of rotation of the two steering gears 52. In this embodiment, the shape of the gears 52 and 70 cause the inboard front wheel 18 to rotate faster and further to provide the desired Ackermann steering geometry because they are configured as shown in FIGS. 9A-9C and described below. Preferably, a front tie bar 78 couples the two wheel assemblies 50 together to provide structural support. Such a tie bar can be used to couple the two wheel assemblies shown in the FIGS. 5 and 6A-6E embodiments as well.

One purpose of the front tie bar is to aid in distributing loads, such as when one of the front wheels 18 hits a curb or other object. The force from striking the object can be distributed through both wheel assemblies 50 through the front tie bar and then to the chassis 14. This reduces the shock that is transmitted back through the steering system to the steering input device 24 and felt by the operator.

Non-Circular Gears

Figure 8A:
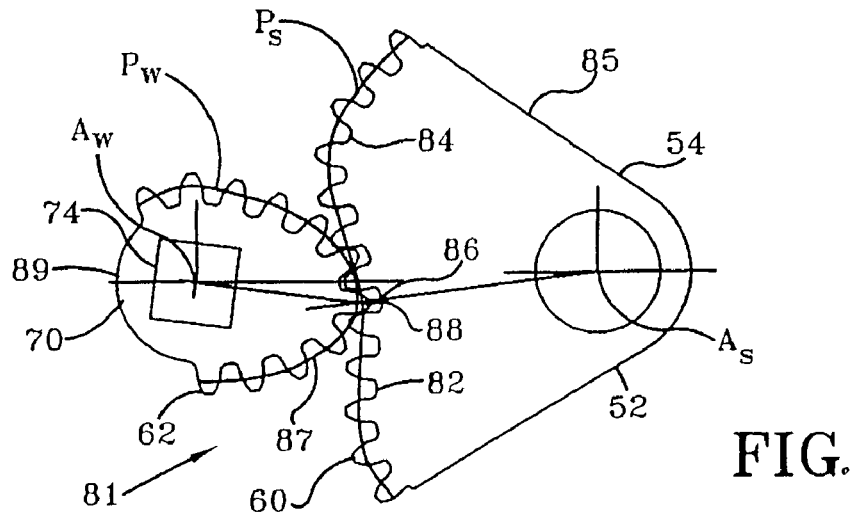
FIGS. 8A-8C illustrate views of a gear pair used with the front wheel assembly of FIG. 6.
Figure 8B:
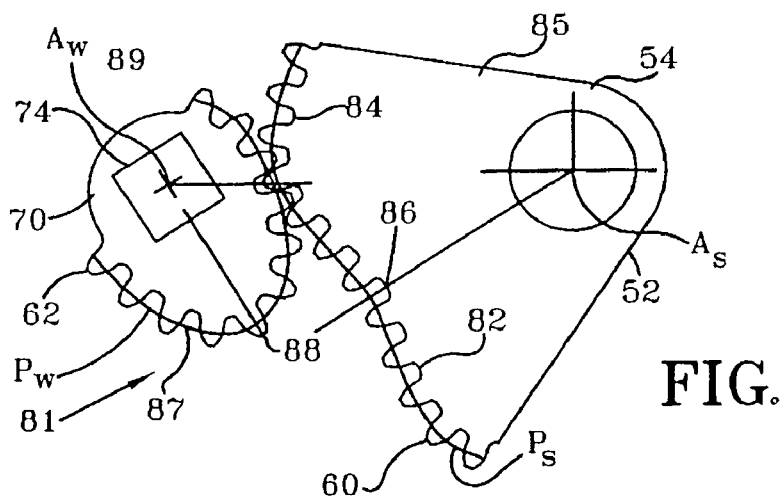
Figure 8C:
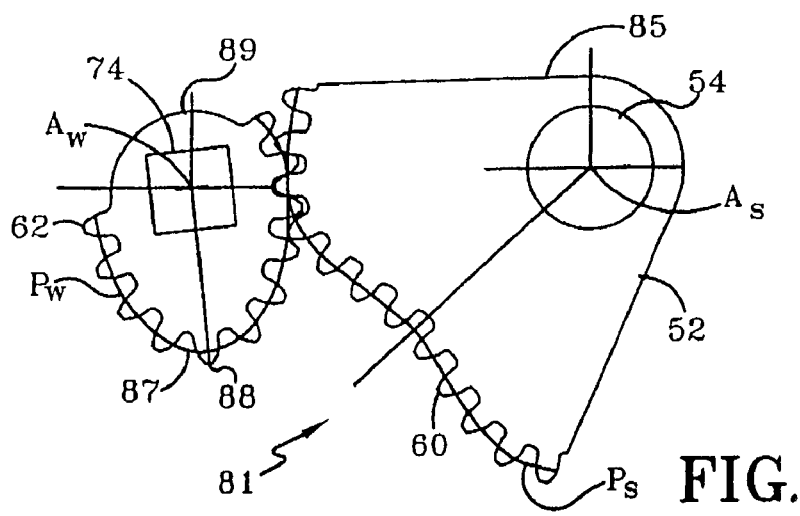

Turning now to FIGS. 8A-8C, in one embodiment, the steering gear 52 and the wheel gear 70 combine to form a non-circular gear pair 81. In one preferred embodiment, the steering gear 52 has a shape comprising two spline portions 82, 84 connected by a valley portion 86. As seen in FIG. 8A, the distance from pivot axis $A_s$, of the steering gear 52 to the pitch line $P_s$ of the steering gear 52 in the spline portions 82, 84 is greater than the distance from the pivot axis $A_s$, of the steering gear 52 to the pitch line $P_s$ of the steering gear 52 in the valley portion 86. The rear portion 85 of the steering gear 52 can have any shape selected to accomplished the desired steering, such as the shape depicted in FIG. 6A. The wheel gear 70 has a substantially parabolic shaped portion 87 having a vertex 88. The rear portion 89 of the wheel gear 70 can have any shape selected to accomplish the desired steering, such as the shape depicted in FIGS. 8A-8C.

In the neutral or straight-ahead position, at least one or more of the teeth 62 near the vertex 88 of the parabolic portion 87 of the wheel gear 70 engage at least one or more of the teeth 60 in the valley portion 86 of the steering gear 52 as illustrated in FIG. 8A. As the steering gear 52 is rotated around its axis $A_s$, one of the spline portions 82, 84 engages the side of the parabolic portion 87 as the driven wheel gear 70 rotates around its axis $A_w$, as illustrated in FIGS. 8B and 8C.

In one embodiment, the spline portions 82, 84 of the steering gear have a different number of teeth. In the illustrated embodiment, the spline portion 82 has five teeth 60 and the spline portion 84 has seven teeth 60. The spline portion 84 has additional teeth 60 that extend further around the steering gear 52 on the side that engages the wheel gear 70 during an inward turn. The inward front wheel 18 must turn through a greater angle than the outboard front wheel 18 to meet the Ackermann geometry. Accordingly, the spline portion 82 that engages the wheel gear 70 when making a turn on the outward side does not need as many teeth 60 because the outward front wheel 18 does not turn as far.

The non-circular shapes of the steering gear 52 and the wheel gear 70 (and, more specifically, the non-circular shapes of the toothed portions of the steering and wheel gears) enable the gear combination to have a non-uniform gear ratio. In the neutral position, the ratio of the distance between the pivot axis $A_s$, of the steering gear 52 to the pitch line $P_s$ of the steering gear 52 to the distance between the pivot axis $A_w$ of the wheel gear 70 and the pitch line $P_w$ of the wheel curve is preferably between about 1.0:1.0 and 2.0:1.0, and more preferably about 1.5:1.0. In the extreme turning position illustrated in FIG. 8C, the ratio of the distance between the pivot axis $A_s$ of the steering gear 52 to the pitch line $P_s$, of the steering gear 52 to the distance between the pivot axis $A_w$. of the wheel gear 70 and the pitch line $P_w$ of the wheel curve is preferably between about 2.0:1.0 and 4.0:1.0, and more preferably about 3.0:1.0. However, any gear ratio suited to the application may be chosen. Thus, in a preferred embodiment, the output of the gear ratio may range from 1.0:1.0 to 4.0:1.0, and more preferably from 1.5:1.0 to 3.0:1.0 as the gears rotate as shown in FIGS. 8A, 8B and 8C.

The position of linking portion 56 on drive gear 52 and the non-uniform gear ratio of the gear pair permits the steering angle of the front wheels 18 to be responsive to the magnitude of the desired turn as determined by the input to the steering input device 24. When the vehicle 10 is traveling straight ahead or in a slight turn and the steering input device 24 is close to the neutral position, it is preferable for the movement of the steering input device 24 to cause only relatively small changes in the angle of the front wheels 18. This enables the operator to travel in straight lines and precisely control the vehicle. On the other hand, when the operator desires to perform an extreme turn, it is useful for the movement of the steering input device 24 to cause a relatively larger corresponding change in the steering angle of the front wheels 18. Accordingly, in some embodiments, the steering system 20 is configured such that movement of the steering input device 24 in the plus or minus twenty degree range from neutral causes a relatively small change in the steering angle of the vehicle. However, when the steering input device 24 is turned for an extreme turn, such as a zero radius turn, the steering assembly 20 increases the change in the steering angle so that the front wheels 18 rapidly reach the larger steering angle.

For example, some embodiments of the steering assembly 20 may be configured such that movement of the steering input device 24 to a position between about 10 degrees and about 20 degrees from the neutral position causes a corresponding change of the steering angle of the vehicle of between about 5 and about 20 degrees. In such embodiments, movement of the steering wheel to a position between about 20 degrees and about 40 degrees from neutral causes a corresponding change of the vehicle steering angle of between about 20 and about 60 degrees. In such embodiments, movement of the steering wheel to a position between about 40 degrees and about 60 degrees from neutral causes a corresponding change of the steering angle of between about 60 and about 120 degrees. Dimensions of the steering and wheel gears of a given gear pair, such as the pitch lines, may be set so that the rotational axes of both front steerable wheels 18 are always made to intersect with the single point C on the rotational axis of drive wheels 16 to provide substantially true Ackermann steering.

FIGS. 9A-9C illustrate another embodiment of a non-circular gear pair 81A. This gear pair 81A has non-uniform pitch lines such that the shapes of the steering gear 52A and wheel gear 70A produce substantially true Ackermann steering geometry. This gear pair 81A may be used with the embodiment of the wheel assembly 50 shown in FIG. 7.

The steering gear 52A has a shape comprising two spline portions 82, 84A connected at a juncture 86A. The spline portion 82A is engaged when the front wheel 18 to which the gear pair 81A is coupled is on the outboard side of the turn and the spline portion 84A is engaged when the front wheel 18 is on the inboard side of the turn. In the FIG. 9A embodiment, the distance from pivot axis $A_s$ of the steering gear 52A to the pitch line $P_s$ of the steering gear 52A in the spline portion 82A is substantially constant throughout the spline portion 82A, such that this portion of the steering gear 52A resembles a sector of a circle. However, the distance from pivot axis $A_s$ of the steering gear 52A to the pitch line $P_s$ is non-uniform in the spline portion 84A. Accordingly, the embodiment of steering gear 52A may be characterized as a non-circular gear, or as having a non-circular toothed portion.

Preferably, the distance from pivot axis $A_s$ to pitch line $P_s$ progressively increases to between about 110% and about 150% of the distance to the pitch line at the juncture 86A. In the illustrated embodiment, the distance from pivot axis $A_s$ to the pitch line $P_s$ near the teeth that engage the wheel gear 72A during an extreme inward turn is about 123% of the pitch line at the neutral position. The rear portion 85A of the steering gear 52A can have any suitable shape, such as the shape shown in FIG. 7.

The wheel gear 70A also has a non-uniform pitch line configured to match the pitch line of the steering gear 52A. In the illustrated embodiment, the wheel gear 72A has a first portion 83A in which the distance from the pivot axis $A_w$ of the wheel gear 70A to the pitch line $P_w$ of the wheel gear 70A is substantially constant throughout the portion 83A, such that this portion of the wheel gear 70A resembles a sector of a circle. The wheel gear 70A has a non-uniform portion 87A in which the distance from the pivot axis $A_w$ of the wheel gear 70A to the pitch line $P_w$ of the wheel gear 70A in the portion 87A is non-uniform. The uniform and non-uniform portions meet at a juncture 88A.

In the neutral or straight-ahead position, one or more of the teeth 62A near the juncture 88A of the wheel gear 70A engage one or more of the teeth 60A near the junction 86A of the steering gear 52A as illustrated in FIG. 9A. When making an inward turn as illustrated in FIGS. 9B and 9C, the steering gear 52A is rotated around the axis $A_s$ such that the spline portion 84A engages the non-uniform side 87A of the wheel gear 70A as the wheel gear 70A rotates around axis $A_w$.

Preferably, the distance from pivot axis $A_w$ to the pitch line $P_w$ progressively decreases to between about 50% and about 75% of the distance at the juncture 88. In the illustrated embodiment, the distance from pivot axis $A_s$ to the pitch line $P_s$ near the teeth that engage the wheel gear 72A during an extreme inward turn as shown in FIG. 9C is about 65% of the pitch line at the neutral position. The rear portion 89A of the wheel gear 70A can have any shape selected using sound engineering judgment, such as the shape shown in FIG. 7.

In one embodiment, the position of the teeth 60A, 62A and the pitch lines $P_s$ and $P_w$ for the steering gear 52A and wheel gear 70A are chosen so that substantially true Ackermann steering is provided by the gear pair 81A. One method of selecting the pitch lines $P_s$ and $P_w$ begins with determining the desired steering angles for the inside and outside front wheels 18. Referring back to FIG. 3A, the inside wheel steering angle α and outside wheel steering angle ω can be determined using the following formula:

$$\text{Tan}(90°-\omega) = [\tan(90°-\alpha)\cdot L + W]/L \quad \text{[Equation 1]}$$

Using the desired steering angles, the pitch lines $P_s$ and $P_w$ may be set so that the rotational axes of both front steerable wheels 18 are always made to intersect with a single point C located on the rotational axis of drive wheels 16, as seen in FIGS. 3A and 3B.

In the illustrated embodiment, the portions of the steering gear 52A and wheel gear 70A that engage each other when the gears are on the outside position of a turn (spline portion 82A and portion 83A) have uniform pitch lines, while the portions of the gears that engage each other when the gears are on the inside position of the turn (spline portion 84A and portion 87A) have non-uniform pitch lines. However, all portions of the gears can be non-uniform as long as the pitch lines $P_s$ and $P_w$ are selected to produce a substantially true Ackermann steering geometry for turning the front wheels 18.

The front wheel 18 on the inboard side of a turn steers through a greater steering angle than the outboard front wheel 18 in order to meet the Ackermann geometry. However, in the embodiment of the gear pair shown in FIGS. 9A-9C, the steering gears 52A on the inboard and outboard sides of the vehicle 10 will be rotated by the steering system at substantially the same speed and substantially the same magnitude. Preferably, the steering gear 52A is configured to rotate about 90 degrees, with about 45 degrees in the spline portion 82A and about 45 degrees in the spline portion 84A. The spline portion 84A has a longer pitch line than the spline portion 82A, and therefore more teeth. In the illustrated embodiment, the spline portion 82A has six teeth 60A and the spline 84A has seven teeth 60A. Similarly, the portion 87A of the wheel gear 70A must match its corresponding spline portion 84A on the steering gear 52A, so it also has a greater number of teeth 62A. As the pitch line $P_w$ gets closer to the axis $A_w$ in the portion 87A, the teeth 62A extend a greater distance around the circumference of the wheel gear 70A. As a result, the gear teeth 62A in the portion 83A take up a sector of between about 70 and 89 degrees and the gear teeth 62A in the portion 87A take up a sector of between about 91 and 120 degrees. The variation in the pitch lines between the inward turn side (84A, 87A) and the outward turn side (82A, 83A) causes the inward front wheel 18 to achieve a greater steering angle than the outward front wheel 18 in accordance with the Ackermann steering geometry.

The non-circular shapes of the steering gear 52A and the wheel gear 70A enable the gear combination to have a non-uniform gear ratio. In the neutral position, the ratio of the distance between the pivot axis $A_s$ and pitch line $P_s$ of the steering gear 52A to the distance between the pivot axis $A_s$ and pitch line $P_w$ of the wheel gear 70A is preferably between about 1.0:1.0 and 2.0:1.0, and more preferably about 1.5:1.0. The spline portion 82A of the steering gear 52A and the portion 83A of the wheel gear 70A have uniform pitch lines; therefore this ratio remains substantially constant for the front wheel 18 on the outboard side of the turn. However, in the extreme turning position illustrated in FIG. 9C, the ratio of the distance between the pivot axis $A_s$ and the pitch line $P_s$ of the steering gear 52A to the distance between the pivot axis $A_w$ and the pitch line $P_w$ of the wheel gear 70A for the front wheel on the inboard side is preferably between about 2.0:1.0 and 4.0:1.0, and more preferably about 3.0:1.0. However, any ratio suited to a given application may be chosen.

Steering and Speed Control Assemblies with the Integration Device

Referring back to FIGS. 2B and 4, the speed control assembly shown generally at 21 and its interaction with the steering assembly 20 via the integration device 27 to control the transmission drive units 29 will now be described. In a preferred embodiment, the integration device 27 includes components that mechanically integrate a steering input from the steering assembly 20 corresponding to the position of the steering input device 24 with a speed input corresponding to the position of the speed input device 28 to drive and steer vehicle 10. The integration device 27 that is shown in the figures is configured to set the direction of rotation of each drive wheel 16 and the relative rate of rotation of each drive wheel 16 in response to the steering input the integration device receives from the steering assembly 20. The integration device, steering assembly and speed control assembly depicted in, for example, FIGS. 1-16 are configured to work together to reduce the speed of (such as by decelerating) the outboard drive wheel of the vehicle in a sufficiently extreme turn, even when the speed input is constant (see FIG. 16). In some other embodiments, the steering and speed control assemblies and the integration device are not configured in that manner.

The integration device 27 includes an assembly 101, such as a linkage assembly, that couples the speed control assembly 21 and steering assembly 20 to the transmission drive units 29 such that the steering and speed inputs can be coordinated to control the magnitude and direction of rotation of the transmission drive units 29.

In one embodiment, the assembly 101 includes pintle links 102 pivotably coupled to the transmission drive units 29. When the pintle links 102 are pivoted in first and second directions, they provide input to the transmission drive units 29 to control the direction and magnitude of the rotational output of the transmission drive units, and thus the direction and magnitude of rotation of the respective drive wheels 16. The more that the pintle links 102 are pivoted, the greater the magnitude of speed at which the drive units 29 are driven in each respective direction. The assembly 101 may also include drive rods 104, which may be pivotably coupled to the pintle links 102 at distal ends 105 of the drive rods. The drive rods 104 are movable back and forth so as to pivot the pintle links 102 in the first and second directions. The drive rods 104 may be independently shifted with respect to the other. "Independently shifted" means that the drive rods 104 may be moved separately, such as in the longitudinal direction of the vehicle. As a result, the pintle links 102 are independently pivoted such that the transmission drive units 29 can drive their associated drive wheels at different rates and in different directions, although they may also drive them at the same rate and in the same direction. Drive rods 104 may be configured in any suitable fashion to accommodate the orientation of the transmission system (and, more specifically, the transmission drive units). For example, two sections of a drive rod (or two drive rods) may be coupled together longitudinally using complimentary bell cranks (see FIG. 21 for an example of one bell crank) or a connecting plate (see FIGS. 10 and 11). Alternatively, a change in the height of drive rod may be accomplished by bending it (see FIG. 4).

The speed control assembly 21 of vehicle 10 includes a speed input shaft 110 that is coupled to the chassis 14 in a way that allows it to rotate in response to movement of the speed input device 28 to which it is coupled (e.g., through a fixed attachment). Speed input device 28 is coupled to speed input shaft 110 such that the speed input shaft 110 will rotate in the same general direction that the speed input device 28 is depressed. When the steering input device 24 is in a neutral position (not steered to the left or right), rotating the shaft 110 in either direction will cause the left and right drive units 29 to drive at substantially the same magnitude and in the same direction, propelling the vehicle 10 straight forward or backward. The speed input device 28 may be biased via a spring or other mechanism toward a neutral or non-driving position.

Figure 10:
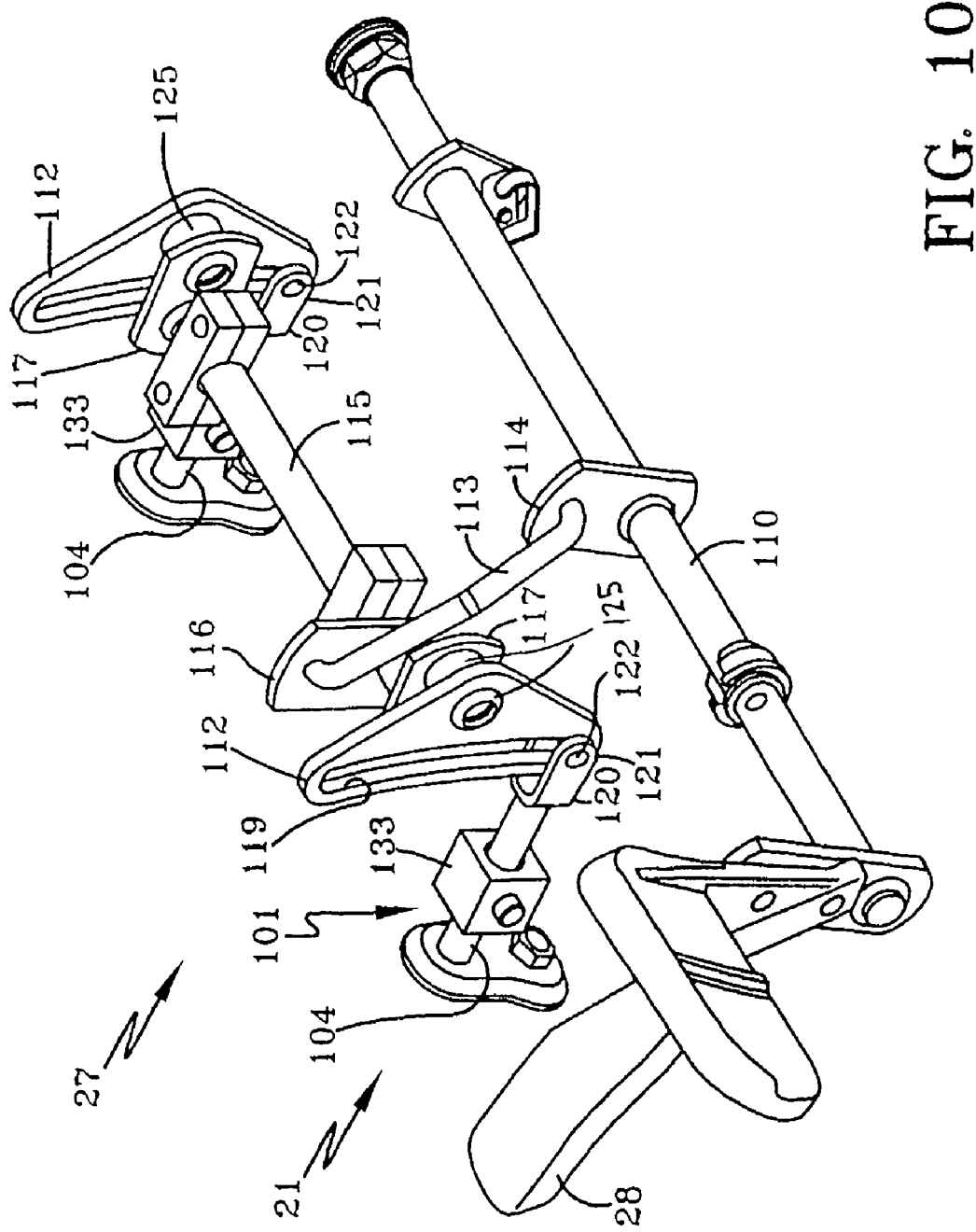

As shown in FIG. 10, the speed input shaft 110 is coupled to a speed mechanism 112. The speed mechanism comprises two speed cams 112, one controlling the left drive unit 29 and the other controlling the right drive unit 29. The speed input shaft 110 is coupled to an arm 113 with a bracket 114. The arm 113 is coupled to a second speed shaft 115 through bracket 116. Thus, the speed input shaft 110 is coupled to the second speed shaft 115 through the arm 113 such that rotation of the speed input shaft 110 is transmitted into rotation (in the same direction) of the second speed shaft 115.

Each speed cam 112 is coupled to the second speed shaft 115 preferably with a bracket 117 at point 125. Each speed cam 112 has a speed slot 119. Integration device 27, and more specifically linkage assembly 101, includes a follower 120 that is coupled to the end of the drive rod 104 and rides in the speed slot 119. In the illustrated embodiment, for example, the follower 120 includes a yoke 121 having a pin 122 configured to ride in the speed slot 119. The follower 120 may contain rollers, bearings or other components to enable the follower 120 to slide in the speed slot 119.

As FIG. 10 shows, actuation of the speed input device 28 applies rotational force equally to both of the speed cams 112. The speed cams 112 rotate about a pivot point 118 positioned on a line extending along the axis of the second speed shaft 115 and located within the speed slot 119 (see FIG. 13) as a result of the configuration of brackets 117, which act as bridges. The speed slot 119 is preferably curved so that the follower 120 can freely slide from one end of the speed slot 119 to the other as the drive rod 104 is pivoted about a center axis positioned near the pintle link 102. Furthermore, speed slot 119 may be shaped like an arc having a radius that is equal to the distance from the pivot point 118 to the actuation location, which is the location where the pintle links control actuation of the drive units. As a result, a speed input that cause the follower 120 to move in the speed slot will not actuate either of the drive units because the distance between the pintle link and a line defining the arc of the speed slot (which runs through the pivot point 118) is constant all along the slot.

Figure 11:
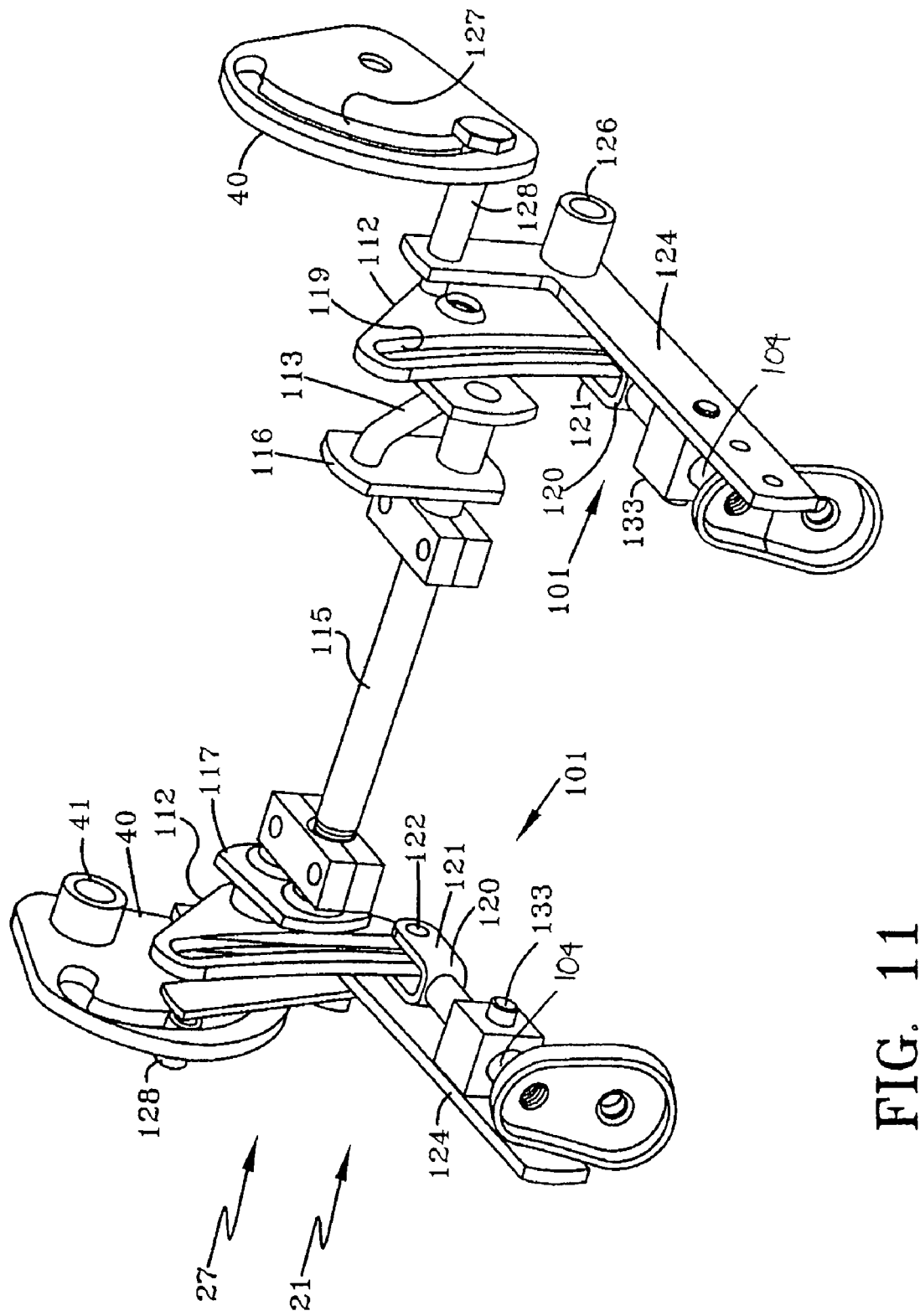
Figure 13:
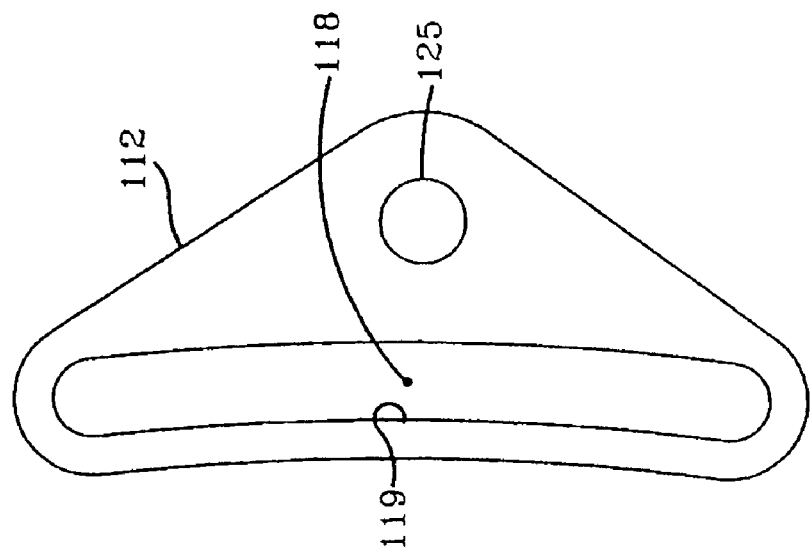

FIG. 11 shows the follower 120 received in the speed slot 119 of the speed cam 112 at a bottom position. This may be the default or biased position. However, the neutral position may be at the top of the speed slot 119 depending on the arrangement of the drive rod 104 and the pintle link 102 and how the pintle link 102 is configured to control the drive units 29. The speed control assembly 21 receives the steering input from the steering assembly 20 via the two steering cams 40. Each steering cam 40 is coupled to the speed cam 112 with a steering command arm 124. The steering command arm 124 has a generally V-shaped body and is coupled to the chassis 14 at pivot 126. One end of the steering command arm 124 contains a follower link 128 that is movably coupled to the steering cam 40. Specifically, in this embodiment, the steering cam 40 has a steering slot 127 that receives the follower link 128. The other end of the steering command arm 124 is coupled to the drive rod 104 with a slide 133. The slide 133 may be pinned to the steering command arm 124 in any suitable manner (see FIG. 4) such that it can pivot about its pinned axis and translate along the length of a portion of the drive rod 104 without disrupting the longitudinal position of the drive rod and actuating one of the drive units 29. The steering command arm 124 can selectively move the follower 120 in and along the length of the speed slot 119. As a result, the position of the steering cam 40 can control the position in the speed slot 119 where the follower 120 engages the speed cam 112.

Figure 12:
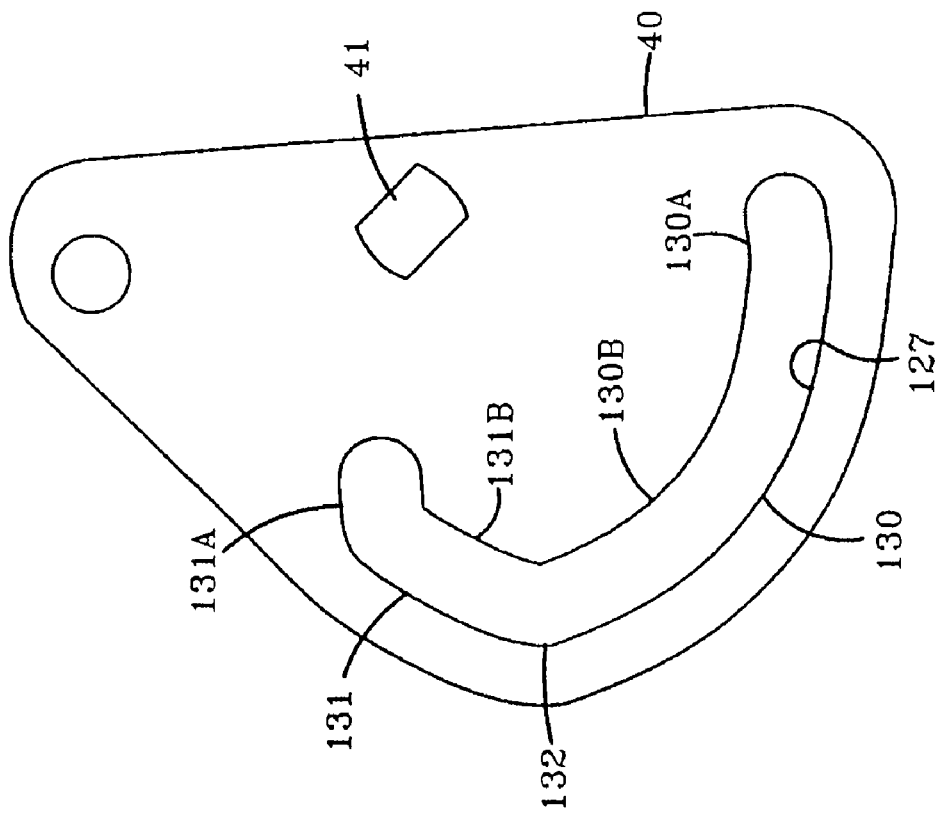

As shown in FIG. 12, the steering slot 127 on the steering cam 40 has a dwell portion 130 that has a first contour for controlling the position of the follower link 128 when the steering cam 40 is on the outboard side of the vehicle 10 during a turn. The dwell portion 130 may include an end section 130A that has a different contour than an inner section 130B of the dwell portion 130. The steering slot 127 also has a cam portion 131 that has a second contour for controlling the position of the follower link 127 when the steering cam 40 is on the inboard side of the vehicle 10 during a turn. The first contour of the dwell portion 130 is different from the second contour of the cam portion 131. The cam portion 131 may have an end section 131A and an inner section 131B. The end section 131A may have a different contour than the an inner section 131B. When the steering cam 40 is in its neutral position, the follower link 128 resides in a juncture 132 situated between the dwell portion 130 and the cam portion 131.

The operation of the speed assembly 21 will now be described with respect to a steering cam 40 and a speed cam 112 positioned on the right side of the vehicle 10 (as shown, for example, in FIG. 4), to illustrate how the steering input from the steering input device 24 and the speed input from the speed input device 28 may be integrated. FIGS. 14A-14C and 15A-15C schematically show various positions of the speed cam 112, the follower 120 as controlled by the steering cam 40 (removed for clarity), and the pintle link 102 for different speed and turn combinations for the vehicle 10.

FIGS. 14A-14C depict a "straight ahead" mode of operation where there is no steering input to the steering input device 24. FIG. 14A shows a neutral condition where there is no speed input, or the speed input device 28 (FIG. 10) is in the neutral position N. When the driver depresses the speed input device 28 in the first or forward direction, the speed cam 112 is rotated via the speed input shaft 110 (FIG. 10) about pivot 118. A result of such rotation is depicted in FIG. 14B. This action results in the pintle links 102 being shifted away from the neutral position N, which causes the vehicle 10 to drive in the forward direction. During this process, the steering cam 40 (FIG. 11) remains in a constant default position, which causes the followers 120 to remain at one end of the speed slot 119. In the illustrated embodiment, this is the bottom end of the speed slot 119. As shown in FIG. 14C, depressing the speed input device 28 in the second or reverse direction rotates the speed cam 112 in the opposite direction about pivot 118. Rotation of the speed cam 112 in this opposite direction forces the follower 120 in the opposite direction. This positions the pintle link 102 on the opposite side of the neutral position N, causing the drive unit 29 to drive in reverse.

Operation of the vehicle 10 will now be explained when a turn is directed by the steering input device 24. Returning to FIGS. 4 and 12, rotating the steering cam 40 in a first direction (e.g., commanding a turn that places the illustrated input member 40 on the outboard side of a turn) causes the follower link 128 to track along the curvature of the inner section 130B of the dwell portion 130 of the steering slot 127. The contour of the inner section 130B is such that the follower link 128 slides in steering slot 127 such that the steering command arm 124 remains stationary and does not move about pivot 126. When stationary, the steering command arm 124 does not change the position of the follower 120 in the slot 119 of the speed cam 112. However, if an extreme turn is intended, such as one that would turn the front wheels about 60 degrees or greater, the steering cam 40 is rotated such that the follower link 128 reaches the end section 130A. The end section 130A is contoured so as to cam the follower link 128 and cause the steering control arm 124 to pivot, thereby repositioning the follower 120 to slow the outside transmission drive unit 29 for the extreme turn, as described below.

Alternately, rotating the steering cam 40 counter-clockwise (e.g., commanding a right turn that places the input member 40 on the inboard side of the turn) causes the follower link 128 to move along the curvature of the cam portion 131 of the steering slot 127. The contour of the inner section portion 131B is such that the steering cam 40 exerts a force on the follower link 128 causing the steering command arm 124 to move about pivot 126. As the steering command arm 124 pivots, it moves the follower 120 along the length of the speed slot 119 of the speed cam 112. This provides a steering input from the steering cam 40 to be integrated with the speed input. That integration produces a "blended output" that is transmitted through the drive rod 104 to the transmission system as a result of an operator manipulating speed input device 28. A blended output in this context is one that results from a combination of a speed input (e.g., depressing a pedal) and a steering input (e.g., turning a steering wheel). Neither the output from the drive multiplier 116 that travels through drive linkage 38 to drive transmission 30 nor the output from the steer multiplier 112 that travels through steering linkage 48 to steer transmission 32 in U.S. Pat. No. 6,904,985 is a blended output.

Referring now to FIGS. 15A-15C, FIG. 15A shows positions of the speed cams 112, the follower 120 as controlled by the steering cam 40, and the pintle link 102 in the condition in which the steering input device 24 (FIG. 1) is rotated to command a maximum inside turn, such that the illustrated speed cam 112 controls the drive unit 29 on the inboard side of the turn. During an inward turn, the steering cam 40 causes the follower 120 to shift in the speed slot 119 toward the opposite end of speed slot 119 from that shown in FIGS. 14A-14C. Accordingly, when the speed input device 28 is depressed in the first or forward direction as depicted in FIG. 15B, the geometry of the speed cam 112 for the inward drive unit 29 causes movement of pintle link 102 in a reverse direction. Depressing the speed input device 28 to drive the vehicle forward, with the steering input device 24 fully turned to cause an inward turn, causes pintle link 102 to drive the drive wheel 16 on the inside of the turn in reverse. The follower 120 in the opposing speed cam 112 (not shown) for the outside drive unit 29 does not move toward the upper end of the speed slot 119. Therefore, the outside wheel is driven forward, resulting in a low- to zero-radius turn.

When the speed input device 28 is depressed in the second or reverse direction, the speed cam 112 rotates in the second direction as depicted in FIG. 15C. This causes the pintle link 102 to command the inward drive unit 29 to drive the inward drive wheel 16 in the forward direction. Thus, ZTR steering (or at least small-turn radius steering) in forward and reverse is accomplished as a result of the drive units receiving two blended outputs. While the front steerable wheels 18 may rotate in the Ackermann geometry as set forth above, the steering system 20 may be configured to steer the front wheels 18 in any desired manner using sound engineering judgment.

As FIGS. 14A-14C and 15A-15C show, the position of the follower 120 within the speed slot 119 may be adjusted by applying a force with the steering cam 40 (as seen in FIG. 11). Preferably, a bias force, which may be applied by a spring (not shown) coupled to the follower 120 in a manner well known in the art, biases the follower 120 to the neutral position. As the steering input device 24 is turned, the drive rod 104 selectively moves through the speed slot 119 to cross from a first direction position to a second direction position. Preferably, the follower 120 slides in an analog fashion from the bottom to the top of the speed slot 119 depending on the magnitude of the turn directed by the steering input device 24, establishing a series or a plurality of trajectories through which the follower 120 is selectively maneuvered. Therefore, the follower 120 is selectively positioned at various points between the first and second maximum positions in the speed slot 119. In this way, and because the steering cams 40 are rotated independently or asynchronously, the pintle links 102 may be independently controlled through receipt of independent blended outputs from the drive rods 104 to steer and propel the vehicle 10 in a manner consistent with proper steering in the forward and reverse directions. Additionally, the steering cams 40 and the speed cams 112 are preferably configured so that the maximum distance from the neutral position N that the pintle link 102 can be shifted by the follower 120 is greater in the forward direction than in the reverse direction. As a result, a given drive unit 29 (and, more generally, the transmission system) produces a greater maximum magnitude of speed in the forward direction than in the reverse direction. For example, in one embodiment, the vehicle has a maximum forward speed of about 6 mph and a maximum reverse speed of about 4 mph.

Preferably, the steering characteristics of the drive wheels 16 and the front wheels 18 are matched so that the steering provided by the drive wheels 16 and the front wheels 18 cooperate to steer the vehicle 10. Accordingly, the degree of turn caused by the drive wheels 16 may be matched with the steering angle of the front wheels 18 so that the drive wheels 16 do not try to turn the vehicle in a sharper turn than the front wheels 18, and vice-versa. In the illustrated embodiment, this is accomplished by selecting the curvature of the steering slot 127 of the steering cam 140 to match the steering angle of the front wheels. This can also reduce the amount of torque required of the drive wheels 16 to turn the vehicle as compared to the amount of torque needed to turn the front castor wheels of some conventional vehicles. With steerable wheels 18, the operator of the vehicle does not need the level of proficiency required to operate existing lever-controlled ZTR vehicles, and the tendency to damage the driving surface such as by tearing up the grass by skidding the inboard drive wheel during a turn is reduced, and possibly eliminated.

In operation, the steering assembly 20, via the steering cam 40 on the inboard side of the intended turn, provides a steering input that changes the condition of the speed command to the drive unit 29 received from the speed cam 112 through the assembly 101. The steering cam 40 on the outboard side of the intended turn does not change the condition of the speed command to the drive unit 29 for small turns.

Speed Curves

Figure 16:
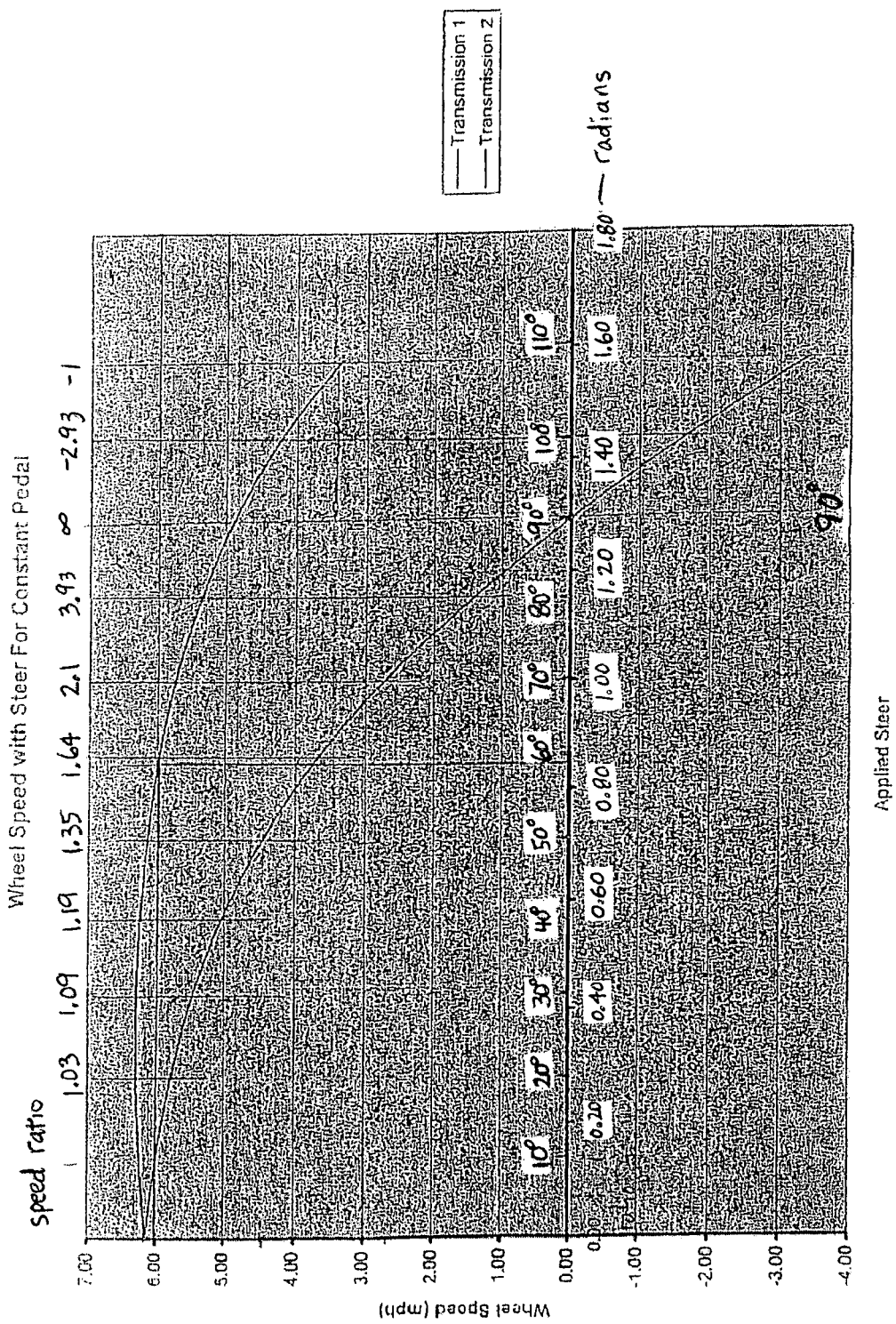
FIG. 16 charts the speed of the wheels for one embodiment of the present vehicle versus the applied steering for a constant speed input.

For extreme turns, it is preferable for the drive unit 29 on the outboard side to slow so that the front wheels do not plow. FIG. 16 illustrates one example of the wheel speed for the drive wheels 16 produced by the two transmission drive units 29 as a function of steering input, assuming a constant steering input from the speed input device 28 ("constant pedal"). The graph shows that the inside wheel slows more, and more quickly than the outside wheel, during a turn. The inside wheel has a zero speed for a turn of about 90 degrees and has the maximum reverse speed where the inside wheel is turned about 108 degrees. The outside wheel desirably maintains or even slightly increases its speed for turns up to about 60 degrees. The outside wheel gradually slows for larger turns until it slows to a speed of equal magnitude, but in the forward direction, as the inside wheel at 108 degrees to produce a zero turn radius. The FIG. 16 graph of wheel speed vs. applied steer is only one example of how the steering assembly 20, the speed control assembly 21 and integration device 27 may operate. They may be configured to produce other speed profiles.

The steering assembly 20, the speed control assembly 21 and integration device 27 work together to provide a reduced average velocity as the vehicle 10 turns, as shown by the FIG. 16 speed curves. The steering assembly 20, the speed control assembly 21 and integration device 27 work together to balance the torque delivered by the drive wheels 16 and provide the vehicle 10 with infinite and controlled speed modulation through the desired speed ranges of the two transmission drive units 29 from the forward to reverse directions.

A turn results in a steering input to the inward follower 120 that causes the follower 120 to be positioned in the speed slot 119 nearer the point 118 about which the speed cam 112 pivots. This causes the magnitude of the movement of the drive rod 104 to diminish. Correspondingly, the lateral displacement of the pintle link 102 on the inward side is reduced and the inward drive wheel 16 is driven more slowly. The difference in rotational speed between the drive wheels 16 causes the vehicle 10 to turn. This turn is maintained regardless of the position of the speed cam 112 as long as the setting of the steering input device 24 is not changed. Even as the driver places the vehicle 10 in reverse by switching input on the speed input device 28, the magnitude of speed on the inward wheel 16 remains smaller than that of the outboard wheel 16, so that the vehicle continues the turn in the same direction. Thus, consistent or proper steering is maintained when traveling in reverse. Additionally, movement of the steering cams 40 does not reposition the speed cams 112; it only changes the position at which each follower 120 is positioned in the speed slot 119 of one of the speed cams 112. And because the speed slot can be configured as an arc having a radius as described above, movement of the steering input device 24 (FIG. 1) does not cause any rotation of the drive wheels 16 or movement of the vehicle 10. This should accord with the expectation of the operator of the vehicle 10, who may be accustomed to controlling the movement and speed of the vehicle with one control (e.g., the speed input device 28) and steering with another control (e.g., the steering input device 24).

Worm Embodiment

Referring now to FIGS. 17-20, an alternate embodiment for integrating the steering input from the steering input device 24 and the speed input from the speed input device 28 is illustrated. As in the embodiment above, the drive units (not shown) are coupled to a linkage assembly which includes a pair of drive rods 104A pivotally coupled to pintle links (not shown). This embodiment illustrates the drive rod 104A as having a bell crank 149 disposed at one end (and which can be coupled to a bell crank disposed on another drive rod (not shown)) to accommodate the orientation of the transmission drive unit.

Figure 17:
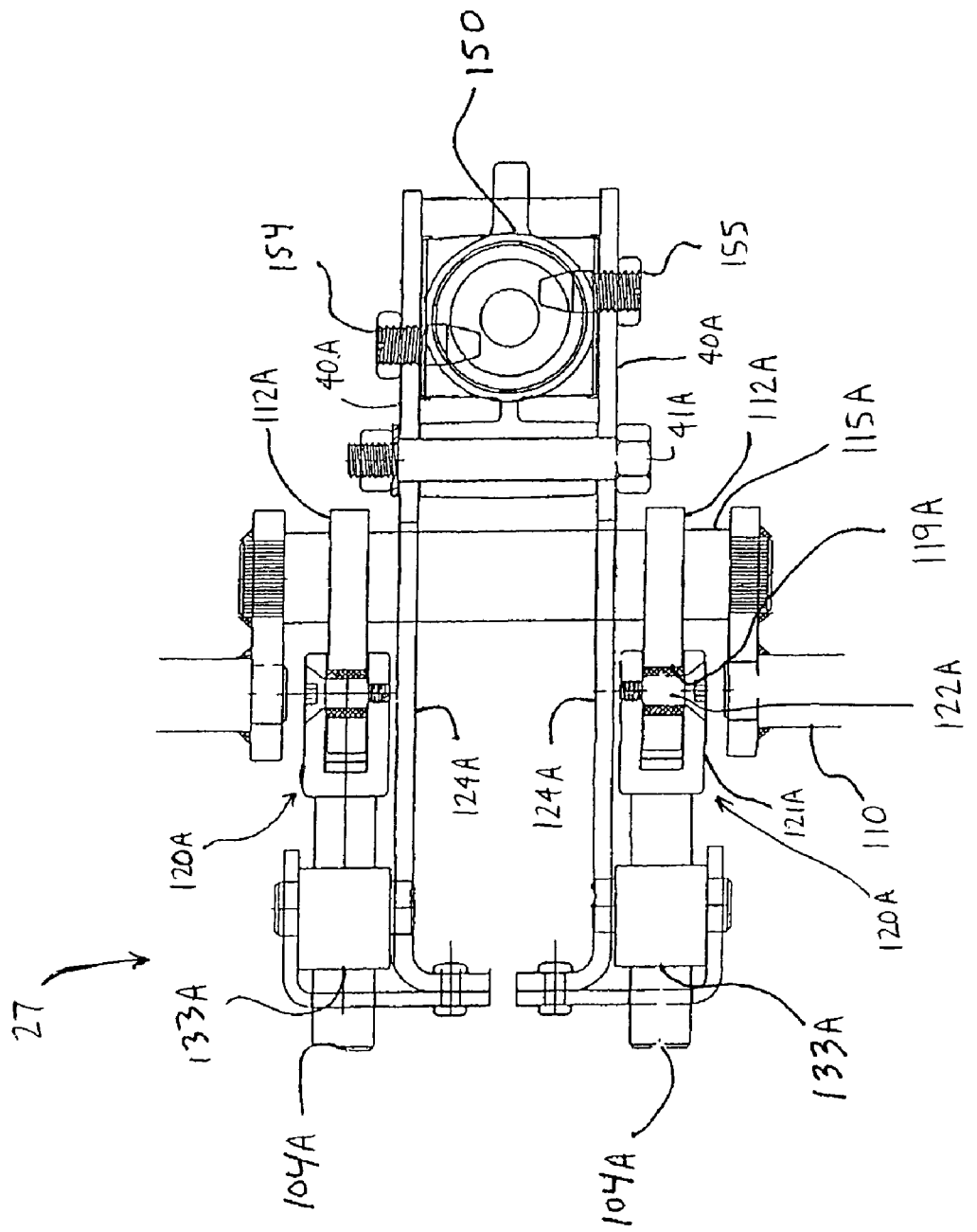
FIG. 17 is a top view of an alternate embodiment of a steering assembly, a speed control assembly, and an integration device that may be used with the vehicle of FIG. 1.

FIG. 17 shows the speed input shaft 110 coupled to two speed cams 112A via a second speed shaft 115A. Rotation of the speed input shaft 110 causes rotation of the second speed shaft 115A, which in turn rotates the speed cams 112A. The speed cams 112A have a substantially similar shape and substantially similar speed slot 119A as the speed cams 112 described in the previous embodiment. Followers 120A positioned at the end of the drive rods 104A are coupled to the speed cams 112A with a yoke 121A and pin 122A slidably received in the slot 119A. A further description of the speed cams 112A and followers 120A is not needed because they are similar to the speed cams 112 and followers 120 of the embodiment described above.

Two steering cams 40A are coupled to the chassis 14 such that they rotate about pivot 41A and are coupled to the steering input device 24 (FIG. 1) via a worm gear 150. The worm gear 150 is positioned at the end of the steering shaft 30 so that the worm gear 150 is rotated in first and second directions as a result of rotation of the steering input device 24. The worm gear has first and second variable pitch grooves 152, 153 cut around its outer circumference. The left steering cam 40A engages the worm gear 150 via a set pin 154, and the right steering cam 40A engages the worm gear via set pin 155. The set pin 154 is received in the first variable pitch groove 152. Likewise, the set pin 155 is received in the second variable pitch groove 153. The variable pitch grooves 152, 153 are configured to cause the set pins 154, 155 to selectively pivot the steering cams 40A as the worm 150 is rotated.

Figure 18:
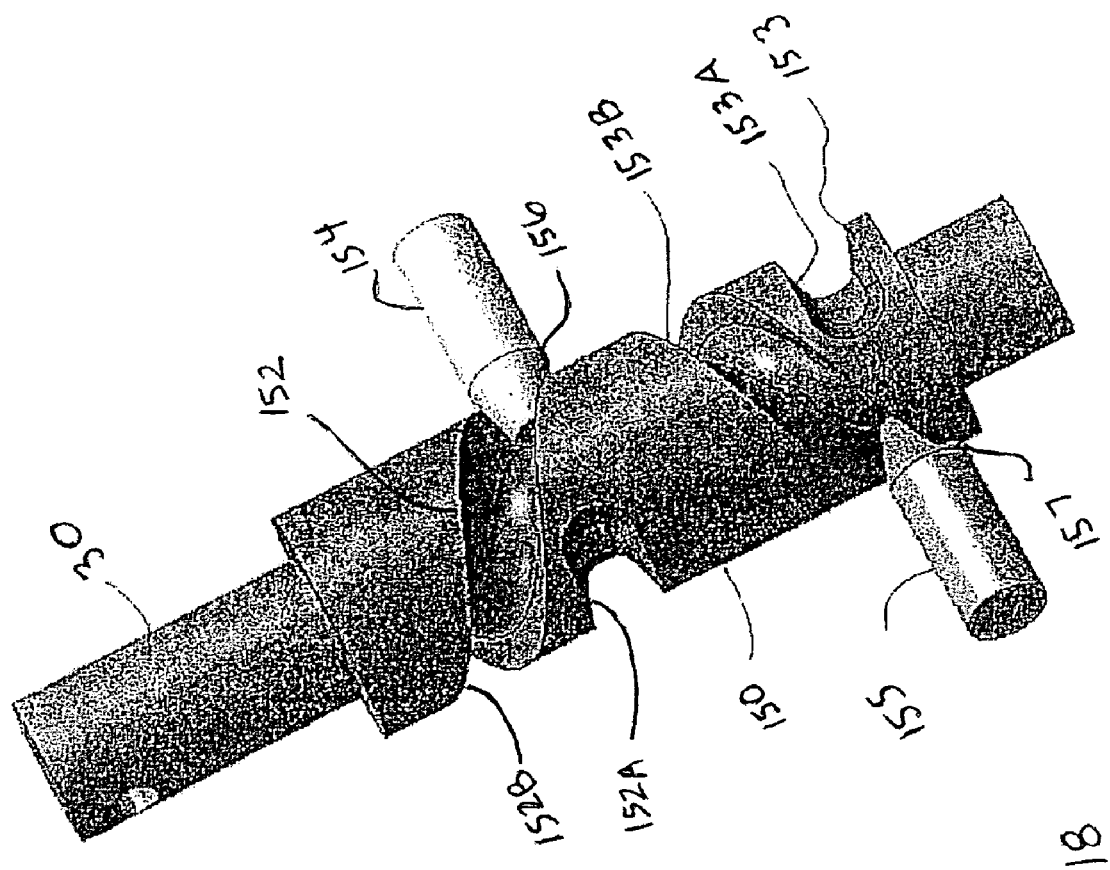
FIGS. 18 and 19 are different perspective views of a variable pitch worm of the steering assembly of FIG. 17.

FIG. 18 shows that the variable pitch groove 152 has a dwell portion 152A in which the variable pitch groove 152 has a first contour. The variable pitch groove 152 also has a cam portion 152B in which the variable pitch groove 152 has a second contour. The first contour is different than the second contour: the cam portion 152B has a generally spiral configuration while the dwell portion 152A extends around the circumference of the worm 150 at a uniform height along the body of the worm. In one embodiment, the dwell portion 152A and the cam portion 152B each cover about 240 degrees around the circumference of the worm. However, the length of the dwell portion 152A and cam portion 152B may greater or less than this depending on the desired application, and using sound engineering judgment. When the steering cam 40A is in its neutral position, the set pin 154 resides in a juncture 156 between the dwell and cam portions 152A, 152B of the variable pitch groove 152. The second variable pitch groove 153 has a similar dwell portion 153A and cam portion 153B that meet at a juncture 157.

FIG. 18 illustrates a condition in which the set pins 154 and 155 are in neutral positions; specifically, the pins are in the junctures 156, 157 in their respective grooves 152 and 153.

Figure 19:
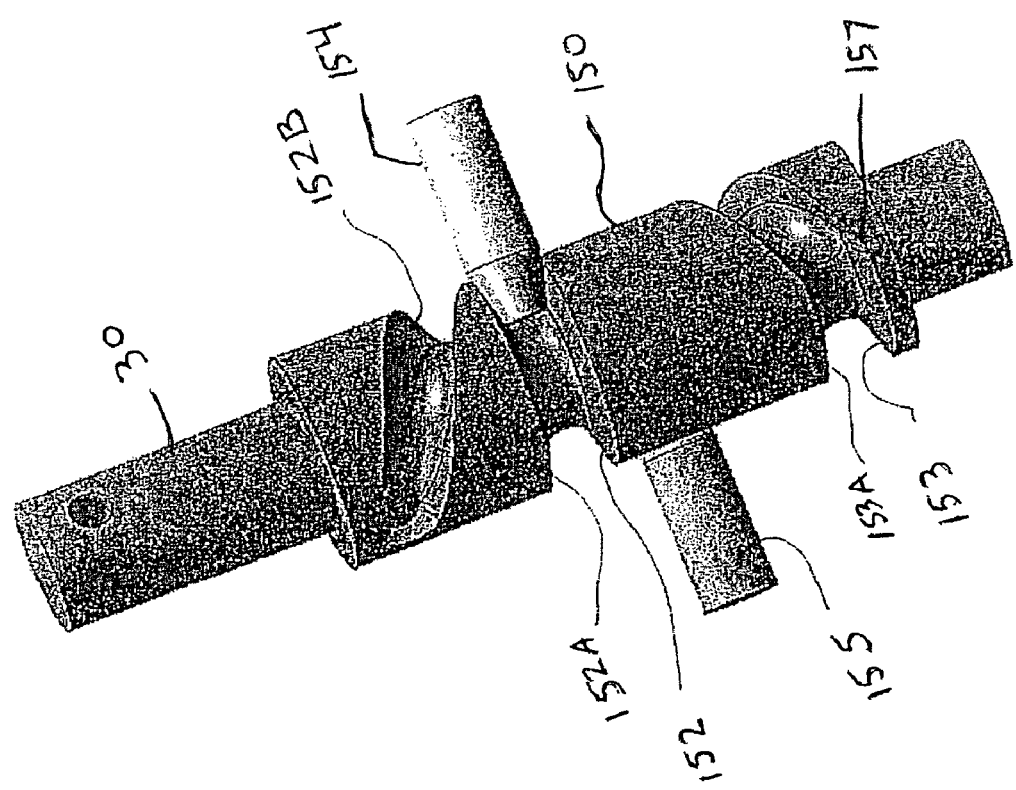

FIG. 19 illustrates a second condition after which the worm gear 150 has been rotated by rotation of the steering input device 24 (FIG. 1). In this second condition, the set pin 154 has traveled through the dwell portion 152A of groove 152 and the set pin 155 has traveled through the cam portion 153B of groove 153.

Figure 20:
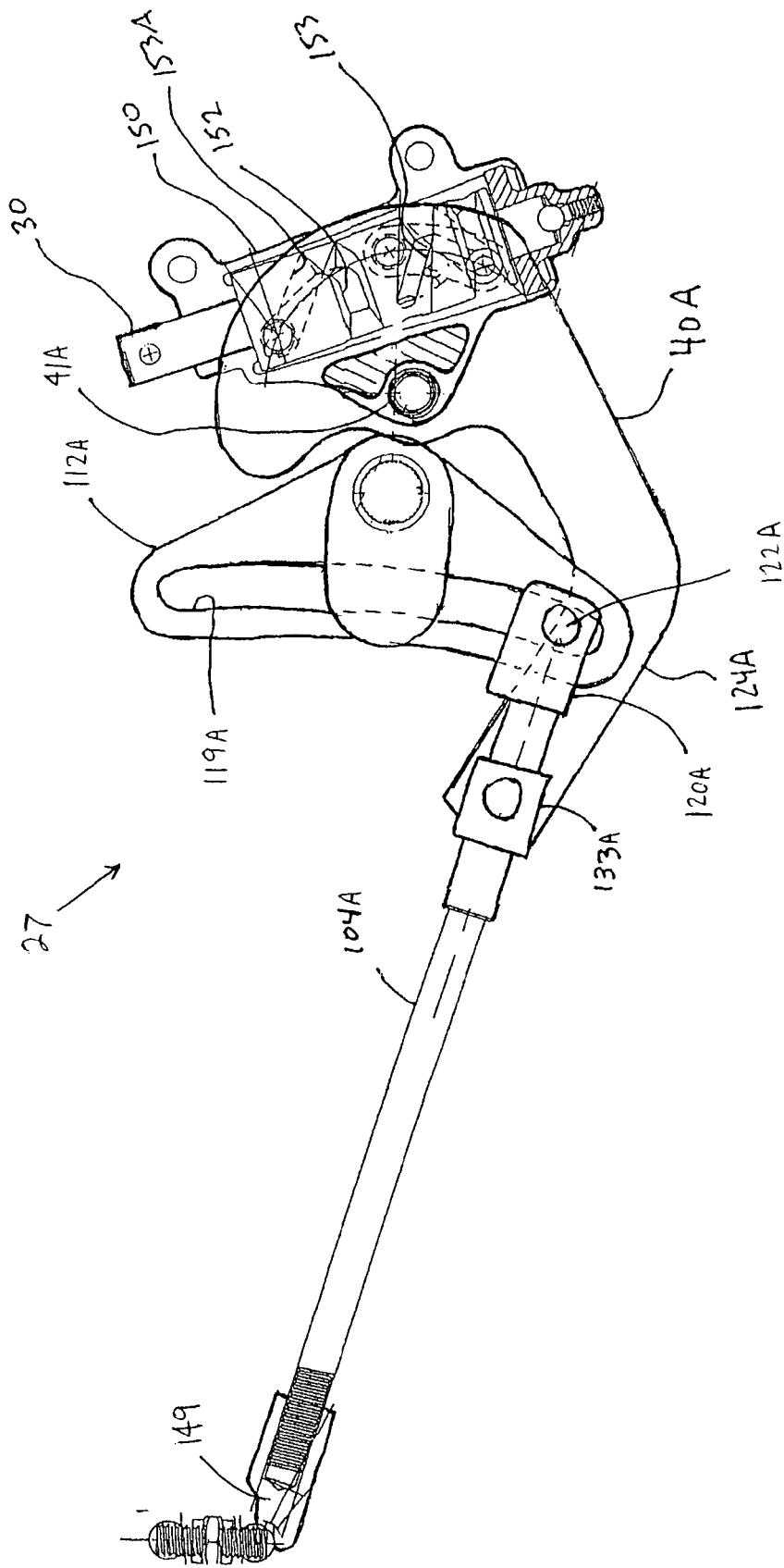
FIG. 20 is a side view of a portion of the arrangement shown in FIG. 17.
Figure 2I:
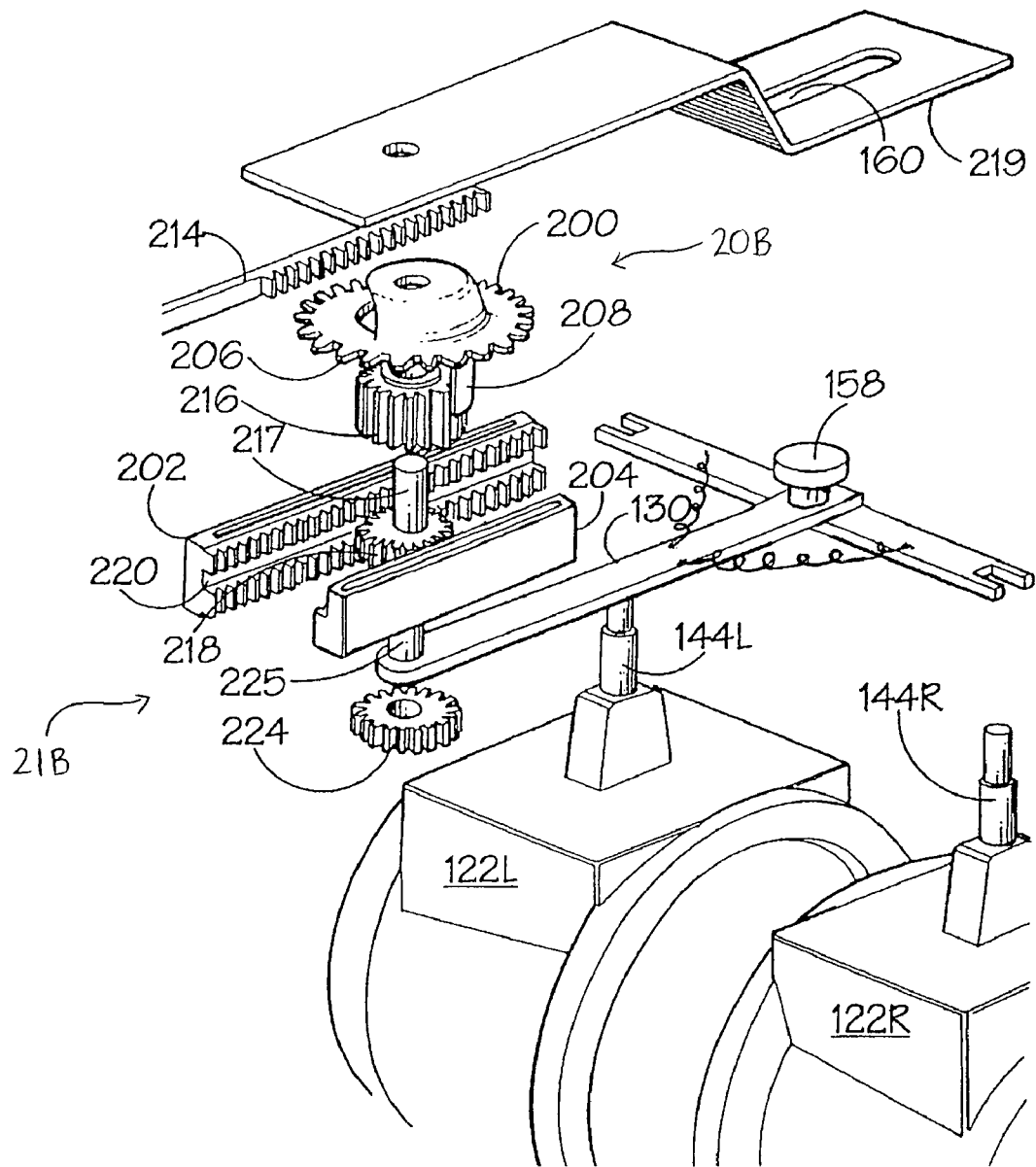

As best seen in the enlarged view of FIG. 20, a steering command arm 124A extends from the steering cam 40A. The steering command arm 124A is coupled to the linkage assembly 101A with the slide 133A and controls the position of the follower 120A to provide steering input to the speed cams 112A in substantially the same way that the steering command arm 124 controls the position of the follower 120 in the embodiment described above.

In operation, the worm gear 150 rotates in response to a steering input on the steering input device 24 (FIG. 1). When the worm gear 150 is rotated counter-clockwise (e.g., when a left turn is intended that would place the input cam 40A illustrated in FIG. 20 on the outboard side of the turn), the set pin 155 tracks along the curvature of the dwell portion 153A of the groove 153. The contour of the dwell portion 153A is configured such as the set pin 155 tracks along it, the worm 150 does not cause the steering cam 40A to rotate about pivot 41A; instead, the steering cam 40A remains generally stationary. Thus, the steering command arm 124A does not cause the follower 120A to reposition in the slot 119A of the speed cam 112A.

Alternately, when the worm gear 150 is rotated clockwise (e.g., when a right turn is intended that would place the input cam 40A on the inboard side of the turn), the set pin 155 tracks in the cam portion 153B of the groove 153. The contour of the cam portion 153B is configured such that the worm gear 150 exerts a force on the set pin 155 that causes the steering cam 40A to pivot about pivot 41A. As the steering cam 40A pivots, the steering command arm 124A causes the follower 120A to shift in the slot 119A of the speed cam 112A. The steering cam 40A on the opposite side responds in similar fashion.

In this embodiment, the steering cam 40A on the outboard side of the intended turn does not change the position of the follower 120A with respect to the speed cam 112A. On the other hand, the steering cam 40A on the inboard side alters the position of the follower 120A. The worm gear 150 (and, more particularly, the shape of the variable pitch grooves 152, 153) may be configured to cause the transmission system generally (and the outside drive unit specifically) to slow during an extreme turn in order to help prevent plowing of the front wheels 18. Rotation of the speed cam 112A through operation of the speed input device 28 and operation of the pintle links by the linkage are substantially the same as the operation of those elements in the embodiment described above and illustrated in FIGS. 14A-14C and 15A-15C, and thus need not be repeated.

In the embodiments described above, the vehicle includes right and left steering cams (40 and 40A), right and left speed cams (112 and 112A), and right and left followers (120 and 120A). The follower on the right side of the vehicle is coupled to the right transmission drive unit 29 and is controlled by the right side steering mechanism and right side speed cam. The left follower is coupled to the left transmission drive unit 29 and is controlled by the left side steering mechanism and the left side speed cam. Each steering cam influences the position of its respective follower with respect to the relevant speed cam.

Alternately, the vehicle 10 can include a single steering mechanism interacting with a single speed mechanism with a linkage assembly having a single follower with multiple legs that interact with the transmission system generally, and the transmission drive units 29 more specifically. Additionally, the steering mechanism can change the position of the speed mechanism with respect to the follower in other embodiments of the present devices and systems, which is described next.

Rack and Pinion Embodiments

Figure 22:
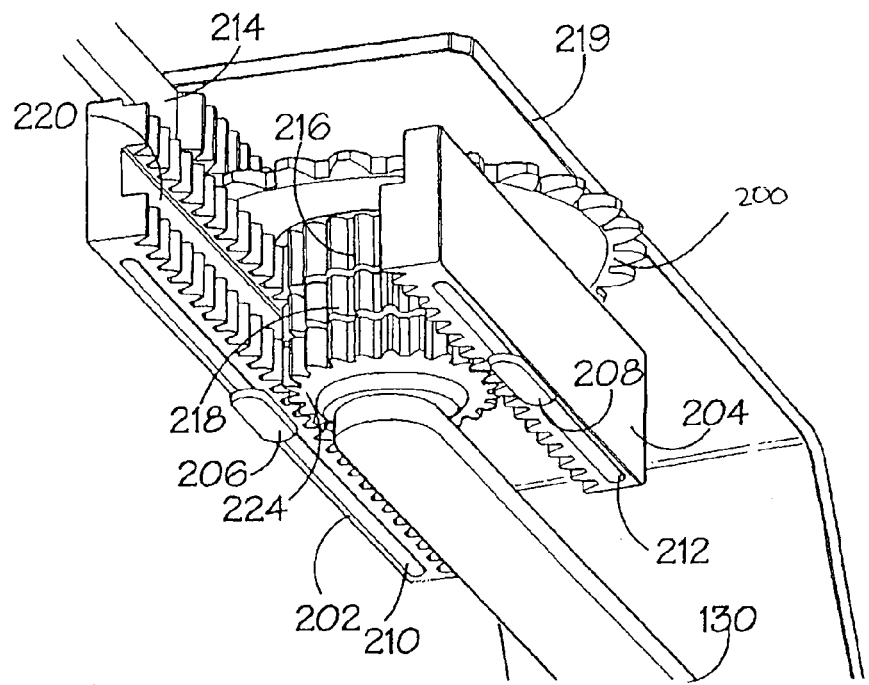
FIG. 22 is a perspective view from below of the system of FIG. 21.
Figure 23:
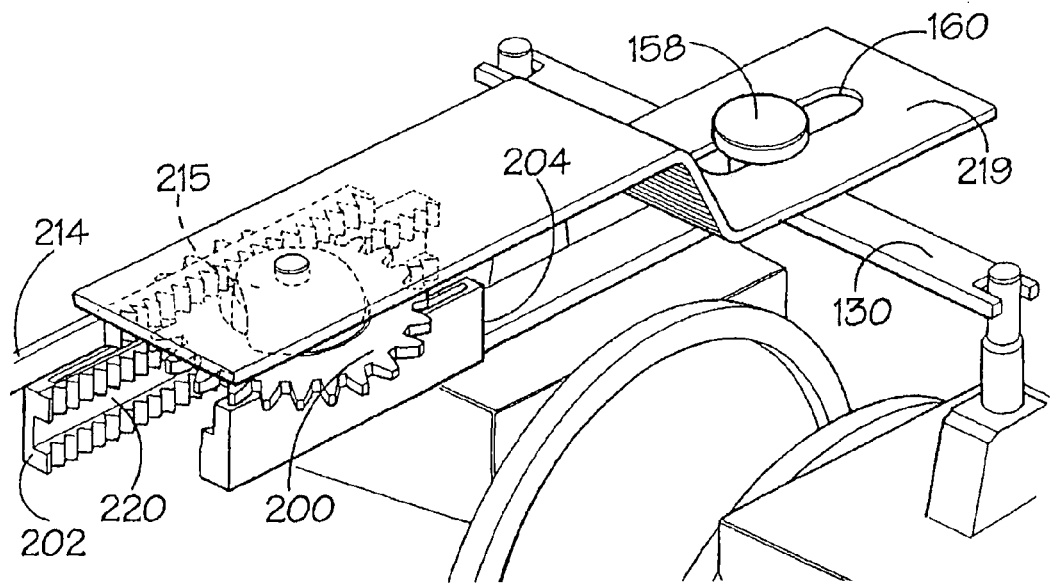
FIG. 23 is a perspective view from above of the system of FIG. 21.

FIGS. 21-25D illustrate a speed control assembly 21B and a portion of a steering assembly 20B. The steering assembly 20B includes a steering mechanism in the form of a gear wheel 200 that is externally toothed to engage with a gear or drive chain (omitted from the drawings for simplicity) coupled to the steering input device (e.g., steering input 24, not shown). Movement of the steering input device by the driver thus rotates the gear wheel 200. The speed control assembly 21B includes a speed mechanism comprising master and slave toothed racks 202, 204 that are coupled to the gear wheel 200 such that they turn along with it, but are capable of moving longitudinally relative to it. As shown in FIG. 22, this coupling is achieved through lugs 206, 208 projecting from the gear wheel 200 and slidably received in longitudinal slots 210, 212 of the respective racks 202, 204. Other means for providing a directionally positive arrangement may be adopted. For example, both racks may be slidably coupled (e.g., using bearings) to a base plate (not shown). The base plate may be coupled to the mounting plate 219 (discussed below) with side walls (not shown) to enclose and protect the racks.

The speed cam 21B also comprises a speed control rack 214 that is coupled to, and movable along its longitudinal direction by, a speed input device (e.g., speed input device 28, not shown). The speed control rack 214 meshes with a speed control pinion 216. Both the gear wheel 200 and the speed control pinion 216 are journalled on an axle 217 of a mounting pinion 218. The axle 217 is journalled in a mounting plate 219 such that it can rotate, but its axis is fixed. Although not shown, the mounting plate 219 may be provided with a slot and the speed control rack 214 may be coupled to the mounting plate 219 with a lug projecting from the speed control rack 214 that rides in the slot. The gear wheel 200 has a domed inner region into which the speed control pinion 216 projects. The dome is cut away to enable meshing of the speed control pinion 216 with the speed control rack 214. The mounting pinion 218 meshes with the slave rack 204 but runs in an un-toothed longitudinal recess 220 in the master rack 202, so that it does not restrict longitudinal motion of either rack—when the slave rack 204 moves, the mounting pinion 218 freewheels. The speed control pinion 216 meshes with the master rack 202 so that displacement of the speed control rack 214 produces a corresponding displacement of the master rack 202.

An integration device comprising a follower pinion 224 (one type of follower) meshes with lower regions of both master and slave racks 202, 204. The follower pinion 224 is rotatably mounted on a stub axle 225 carried by a "T" shaped lever 130. The lever 260 is provided with a fulcrum in the form of a spigot 158 movable along a guideway formed as a slot 160 in the mounting plate 219, and its left and right limbs are coupled to the ratio control levers 144L, 144R (which are comparable in function to the pintle links 102 described above) of the transmission drive units 122L, 122R (which can be HSTs as described above, or any other suitable transmission system, such as two continuously variable ratio transmissions, as described below). Although the follower pinion 224 is shown to be co-axial with the mounting pinion 218 in some of the drawings, it is able to move away from this position in response to input from the speed input device (not shown).

Figure 24:
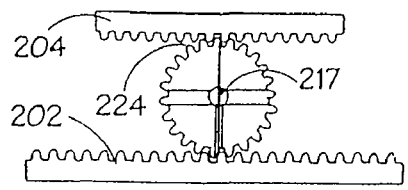
FIGS. 24 and 25A-25D represent, in schematic form, various configurations of the system of FIG. 21.
Figure 25A:
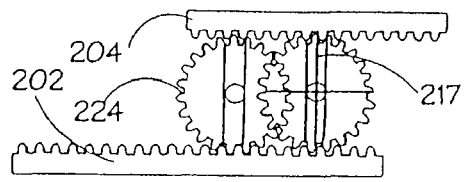
Figure 25B:
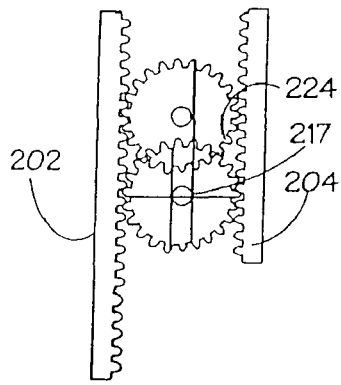

The racks 202, 204, 214 together form a guide path that is rotatable about a fixed axis defined by the axle 217 by means of the steering input device through the gear wheel 200. The radial position of the follower pinion 224 (the distance of its center from the fixed axis) is unchanged by rotation of the guide path and depends only on the position of the speed control rack 214. FIG. 24 shows the configuration when the speed input device is at zero or a neutral position and the steering input device is in a "straight ahead" position. The axis of the follower pinion 224 lies on the fixed axis 217, and correspondingly the lever 130 (omitted from FIGS. 24-25D for the sake of representational simplicity) is positioned to place both transmission drive units 122L, 122R in neutral position. FIG. 25A shows the configuration where the steering input device remains at zero (the orientation of the master and slave racks 202, 204 is the same as in the previous drawing) but the speed input device has caused the speed control rack 214 (not seen in these drawings) to be advanced, and this motion has been transmitted through the speed control pinion 216 to the master rack 202. Consequently, the follower pinion 224 has been displaced forwardly from the fixed axis 217. As in previous embodiments, the effect of this forward displacement is to set the two transmission drive units 122L, 122R to identical forward ratios, causing the vehicle 10 to move in a straight line. If the speed control setting of FIG. 25A is maintained, but the driver moves the steering input device to request a right turn, the configuration of FIG. 25B is reached. The master and slave racks 202, 204 have turned through ninety degrees. In the process, both master and slave racks 202, 204 have rotated around the speed control pinion 216, causing them to move equally and in opposite directions. Consequently, the radial displacement of the follower pinion 224 from the fixed axis 217 is unchanged. The follower pinion 224 is now displaced laterally to produce a right turn.

Figure 25C:
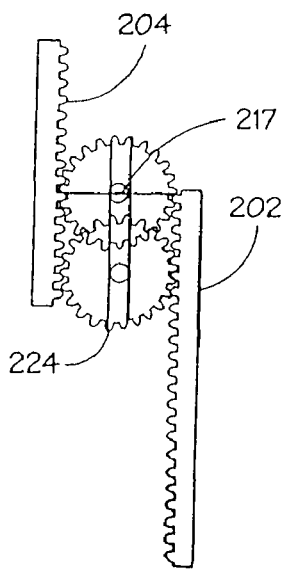

Still maintaining the same speed control setting, but moving the steering input device 24 to request a left turn, results in the configuration of FIG. 25C. Again, the radial displacement of the follower pinion 224 is unchanged.

Figure 25D:
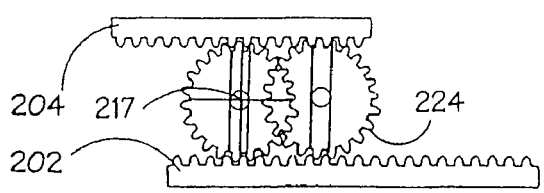

FIG. 25D shows the configuration when the steering input device is set to zero but the speed control rack is withdrawn to move the follower pinion 224 rearwardly, setting both transmission drive units 122L, 122R to identical reverse ratios and causing the vehicle 10 to reverse in a straight line.

It will be apparent that in the master/slave rack embodiment described above, the speed input device determines the radial distance of the follower or followers from the axis about which the guide path rotates. The displacement of the follower produced by moving the steering input device is a function of this radial distance. Rotating the guide path causes the ratio of one transmission drive unit relative to the other to change, whereas moving the follower along the guide path changes both ratios in the same sense.

Figure 26:
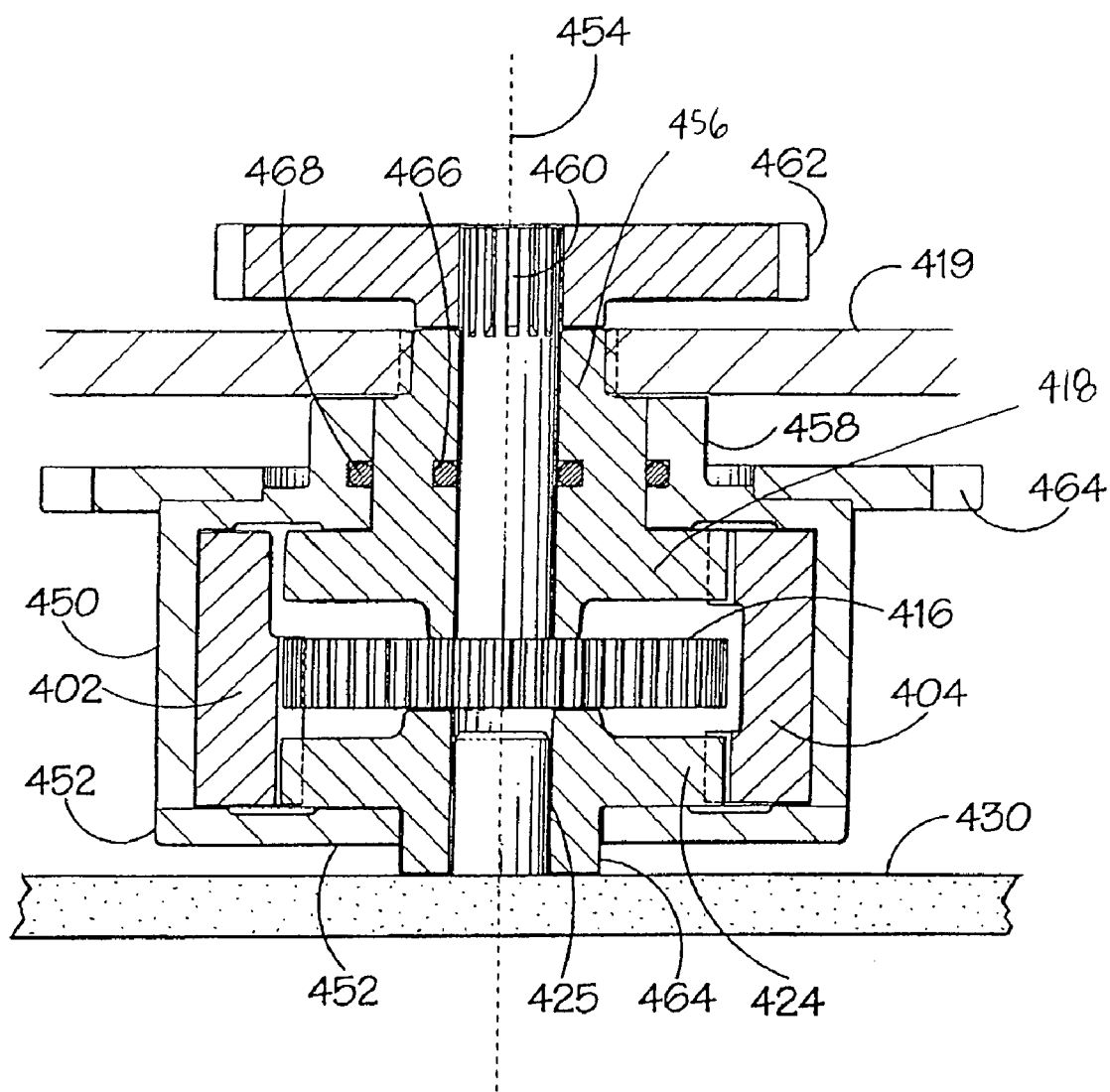
FIG. 26 is a cross-sectional illustration of an embodiment of a steering and speed control assembly.

FIG. 26 illustrates an arrangement which is functionally similar to that of FIGS. 21-25D but is believed to be more convenient to assemble. The arrangement includes a master rack 402 and a slave rack 404, but in this embodiment the racks are received and mounted by a two part housing 450, 452. The housing and the racks are able to rotate around axis 454. Mounting pinion 418 is spatially fixed through an integral boss 456, which is splined into mounting plate 419. Housing part 450 has an integral collar 458 through which the housing is rotatably mounted on boss 456. Running through an axial bore in the mounting pinion 418 is an integral shaft 460 of a speed control pinion 416, the shaft being splined into an upper gear 462 through which speed control is exercised. The upper gear 462 is coupled to the speed input device through an arrangement (not shown) using either a chain or a further toothed rack. Rotation of the housing 450, 452 and of the racks it mounts is controlled through a steering gear 464 carried upon the housing and coupled to the steering input device through an arrangement (not shown) using either a further gear, a chain or a further toothed rack. A stub axle 425 mounted on a "T" shaped lever 430 (similar to lever 130 described above) projects into an axial bore of follower pinion 424. The lever 430 is coupled to the transmission system, and more particularly to two drive units, in the manner described above with respect to FIGS. 21-23. The follower pinion 424 meshes with both master and slave racks 402, 404. Speed control pinion 416 meshes only with the master rack 402, so that moving this pinion by means of the speed input device moves the follower pinion 424 radially. Fixed mounting pinion 418 meshes only with the slave rack 404 to ensure that when the housing rotates, the slave rack retreats to compensate for the advance of the master rack. As a result, rotation of the housing does not in itself change the radial position of the follower pinion 424.

Assembly of this arrangement involves placing all of the relevant parts in housing part 450, then adding housing part 452 to keep them in place. Although it is not apparent from the drawing, the housing 450, 452 forms an elongate enclosure containing the full length of the racks and leaving them room to move longitudinally. Stub axle 425 and a surrounding, projecting hub 464 project through an elongate slot in the housing part 452 to give them freedom to move longitudinally. Seals, including "O" ring seals 466, 468, retain lubricant in the housing 450, 452. Mounting the housing assembly on the mounting plate 419 is achieved by inserting the shaft 460 through its hole in the mounting plate and securing the upper gear 462 in place upon the shaft 460 to resist its subsequent withdrawal.

FIGS. 27 and 28 show a version of a transmission arrangement designed to match the characteristics of an Ackerman-type wheel assembly 50. The mechanism seen at 500 serves to control the position of the T-shaped lever 502, which is equivalent to the T-shaped lever seen in FIGS. 21-23. In this embodiment, the outer ends of this lever couple to the ratio control levers of the variators (which are not seen in this drawing) through spherical heads 503 received in complementarily shaped slots 504, which is a slight modification of the FIGS. 21-23 embodiment. A more significant difference of the present arrangement concerns an arrangement of gears 506, 508, through which the mechanism 500 is coupled to the steering input device (not shown). The gear wheel 506 servers the same purpose as gear wheel 200 seen in FIGS. 21-23: it serves to rotate the mechanism 500 by turning the lever 502 to provide the required steering effect. The driver is able to turn the gear wheel 506 through the steering input device (e.g., steering input device 24 from FIG. 1), which is coupled to the steering gear 508 that meshes with the gear wheel 506. The gear wheel 506 and the steering gear 508 are non-circular, and their shapes are chosen to provide the required relationship between the position of the steering input device and the ratios provided by the two transmission drive units (e.g., drive units 29 or 122L, 122R described above). Determining the shapes for the two gears 506, 508 is a straightforward numerical exercise based upon the characteristic (steering input device position vs. vehicle turn radius) of the Ackermann steering device and the characteristic (ratio control lever position vs. ratio) of the transmission drive units. In the present embodiment, this yields a shape for the gear wheel 506 that has three curved sides, as seen. The gears 506, 508 are shaped to remain in mesh at all times, so that the shape of one determines the shape of the other.

Figure 29:
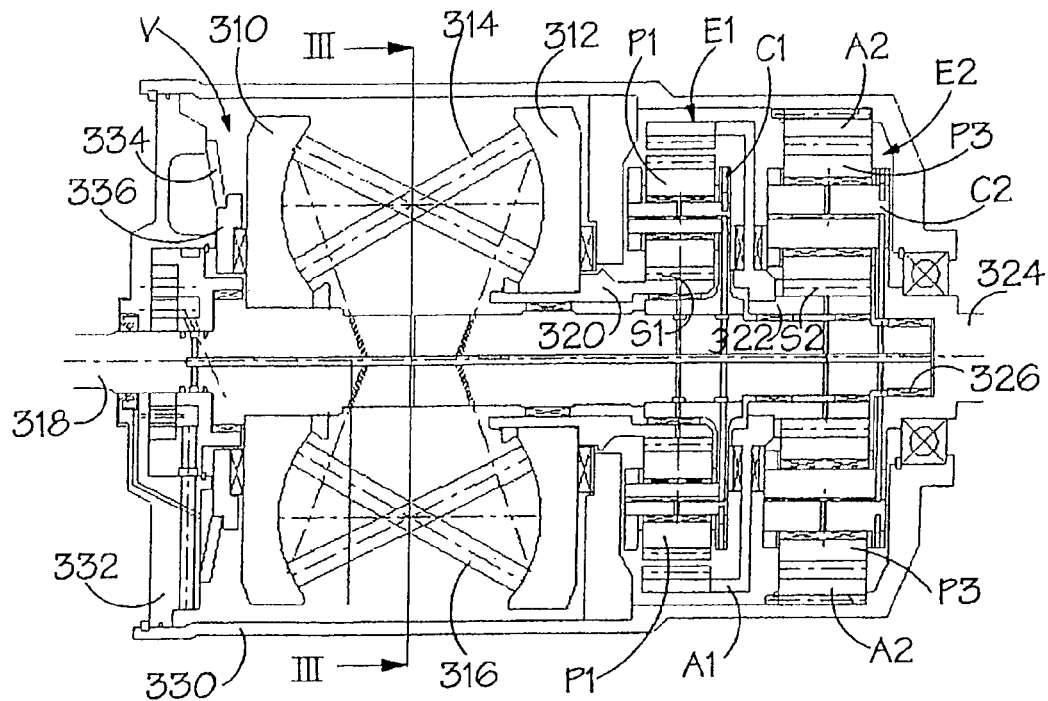
FIG. 29 is a section in a longitudinal plane through a transmission suitable for use as one of the present drive units.
Figure 30:
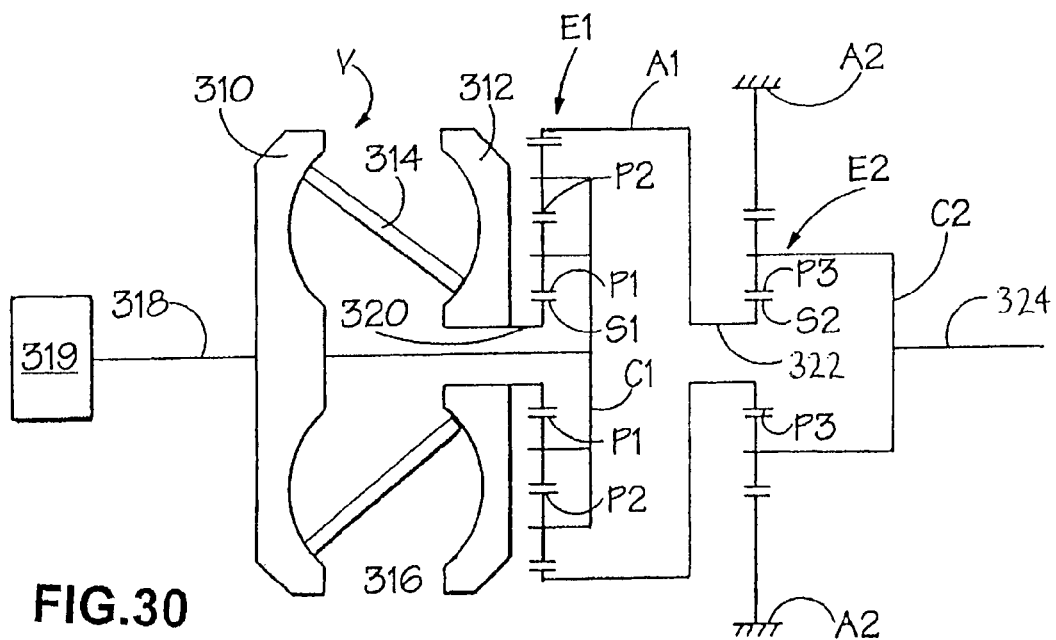
FIG. 30 is a schematic representation of the transmission of FIG. 29.
Figure 31:
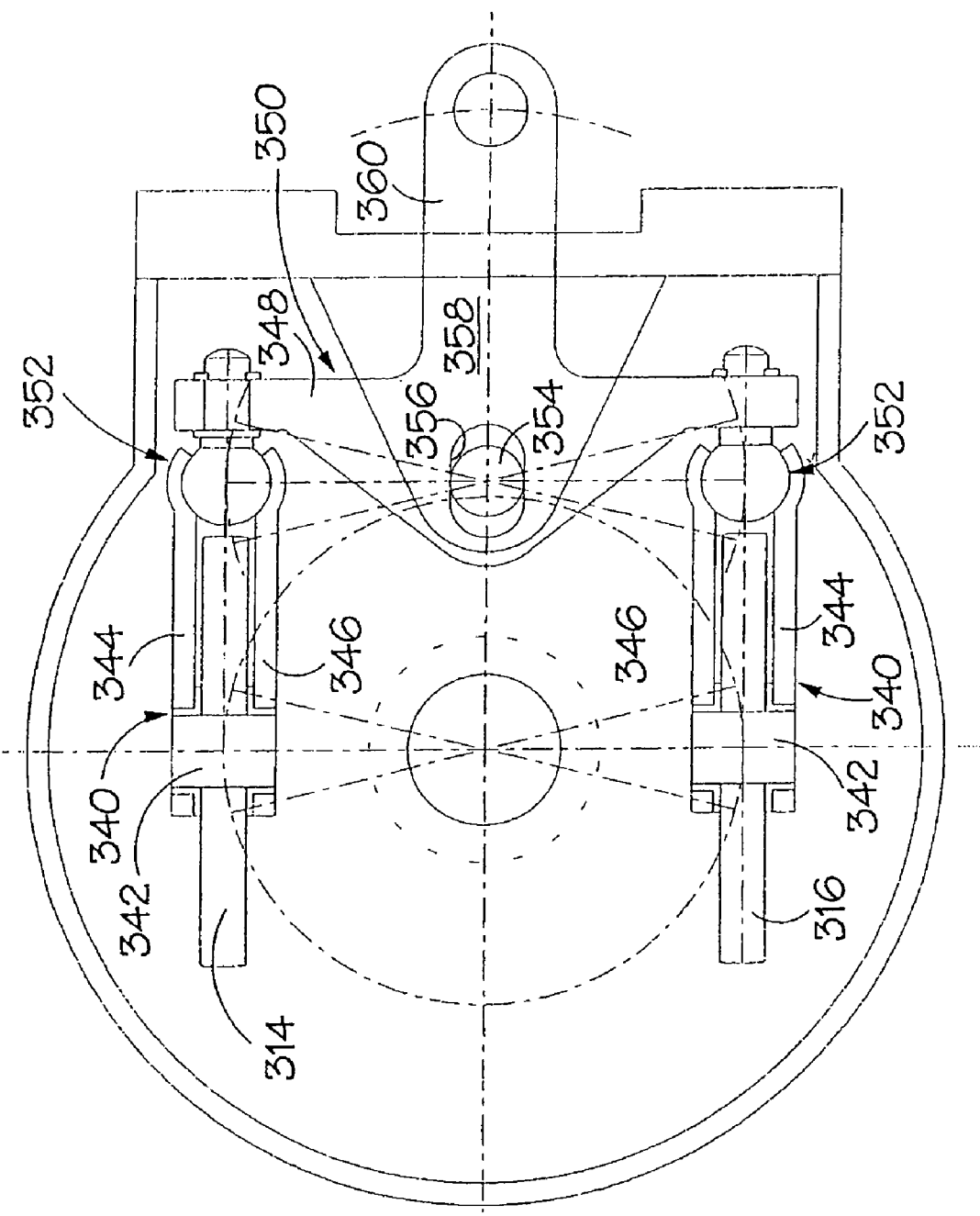
FIG. 31 is a cross-sectional view (without the cross hatching) of the transmission of FIG. 29 looking in the direction of arrows III-III.

FIGS. 29-31 depict the construction of a continuously variable ratio transmission (CVT) having a geared neutral condition that is suitable for use as a transmission drive unit 29. The depicted drive unit is a toroidal-race, rolling-traction type, although other types of CVTs may be used. For example, a "belt and sheave" type transmission that could be used consistently with the present systems and vehicles is disclosed in U.S. Pat. No. 5,766,105, which is incorporated by reference.

The illustrated CVT comprises a variation V having a toroidally-recessed input disc 310 and a facing toroidally-recessed output disc 312. Two rollers 314, 316 are mounted in the toroidal cavity defined between the opposing toroidally-recessed faces of the input and output discs 310, 312 to transmit drive from the input disc 310 to the output disc 312 with a ratio that can be varied by tilting the rollers 314, 316.

The input disc 310 is coupled to, and rotates with, a transmission input shaft 318 which is driven from the vehicle's engine (e.g., engine 12 of vehicle 10). The variation V provides an output via a tubular output shaft 320 which is coupled to the output disc 312 and arranged coaxially with, and around, the input shaft 318. The input shaft 318 and the variation output shaft 320 provide the inputs to a compound mixing epicyclic gear train E1. As shown schematically, the end of the variation output shaft 320 remote from the output disc 312 carries a first sun gear S1 of the mixing epicyclic gear train E1. The carrier C1 of the gear train E1 is coupled to, and driven by, the input shaft 318. The carrier C1 carries four identical equally-spaced radially inner planet gears P1 and four identical equally-spaced radially outer planet gears P2 of the same size as the radially inner planet gears P1. The radially inner planet gears P1 engage with the first sun gear S1 and with a respective one of the four radially outer planet gears P2. The radially outer planet gears P2 also engage with an internally-toothed annulus A1, which forms the output of the mixing epicyclic gear train E1. The output from the annulus A1 is coupled via tubular coaxial output shaft 322 to a simple reducing epicyclic gearset E2. The reducing epicyclic gearset E2 comprises an input sun gear S2 carried by shaft 322 which meshes with four equally angularly spaced planet gears P3 carried by carrier C2. The planet gears P3 also mesh with an annulus A2 fixed to the transmission housing. The rotation of the carrier C2 forms the output of the reducing epicyclic gear set E2 and is transmitted to the exterior by an output shaft 24 which is coupled to the carrier C2. The output shaft 324 is coaxial with the input shaft 318, one end of which is received in a recess 326 in the innermost end of the output shaft 324. The output shaft 324 is coupled to the relevant driven vehicle wheel.

The transmission is housed in a generally tubular casing 330 which supports the input and output shafts 318, 320. The end of the casing 330 adjacent the input shaft 318 is closed off by means of an end plate 332. A conical Belleville spring washer 334 extends between the inner face of the end plate 332 and an annular bearing plate 336, which is in rolling contact with an outer planar face of the variator input disc 310. The Belleville spring washer applies a force (an "end load") to the input disc 310 and permits torque to be transmitted from the input disc 310 via the rollers 314, 316 to the output disc 312.

By varying the inclination of the two rollers 314, 316 (as described below), the speed of the output disc 312 relative to the input disc 310 can be varied. By combining the rotations of the transmission input and variator output in the mixing epicyclic gear train E1, the output of the transmission can be varied. In the arrangement illustrated, the transmission can be varied between full reverse, through "geared neutral" to full forward, as well as anywhere in between. However, the operating range of the variator can be tailored to requirements by appropriate selection of the gearing. For example, the variator may be arranged to vary between low reverse through geared neutral to high forward overdrive if a vehicle to which the transmission were fixed operated normally in forward gear and operated only occasionally in reverse.

The mechanism for varying the inclination of the two rollers 314, 316 is shown in more detail in FIG. 30. Each roller 314, 316 is rotatably mounted in a roller carriage 340 by means of a stub axle 342 which is rotatably mounted in opposed planar support plates 44, 46 of the roller carriage. One end of each of the roller carriages 340 is coupled to a respective one of the two ends of the cross-bar 348 of a control lever 350 by means of a spherical bearing 352 (e.g., "Rose bearing" manufactured by Rose Bearings Limited). The control lever 348 is provided with a pivot pin 354 located midway between the center points of the two spherical bearings 352. The pivot pin is received in a slot 356 of the same width as the diameter of the pivot pin but elongated in the radial direction with respect to the rotational axis of the variator. The slot 356 is provided in a mounting lug 358 which projects into the variator into the space between the input and output discs 310, 312.

The lever 350 is provided with an actuating arm 360 which projects out the variator housing in a direction perpendicular to the line joining the center points of the two spherical bearings 352 (perpendicular to the axis of the cross-bar 348 of the lever). This arm 360 forms the lever through which the transmission ratio is controlled and corresponds to the ratio control levers 144L, 144R described in connection with FIGS. 22-25E. As the lever 350 pivots, one of the rollers 310, 312 is pushed and the other is pulled, both with equal torque. The mounting of the pivot pin 354 within the slot 356 in the mounting lug 358 allows the pin 354 to move radially inwardly and outwardly, which ensures that the horizontal forces from the rollers are equalized and cancel each other out. This may be valuable with low-cost assemblies, where the manufacture of the components is likely to be less accurate. The radial movement of the pivot of the lever allows the lever to move to a position in which any imbalance between the two rollers arising from manufacturing differences will be cancelled out.

It will be apparent that when drive is transmitted, the rollers are subject to a net torque tending to drive them circumferentially about the variator axis. This torque must be reacted to a fixed point for the rollers to hold steady positions. The necessary reaction torque is provided by the lever 360, so that the force upon the lever is related to the torques at the transmission input and output. When, for example, one wheel tends to lag behind the vehicle speed, in a way that could otherwise cause it to slip, the effect is to change the force upon the lever such that the speed of the relevant wheel tends to increase. By permitting this adjustment, the depicted arrangements reduce or even eliminate wheel slip.

Descriptions of well known manufacturing and assembly techniques, components and equipment have been omitted so as not to unnecessarily obscure the present systems and devices in unnecessary detail. The present systems and devices are not intended to be limited to the particular forms disclosed. Rather, they are to cover all modifications, equivalents, and alternatives falling within the scope of the claims.

For example, the steering assembly that receives a steering input from the steering input device may be configured differently than shown in the figures. In alternative embodiments, the steering mechanism for a given vehicle may be a single steering cam with two steering slots, rather than two steering cams with one steering slot each, as shown for example in FIG. 12. Furthermore, such a dual-slotted steering cam may be oriented horizontally (or generally perpendicular with the ground), instead of being oriented vertically like the steering cams shown in the figures. Moreover, such a steering cam (like any of the present steering cams) may be canted at any angle suited to a given application and chosen using sound engineering judgment.

Another alternative includes moving the gear set that initially translates the rotation of a steering input device (such as a steering wheel) into movement that is transmitted to the wheel assemblies. For example, such a gear set could be moved forward and positioned in between two rods that otherwise act as tie rods linking the two front wheel gear assemblies together.

As yet another example, the steering slots that are shown in the figures as positioned in the steering cams could be instead positioned in one of the gears making up the gear assemblies for the front steerable wheels.

As still another example, the vertically-oriented speed cams could be made to mesh with each other to a certain degree and oriented horizontally.

The appended claims are not to be interpreted as including means-plus-function limitations, unless such a limitation is explicitly recited in a given claim using the phrase(s) "means for" and/or "step for," respectively.

The invention claimed is:

1. A vehicle capable of making a small radius turn, comprising:
    a frame;
    a steerable structure coupled to the frame;
    two drive wheels coupled to the frame;
    a transmission system capable of driving the two drive wheels at different speeds and in different directions;
    a steering assembly configured to control the steerable structure;
    a speed control assembly coupled to the transmission system; and
    an integration device configured to mechanically integrate a steering input received by the steering assembly with a speed input received by the speed control assembly to steer and drive the vehicle;
    where the steering assembly, the speed control assembly and the integration device are configured to work together to reduce the speed of the outboard drive wheel during an extreme turn while the speed input received by the speed control assembly is constant.

2. The vehicle of claim 1, further comprising:
    another steerable structure coupled to the frame, the steering assembly being configured to control each steerable structure.

3. The vehicle of claim 2, where each steerable structures comprises a ground-engaging wheel.

4. The vehicle of claim 3, where the steering assembly includes a steering input device configured to receive a steering input.

5. The vehicle of claim 4, where the steering input device is a steering wheel.

6. A vehicle capable of making a small radius turn, comprising:
    a frame;
    a steerable structure coupled to the frame;
    two drive wheels coupled to the frame;
    a transmission system capable of driving the two drive wheels at different speeds and in different directions;
    a steering assembly configured to control the steerable structure;
    a speed control assembly coupled to the transmission system, the speed control assembly including a speed input device configured to be manipulated by an operator; and
    an integration device configured to integrate a steering input received by the steering assembly with a speed input received by the speed control assembly to produce a blended output for steering and driving the vehicle that is transmitted to the transmission system as a result of an operator manipulating the speed input device;
    where the steering assembly, the speed control assembly and the integration device are configured to work together to steer the vehicle correctly in both forward and reverse during a turn.

7. The vehicle of claim 6, where the transmission system includes two transmissions, one coupled to each driving wheel, and the blended output comprises a first blended output sent to one of the transmissions and a second blended output sent to the other transmission.

8. The vehicle of claim 6, further comprising:
    another steerable structure coupled to the frame, the steering assembly being configured to control each steerable structure.

9. The vehicle of claim 8, where each steerable structures comprises a ground-engaging wheel.

10. The vehicle of claim 9, where the steering assembly includes a steering input device configured to receive a steering input.

11. The vehicle of claim 10, where the steering input device is a steering wheel.

* * * * *

UNITED STATES PATENT AND TRADEMARK OFFICE
CERTIFICATE OF CORRECTION

| | | |
|---|---|---|
| PATENT NO. | : 7,992,659 B2 | Page 1 of 1 |
| APPLICATION NO. | : 11/490881 | |
| DATED | : August 9, 2011 | |
| INVENTOR(S) | : Axel Schaedler et al. | |

It is certified that error appears in the above-identified patent and that said Letters Patent is hereby corrected as shown below:

In title page, item (73) Assignee, delete "Infinitrak, LLC, Valley City, OH (US)" and insert --MTD Products Inc, Valley City, OH (US)-- therefor.

Signed and Sealed this
Tenth Day of January, 2012

David J. Kappos
*Director of the United States Patent and Trademark Office*